US011818979B2

(12) United States Patent
Guo et al.

(10) Patent No.: US 11,818,979 B2
(45) Date of Patent: Nov. 21, 2023

(54) GRASS TRIMMER

(71) Applicants: Nanjing Chervon Industry Co., Ltd., Nanjing (CN); Chervon (HK) Limited, Hong Kong (CN)

(72) Inventors: Jianpeng Guo, Nanjing (CN); Maohui Li, Nanjing (CN); Fangjie Nie, Nanjing (CN); Toshinari Yamaoka, Nanjing (CN)

(73) Assignees: Nanjing Chervon Industry Co., Ltd., Nanjing (CN); Chervon (HK) Limited, Hong Kong (CN)

(*) Notice: Subject to any disclaimer, the term of this patent is extended or adjusted under 35 U.S.C. 154(b) by 496 days.

(21) Appl. No.: 16/577,063

(22) Filed: Sep. 20, 2019

(65) Prior Publication Data
US 2020/0008348 A1 Jan. 9, 2020

Related U.S. Application Data

(63) Continuation-in-part of application No. PCT/CN2018/096413, filed on Jul. 20, 2018, and a
(Continued)

(30) Foreign Application Priority Data

Jan. 22, 2016 (CN) .......................... 201610044465.6
Aug. 1, 2016 (CN) .......................... 201610626524.0
(Continued)

(51) Int. Cl.
*A01D 34/416* (2006.01)
*A01D 101/00* (2006.01)

(52) U.S. Cl.
CPC ..... *A01D 34/4166* (2013.01); *A01D 34/4162* (2013.01); *A01D 2101/00* (2013.01)

(58) Field of Classification Search
CPC ................ A01D 34/412; A01D 34/416; A01D 34/4161; A01D 34/4162; A01D 34/4163; A01D 34/4166
(Continued)

(56) References Cited

U.S. PATENT DOCUMENTS 4,183,138 A * 1/1980 Mitchell ............ A01D 34/4163
30/276
4,189,833 A 2/1980 Kwater
(Continued)

FOREIGN PATENT DOCUMENTS

CN 2737757 Y 11/2005
CN 201097498 Y 8/2008
(Continued)

OTHER PUBLICATIONS

Written Opinion issued by International Bureau dated Mar. 14, 2017 for International application PCT/CN2016/110351.
(Continued)

*Primary Examiner* — Sean M Michalski
*Assistant Examiner* — Richard D Crosby, Jr.
(74) *Attorney, Agent, or Firm* — Finnegan, Henderson, Farabow, Garrett & Dunner, LLP

(57) ABSTRACT

A grass trimmer includes a trimming head, a driving device for driving the trimming head to rotate so as to cut vegetation and an operating device for a user to operate so as to control the driving device. The trimming head includes a spool and a line holding member, the spool is used to wind a cutting line, and the line holding member is formed with a line holding structure. The driving device includes a motor. The grass trimmer has an auto-winding mode. In the auto-winding mode, the motor drives at least one of the spool and the line holding member to make the spool and the line
(Continued)

holding member rotate relatively so that the cutting line is wound on the spool automatically.

19 Claims, 76 Drawing Sheets

Related U.S. Application Data continuation-in-part of application No. 15/994,548, filed on May 31, 2018, now Pat. No. 10,440,882.

(30) Foreign Application Priority Data

| Oct. 7, 2016 | (CN) | 201610875071.5 |
| Aug. 7, 2017 | (CN) | 201720979716.X |
| Aug. 7, 2017 | (CN) | 201720979787.X |

(58) Field of Classification Search
USPC .......................................................... 30/276
See application file for complete search history.

(56) References Cited

U.S. PATENT DOCUMENTS

| 4,195,408 | A |   | 4/1980  | Palmieri et al. |
| 4,242,797 | A |   | 1/1981  | Palmieri |
| 4,285,127 | A | * | 8/1981  | Zerrer ............... A01D 34/4162 30/276 |
| 4,347,666 | A |   | 9/1982  | Moore |
| 4,360,971 | A |   | 11/1982 | Fellmann |
| 4,566,189 | A |   | 1/1986  | Muto |
| 4,584,771 | A |   | 4/1986  | Tillotson |
| 4,680,213 | A |   | 7/1987  | Fourezon |
| 4,823,465 | A | * | 4/1989  | Collins ............... A01D 34/4163 30/276 |
| 4,835,867 | A |   | 6/1989  | Collins |
| 4,852,258 | A |   | 8/1989  | Foster |
| 4,888,871 | A |   | 12/1989 | Englebrecht |
| 4,906,506 | A |   | 3/1990  | Nishimura et al. |
| 4,959,904 | A |   | 10/1990 | Proulx |
| 5,109,607 | A |   | 5/1992  | Everts |
| 5,175,932 | A |   | 1/1993  | Lange et al. |
| 5,659,960 | A |   | 8/1997  | Everts |
| 5,695,404 | A |   | 12/1997 | Shaulis |
| 5,765,287 | A |   | 6/1998  | Griffini |
| 5,881,465 | A |   | 3/1999  | Brant |
| 5,906,051 | A |   | 5/1999  | Nannen |
| 6,014,812 | A |   | 1/2000  | Webster |
| 6,141,879 | A |   | 11/2000 | Ametoli |
| 6,148,523 | A |   | 11/2000 | Everts et al. |
| 6,263,580 | B1 |  | 7/2001  | Stark |
| 6,301,788 | B1 |  | 10/2001 | Webster |
| 6,385,853 | B1 | * | 5/2002 | Berfield ............... A01D 34/4161 30/276 |
| 6,487,780 | B1 |  | 12/2002 | Peterson et al. |
| 6,810,647 | B1 |  | 11/2004 | Evrikoz |
| 6,834,486 | B2 | * | 12/2004 | Thompson ........... A01D 34/733 30/276 |
| 6,901,667 | B2 | * | 6/2005 | Proulx ............... A01D 34/4163 30/276 |
| 7,257,898 | B2 | * | 8/2007 | Iacona ................ A01D 34/416 30/276 |
| 7,797,839 | B2 | * | 9/2010 | Proulx ............... A01D 34/4166 30/276 |
| 8,025,249 | B2 |  | 9/2011  | Alliss |
| 8,230,602 | B2 | * | 7/2012 | Arnetoli ............. A01D 34/4161 30/276 |
| 8,464,431 | B2 |  | 6/2013  | Reynolds et al. |
| 8,510,960 | B2 | * | 8/2013 | Pfaltzgraff ......... A01D 34/4166 30/276 |
| 9,253,942 | B2 |  | 2/2016  | Alliss |
| 9,516,807 | B2 |  | 12/2016 | Alliss |
| 9,517,555 | B2 |  | 12/2016 | Racov et al. |
| 10,273,112 | B2 |   | 4/2019  | Alliss |
| 10,440,882 | B2 |   | 10/2019 | Guo et al. |
| 10,517,209 | B2 |   | 12/2019 | Kullberg |
| 10,517,210 | B2 |   | 12/2019 | Cabrera |
| 10,568,260 | B2 | * | 2/2020 | Zenkus ............... A01D 34/4165 |
| 10,716,253 | B2 | * | 7/2020 | Zenkus ............... A01D 34/4165 |
| 10,856,466 | B2 |   | 12/2020 | Guo et al. |
| 11,089,725 | B2 | * | 8/2021 | Nie ..................... A01D 34/4166 |
| 11,134,610 | B2 | * | 10/2021 | Peng ..................... A01D 34/90 |
| 11,503,759 | B2 |   | 11/2022 | Guo et al. |
| 2002/0007559 | A1 |   | 1/2002  | Morabit |
| 2002/0026714 | A1 |   | 3/2002  | Peterson |
| 2002/0189107 | A1 |   | 12/2002 | Arnetoli |
| 2003/0229993 | A1 |   | 12/2003 | Agne |
| 2005/0072007 | A1 |   | 4/2005  | Proulx |
| 2005/0076515 | A1 |   | 4/2005  | Proulx |
| 2005/0217120 | A1 |   | 10/2005 | Proulx |
| 2006/0123635 | A1 |   | 6/2006  | Hurley |
| 2006/0254061 | A1 | * | 11/2006 | Alliss ................ A01D 34/4161 30/276 |
| 2008/0052917 | A1 |   | 3/2008  | Proulx |
| 2008/0053052 | A1 | * | 3/2008 | Cigarini ............. A01D 34/4163 56/12.7 |
| 2008/0120847 | A1 |   | 5/2008  | Alliss |
| 2010/0154229 | A1 | * | 6/2010 | Lacona ............... A01D 34/4163 30/347 |
| 2010/0180451 | A1 | * | 7/2010 | Reynolds ........... A01D 34/4163 30/276 |
| 2010/0229401 | A1 |   | 9/2010  | Kato |
| 2011/0000091 | A1 |   | 1/2011  | Proulx |
| 2011/0203118 | A1 |   | 8/2011  | Saito |
| 2011/0239468 | A1 | * | 10/2011 | Conlon ............... A01D 34/4163 30/276 |
| 2012/0000079 | A1 | * | 1/2012 | Arnetoli ............. A01D 34/4163 30/347 |
| 2012/0255182 | A1 | * | 10/2012 | Kato .................. A01D 34/4166 30/347 |
| 2013/0236667 | A1 |   | 9/2013  | Kenney et al. |
| 2013/0283623 | A1 | * | 10/2013 | Pellenc ................ A01D 34/416 30/276 |
| 2014/0190017 | A1 |   | 7/2014  | Maynez |
| 2014/0208599 | A1 | * | 7/2014 | Nagahama ............. H02P 6/16 30/277.4 |
| 2015/0107118 | A1 |   | 4/2015  | Banjo |
| 2015/0121707 | A1 | * | 5/2015 | Li ..................... A01D 34/4161 30/276 |
| 2015/0150191 | A1 | * | 6/2015 | Alliss ................ A01D 34/4161 30/276 |
| 2015/0164527 | A1 | * | 6/2015 | Maier .................... A61B 17/32 700/160 |
| 2015/0342116 | A1 | * | 12/2015 | Sprungman ........ A01D 34/4166 30/276 |
| 2015/0342117 | A1 |   | 12/2015 | Alliss |
| 2015/0344646 | A1 |   | 12/2015 | Hansen |
| 2016/0021819 | A1 |   | 1/2016  | Nakano et al. |
| 2016/0106034 | A1 | * | 4/2016 | Arnetoli ............. A01D 34/4166 30/276 |
| 2016/0128276 | A1 |   | 5/2016  | Arnetoli |
| 2016/0143218 | A1 |   | 5/2016  | Sergyeyenko |
| 2016/0219783 | A1 |   | 8/2016  | Kitamura |
| 2017/0079204 | A1 |   | 3/2017  | Yamaoka |
| 2017/0215338 | A1 |   | 8/2017  | Arnetoli |
| 2017/0238461 | A1 |   | 8/2017  | Cabrera |
| 2017/0347523 | A1 |   | 12/2017 | Alliss |
| 2018/0020614 | A1 |   | 1/2018  | Alliss |
| 2018/0020615 | A1 | * | 1/2018 | Alliss ................ A01D 34/4163 30/276 |
| 2018/0098492 | A1 |   | 4/2018  | Guo et al. |
| 2018/0098493 | A1 |   | 4/2018  | Sergyeyenko et al. |
| 2018/0110182 | A1 |   | 4/2018  | Nolin |
| 2018/0132417 | A1 |   | 5/2018  | Alliss |
| 2018/0177135 | A1 |   | 6/2018  | Fu |
| 2018/0271010 | A1 |   | 9/2018  | Hallendorff |
| 2018/0279547 | A1 |   | 10/2018 | Sergyeyenko |
| 2019/0075721 | A1 |   | 3/2019  | Cholst |
| 2019/0116728 | A1 |   | 4/2019  | Zenkus |
| 2019/0183040 | A1 |   | 6/2019  | Simmons |
| 2019/0269070 | A1 |   | 9/2019  | Zha |

(56) References Cited

U.S. PATENT DOCUMENTS

| | | |
|---|---|---|
| 2020/0008348 A1 | 1/2020 | Guo et al. |
| 2020/0017182 A1 | 1/2020 | Mizutani |
| 2020/0170182 A1 | 1/2020 | Guo et al. |
| 2020/0112227 A1 | 4/2020 | Kouda et al. |
| 2021/0022287 A1 | 1/2021 | Guo et al. |
| 2021/0185912 A1 | 6/2021 | Wilks |
| 2021/0368676 A1 | 12/2021 | Guo et al. |

FOREIGN PATENT DOCUMENTS

| | | |
|---|---|---|
| CN | 101816241 A | 9/2010 |
| CN | 203399522 U | 1/2014 |
| CN | 203633147 U | 6/2014 |
| CN | 203633147 U | 6/2014 |
| CN | 104137693 A | 11/2014 |
| CN | 204168758 U | 2/2015 |
| CN | 204539943 U | 8/2015 |
| CN | 105393697 A | 3/2016 |
| CN | 205431040 U | 8/2016 |
| CN | 206078093 U | 4/2017 |
| CN | 106993426 A | 8/2017 |
| CN | 106993429 A | 8/2017 |
| CN | 207720711 U | 8/2018 |
| EP | 0955800 B1 | 10/2003 |
| EP | 3130212 A1 | 2/2017 |
| FR | 3013251 A1 | 5/2015 |
| JP | 2015-181475 A | 10/2015 |
| WO | WO2017/124865 A1 | 7/2017 |

OTHER PUBLICATIONS

International Search Report issued by International Bureau dated Mar. 14, 2017 for International application PCT/CN2016/110351, and English translation thereof.

Final Office Action issued in U.S. Appl. No. 17/066,502, dated Jun. 24, 2022 (12 pages).

Non-Office Action issued in U.S. Appl. No. 17/066,502, dated Feb. 24, 2022 (14 pages).

Final Office Action issued in U.S. Appl. No. 17/402,976, dated Jul. 12, 2022 (18 pages).

Non-Final Office Action issued in U.S. Appl. No. 17/402,976, dated Dec. 13, 2021 (11 pages).

Final Office Action issued in U.S. Appl. No. 17/402,976, dated Apr. 5, 2023 (8 pages).

Non-Final Office Action issued in U.S. Appl. No. 17/402,976, dated Mar. 25, 2022 (16 pages).

Non-Final Office Action issued in U.S. Appl. No. 17/402,976, dated Nov. 23, 2022 (15 pages).

Notice of Reasons for Refusal issued by Japan Patent Office (JPO) dated Jul. 30, 2019 in counterpart Japanese Application No. JP 2019-506898A (7 pages).

Office Action issued in Canadian patent application No. 3,009,848, dated Oct. 11, 2022 (5 pages).

\* cited by examiner

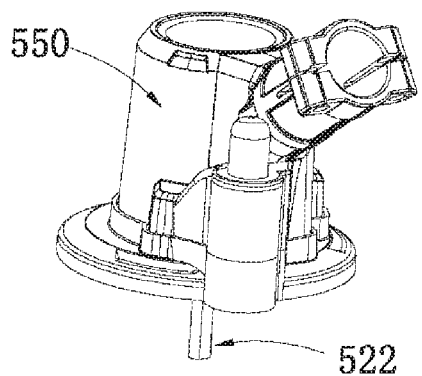
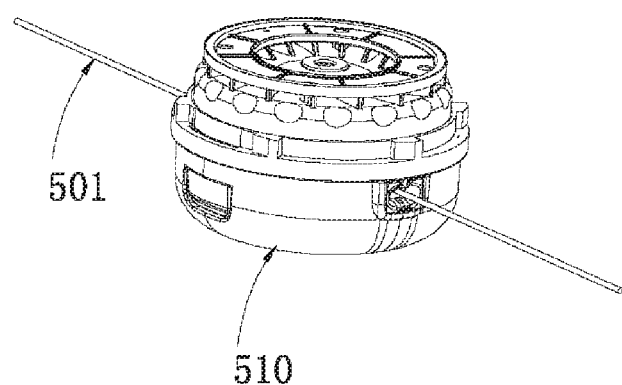
FIG.5C

GRASS TRIMMER

CROSS REFERENCE TO RELATED APPLICATION

The present disclosure is a continuation-in-part of U.S. application Ser. No. 15/994,548, filed May 31, 2018, now U.S. Pat. No. 10,440,882, which is a U.S. national stage application of International Application No. PCT/CN2016/110351, filed on Dec. 16, 2016, claiming the benefits of priority to Chinese Application No. 201610044465.6, filed on Jan. 22, 2016, Chinese Application No. 201610626524.0, filed on Aug. 1, 2016, and Chinese Application No. 201610875071.5, filed on Oct. 7, 2016. The present disclosure is also a continuation-in-part of International Application No. PCT/CN2018/096413, filed on Jul. 20, 2018, claiming the benefits of priority to Chinese Patent Application No. 201720979787.X, filed on Aug. 7, 2017 and Chinese Patent Application No. 201720979716.X, filed on Aug. 7, 2017.

TECHNICAL FIELD

The present disclosure relates generally to grass trimmers and, more particularly, to a grass trimmer having an auto-winding mode, an operating method thereof and a control method thereof.

BACKGROUND

Grass trimmers are a kind of gardening tools, which are used to trim the lawn. The grass trimmer includes a trimming head. The trimming head rotates at high speed to drive a cutting line mounted thereon to rotate so as to realize the cutting function.

The trimming head includes a spool allowing the cutting line to wind thereon. During the cutting operation, the cutting line is worn away gradually due to wear. After operating for a period, it is needed to change a new cutting line and wind the new cutting line around the spool. For the currently known cutting line, a user needs to rotate the spool manually to wind the cutting line around the spool. The winding operation is inconvenient and the winding speed is slow.

SUMMARY

To solve the shortcomings of the related art, the purpose of this disclosure is to provide a grass trimmer with auto-winding mode and method for its operation and control method.

Embodiments of the disclosure provide a grass trimmer, includes: a trimming head; a driving device for driving the trimming head to rotate so as to cut vegetation; and an operating device for a user to operate so as to control the driving device. The trimming head includes a spool and a line holding member, the spool is used to wind a cutting line, and the line holding member is formed with a line holding structure allowing the cutting line to pass through or bypass, the driving device includes a motor, the grass trimmer has an auto-winding mode, in the auto-winding mode, the motor drives at least one of the spool and the line holding member to make the spool and the line holding member rotate relatively so that the cutting line is wound on the spool automatically.

In some embodiments, the operating device includes a first operating element for starting the motor, and a second operating element for the user to operate so as to choose the auto-winding mode.

In some embodiments, the operating device includes a first operating element for starting the motor so that the motor runs in a first running state and a second operating element for starting the motor so that the motor runs in a second running state.

In some embodiments, the rotation direction of the motor in the first running state is different from the rotation direction of the motor in the second running state.

In some embodiments, the rotation speed of the motor in the first running state is different from the rotation speed of the motor in the second running state.

In some embodiments, the operating device includes: a first operating element having a first preset operating state, a second operating element having a second preset operating state, wherein when the first operating element and the second operating element are in the first preset operating state and the second preset operating state respectively, the grass trimmer can start the auto-winding mode.

In some embodiments, the operating device includes a first reset assembly for making the first operating element disengage the first preset operating state when the first operating element isn't operated.

In some embodiments, the operating device includes a second reset assembly for making the second operating element disengage the second preset operating state when the second operating element is not operated.

In some embodiments, the grass trimmer includes a damping device for damping at least one of the spool and the line holding member so as to make the grass trimmer be in the auto-winding mode.

In some embodiments, the damping device includes a damping element for applying a resistance force on the spool to stop the spool from rotating.

In some embodiments, the damping device includes a damping element for applying a resistance force on the line holding member to damp the rotation of the line holding member.

In some embodiments, the damping device includes a first damping element for applying a first resistance force on the spool to damp the rotation of the spool, a second damping element for applying a second resistance force on the line holding member to damp the rotation of the line holding member.

In some embodiments, the damping device includes a damping element for stopping the spool from rotating in a first direction, and the line holding member is rotated in the first direction in the auto-winding mode.

In some embodiments, the damping device includes a damping element for stopping the line holding member from rotating in a second direction, and the spool is rotated in the second direction in the auto-winding mode.

In some embodiments, the line holding member is a head housing for accommodating the spool, the head housing is formed with outer apertures allowing the cutting line to pass through, and the spool is formed with inner apertures for fixing the cutting line or allowing the cutting line to pass through, wherein the grass trimmer has a cutting mode, in the cutting mode, the spool and the head housing are rotated synchronously, and when the cutting mode is finished, the outer apertures and the inner apertures are aligned automatically in a circumferential direction.

In some embodiments, the grass trimmer includes a line breaking device for cutting off the cutting line automatically in the auto-winding mode.

In some embodiments, the line breaking device includes a line breaking element, the trimming head is able to rotate relative to the line breaking element, and in the auto-winding mode, the trimming head drives the cutting line to pass the line breaking element so as to cut off the cutting line.

In some embodiments, the line breaking device includes a line breaking element, the trimming head and the line breaking element are rotated synchronously, and in the auto-winding mode, the trimming head drives the cutting line to close to the line breaking element so as to cut off the cutting line.

In some embodiments, the grass trimmer has a cutting mode, in the cutting mode, the trimming head and the line breaking element are rotated synchronously, the trimming head is rotated in a first direction in the cutting mode, and one of the spool and the line holding member is rotated relative to the other in a second direction in the auto-winding mode.

In some embodiments, the driving mechanism is in a first driving state in the cutting mode and in a second driving state in the auto-winding mode, the first driving state is different from the second driving state.

In some embodiments, the motor is rotated forwardly in the cutting mode and rotated reversely in the auto-winding mode.

In some embodiments, the motor is rotated at a first speed in the cutting mode and rotated at a second speed in the auto-winding mode, the first speed is different from the second speed.

In some embodiments, the motor is rotated forwardly at a higher first speed in the cutting mode and rotated reversely at a lower second speed in the auto-winding mode.

In some embodiments, a ratio between the first speed and the second speed is greater than or equal to 5 and less than or equal to 300.

In some embodiments, the grass trimmer includes: a detecting device being capable of detecting a physical parameter for determining whether the winding of the cutting line is finished, a controller for controlling the motor so as to make the grass trimmer exit the auto-winding mode according to electric signal of the detecting device.

In some embodiments, the detecting device is connected electrically with the motor to detect current of the motor.

In some embodiments, the controller cuts off the power of the motor when the current of the motor is greater than a preset value.

In some embodiments, the controller cuts off the power of the motor when the current slope of the motor is greater than a preset value.

In some embodiments, the grass trimmer includes a magnetic element mounted on one of the spool and the line holding member, and the detecting device comprises a Hall sensor for detecting the magnetic element, wherein the controller determines the rotation speed of the magnetic element according to a signal of the Hall sensor, when the rotation speed of the magnetic element reaches a preset value, the grass trimmer exits the auto-winding mode.

In some embodiments, the grass trimmer includes a magnetic element mounted on one of the spool and the line holding member, and the detecting device comprises a Hall sensor for detecting the magnetic element, wherein the controller determines the rotation number of the magnetic element according to a signal of the Hall sensor, when the rotation number of the magnetic element reaches a preset value, the grass trimmer exits the auto-winding mode.

In some embodiments, the detecting device detects the rotation speed of the motor, and when the rotation speed of the motor reaches a preset value, the power of the motor is cut off.

In some embodiments, the detecting device detects the rotation number of the motor, and when the rotation number of the motor reaches a preset value, the power of the motor is cut off.

In some embodiments, the detecting device includes a position sensor for detecting the position of the cutting line.

Embodiments of the disclosure provide an operating method for winding a cutting line of a grass trimmer, comprising: providing the grass trimmer, the grass trimmer comprising a spool allowing the cutting line to be wound thereon, a line holding member being formed with a line holding structure allowing the cutting line to pass through or bypass and a motor being capable of driving at least one of the spool and the line holding member; making the cutting line pass through or bypass the line holding member and insert in the spool; and starting the motor to make the spool and the line holding member rotate relatively.

In some embodiments, the operating method further includes: switching off the motor to make the spool and the line holding member be relatively static.

In some embodiments, the motor can be started through operating an operating element disposed on the grass trimmer.

In some embodiments, the operating method further includes: switching off the motor to make the spool and the line holding member be relatively static, wherein the motor can be started through triggering an operating element disposed on the grass trimmer, and the motor can be switched off through releasing the operating element.

In some embodiments, the operating method further includes: switching off the motor to make the spool and the line holding member be relatively static, wherein the motor can be started through triggering an operating element disposed on the grass trimmer, and the motor can be switched off through triggering another operating element disposed on the grass trimmer.

In some embodiments, the operating method further includes: switching off the motor to make the spool and the line holding member be relatively static, wherein the motor can be started through triggering an operating element disposed on the grass trimmer, and the motor can be switched off through triggering the operating element again.

Embodiments of the disclosure provide an operating method for winding a cutting line of a grass trimmer, comprising: making the cutting line pass through or bypass a line holding member disposed on the grass trimmer and insert in a spool disposed on the grass trimmer; and starting a motor to make the spool and the line holding member rotate relatively.

Embodiments of the disclosure provide a control method for controlling winding of a cutting line of a grass trimmer, wherein the grass trimmer comprises: a spool allowing the cutting line to be wound thereon; a line holding member being formed with a line holding structure allowing the cutting line to pass through or bypass; and a motor being capable of driving at least one of the spool and the line holding member to make the spool and the line holding member rotate relatively, wherein the control method comprises: supplying power to the motor to make the spool and the line holding member rotate relatively.

In some embodiments, the grass trimmer supplies power to the motor when it is operated by a user.

In some embodiments, the motor is supplied power when an operating element disposed on the grass trimmer is triggered.

In some embodiments, the grass trimmer stops supplying power to the motor when an operating element disposed on the grass trimmer is released.

In some embodiments, the grass trimmer stops supplying power to the motor when another operating element disposed on the grass trimmer is triggered.

In some embodiments, the grass trimmer stops supplying power to the motor when the operating element is triggered again.

In some embodiments, the grass trimmer stops supplying power to the motor when the load slope of the motor is greater than a preset value.

In some embodiments, the power supplying of the motor lasts for a preset time.

In some embodiments, the motor is supplied different power so that the spool and the line holding member are rotated at a first relative speed and a second relative speed respectively.

In some embodiments, the first relative speed is less than a rotation speed of the spool when the grass trimmer cuts vegetation.

In some embodiments, the second relative speed is less than a rotation speed of the spool when the grass trimmer cuts vegetation.

The advantages of the present disclosure is that the grass trimmer has an auto-winding mode, and the cutting line can be automatically wound to the spool under the action of the motor.

BRIEF DESCRIPTION OF THE DRAWINGS

FIG. 5C is a schematic view of the trimming head and the first housing in FIG. 5B, wherein the trimming head and the first housing are separated.

FIG. 5O is an exploded view of the damping device in FIG. 5A.

Figure 15A:
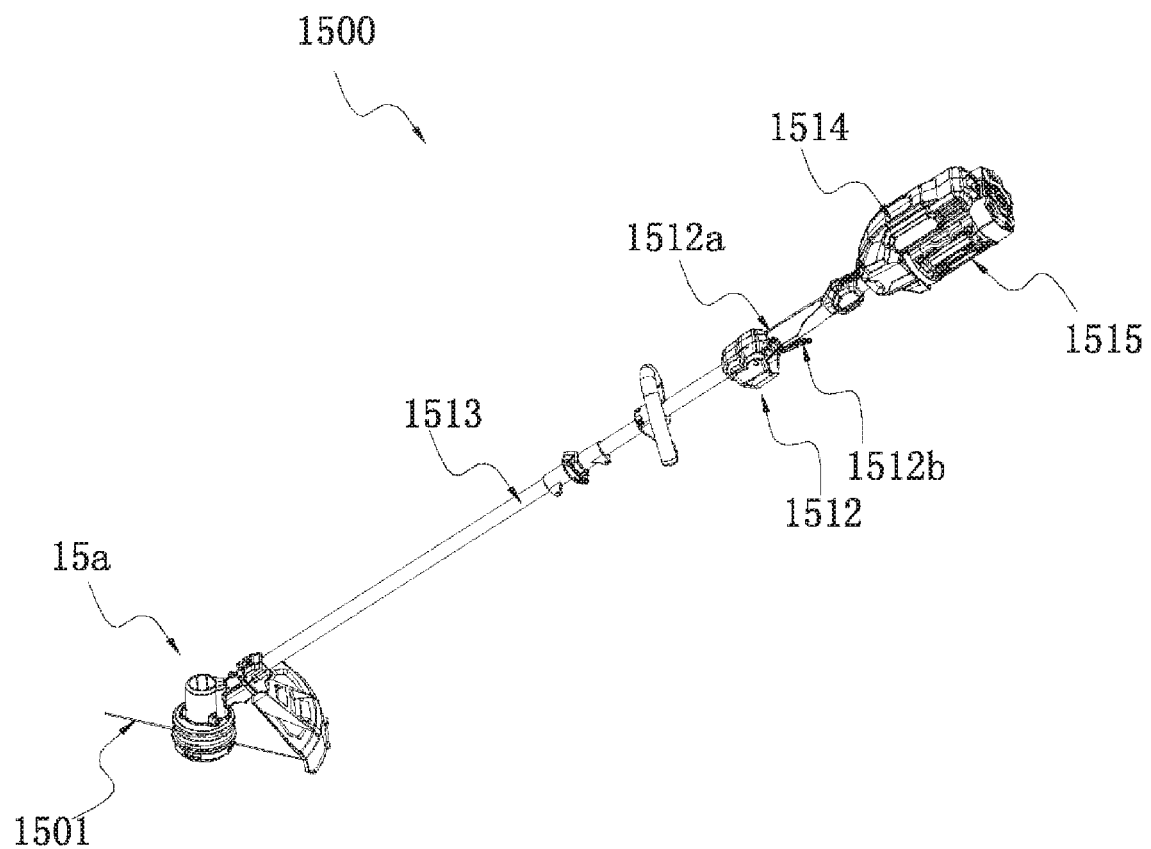
FIG. 15A is a schematic view of a grass trimmer as still another embodiment.
Figure 15B:
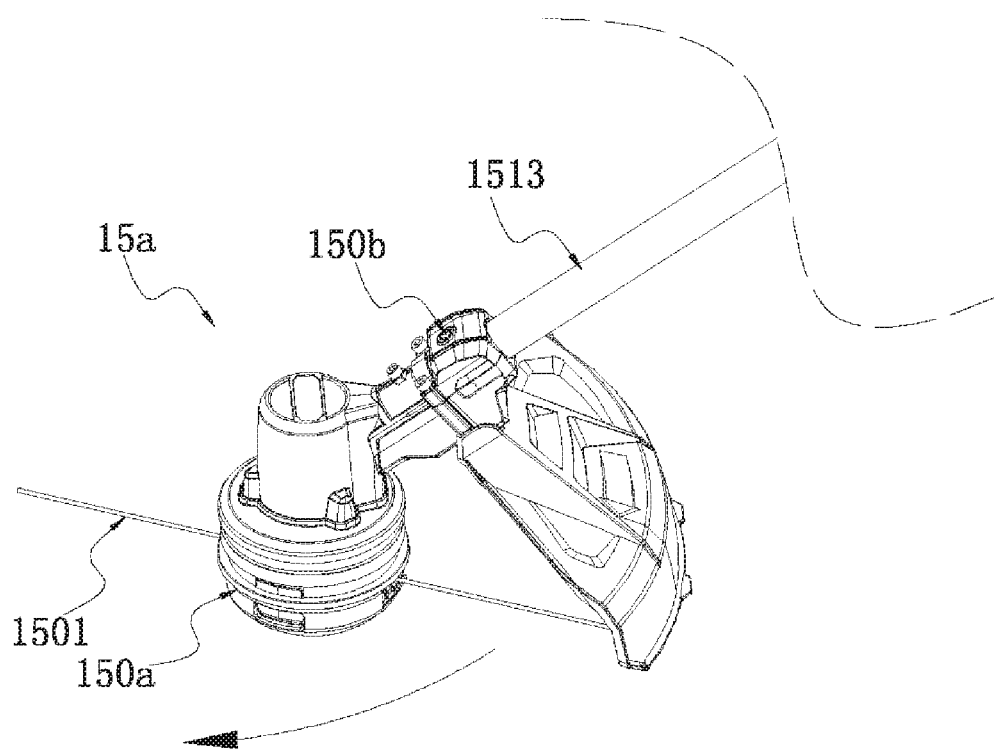
FIG. 15B is an enlarged view of a portion of the grass trimmer of FIG. 15A.
Figure 15C:
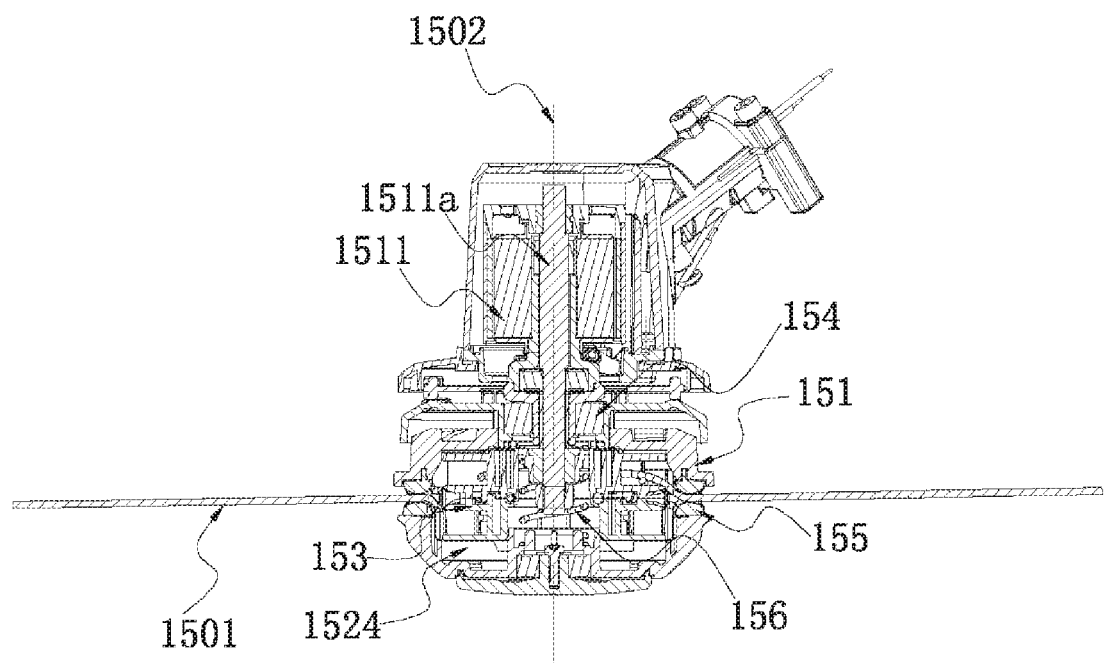
FIG. 15C is a cross-sectional view showing a portion of the grass trimmer of FIG. 15A.
Figure 15D:
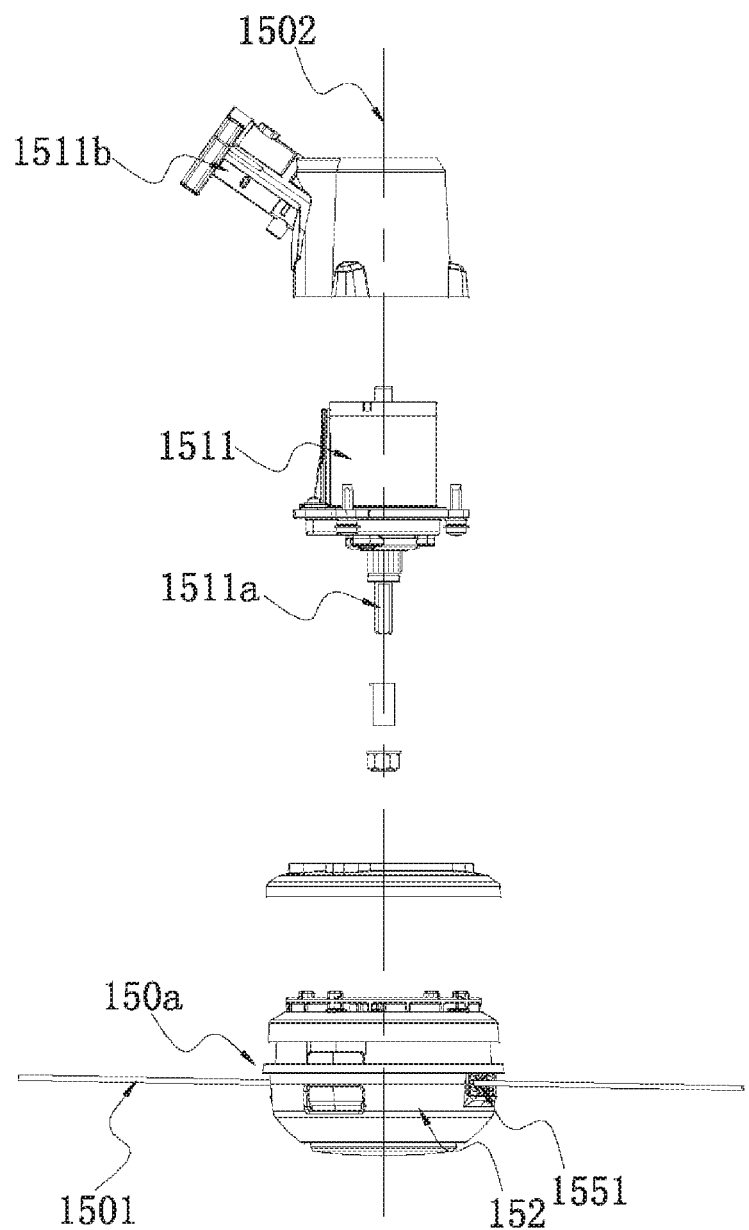
FIG. 15D is an exploded view of the structure shown in FIG. 15C.
Figure 15E:
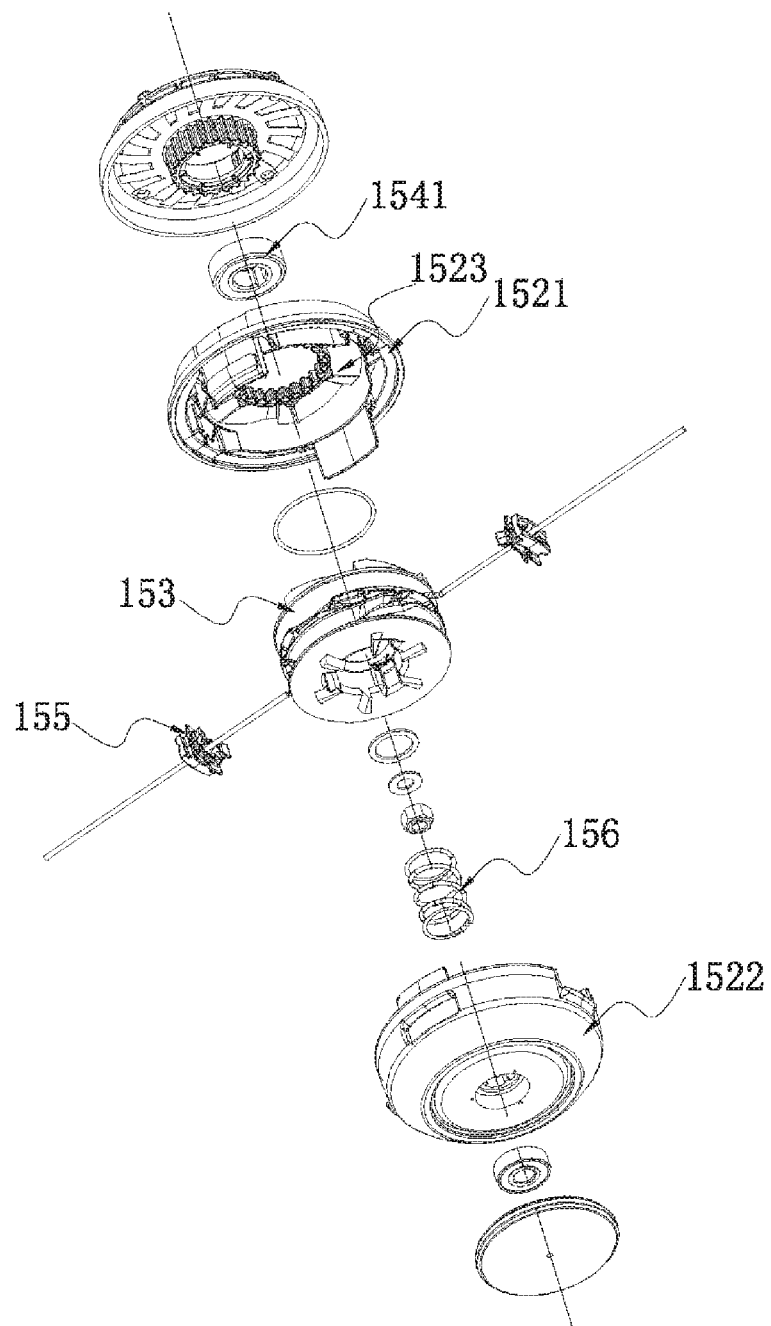
FIG. 15E is an exploded view of a trimming head of FIG. 15A.
Figure 15F:
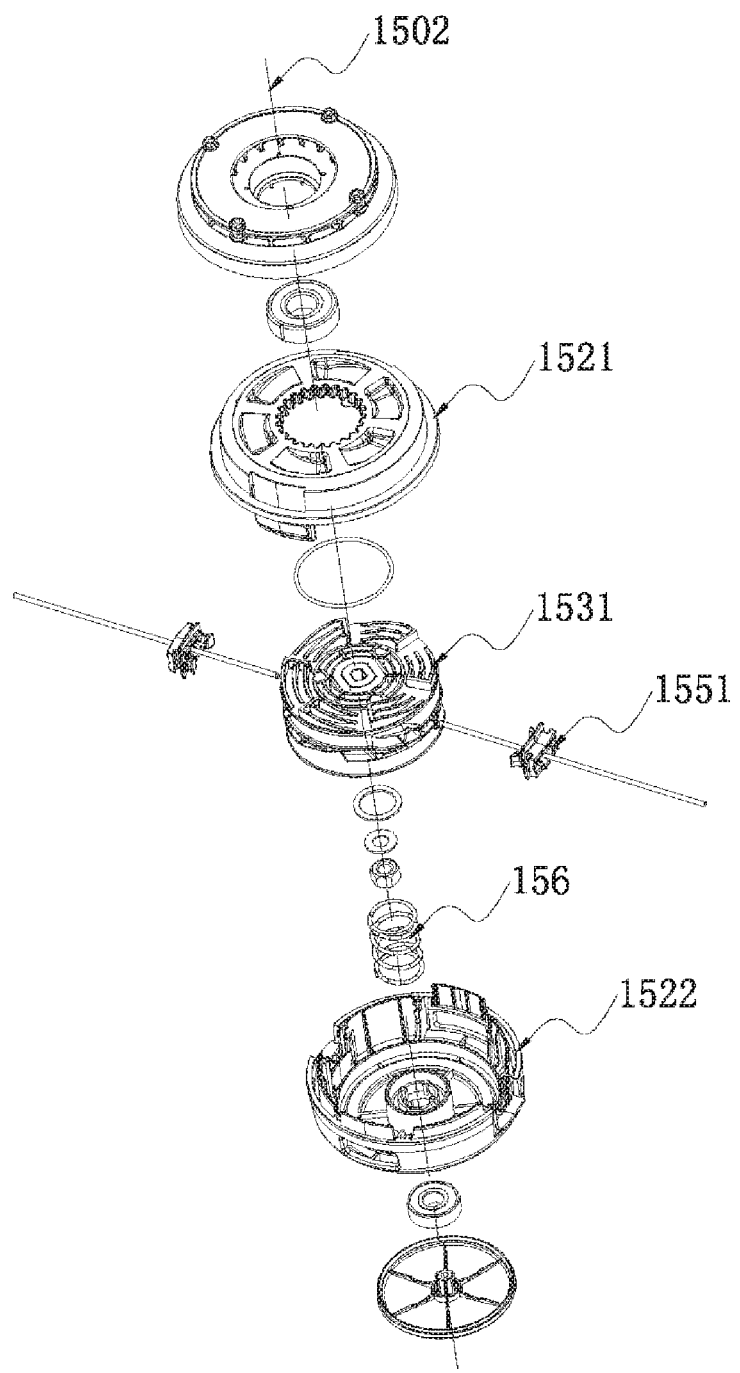
FIG. 15F is another exploded view of the trimming head of FIG. 15A.
Figure 15G:
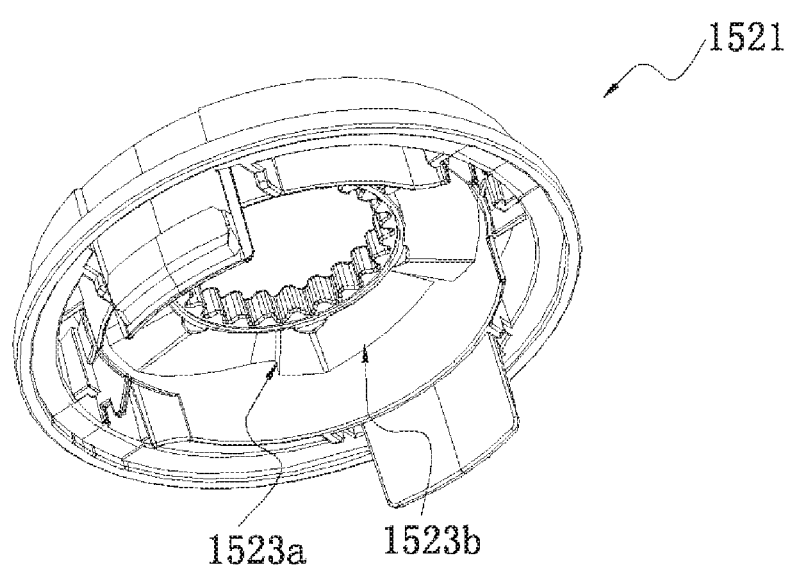
FIG. 15G is a perspective view of an upper housing of FIG. 15E.
Figure 15H:
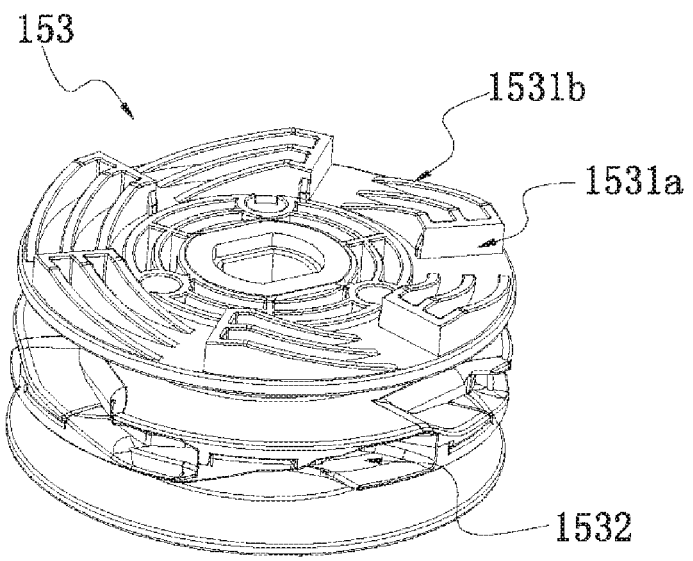
FIG. 15H is a perspective view of a spool of FIG. 15E.
Figure 15I:
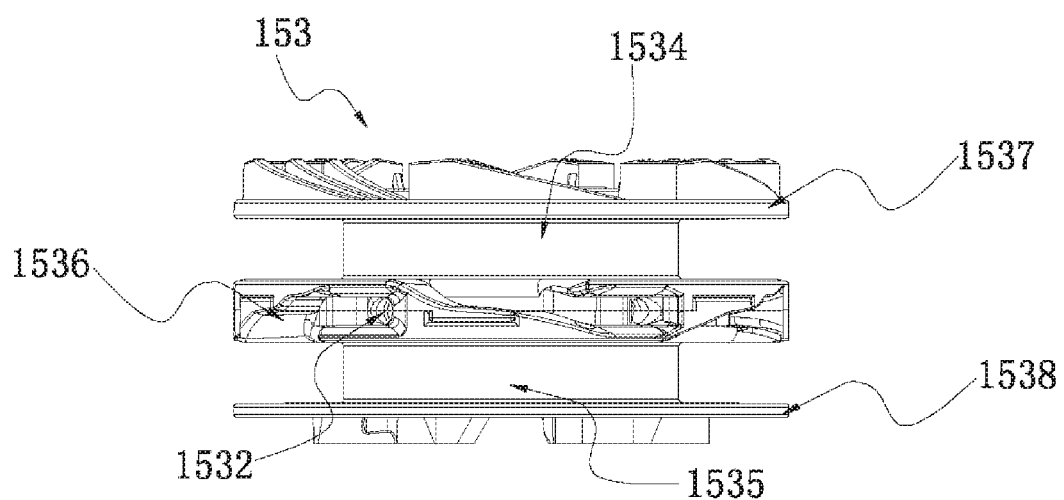
FIG. 15I is a plan view of the spool of FIG. 15E.
Figure 15J:
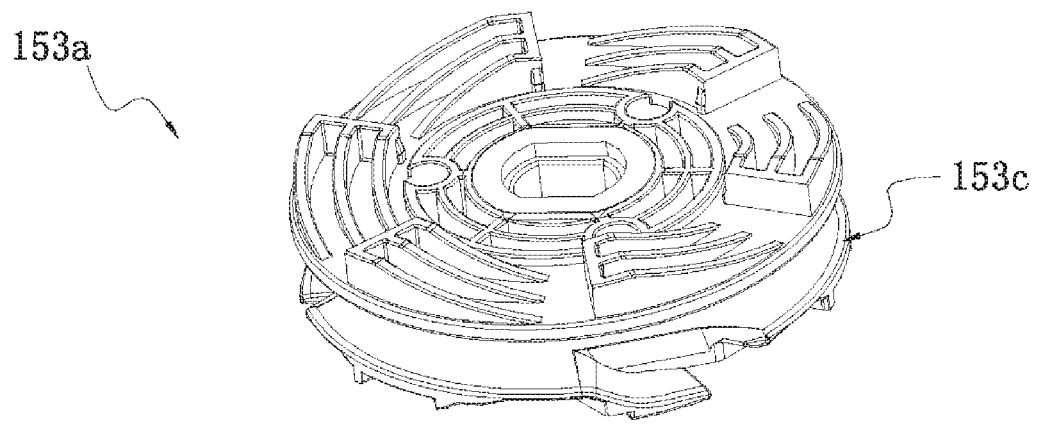
FIG. 15J is a perspective view of an upper spool of FIG. 15I.
Figure 15K:
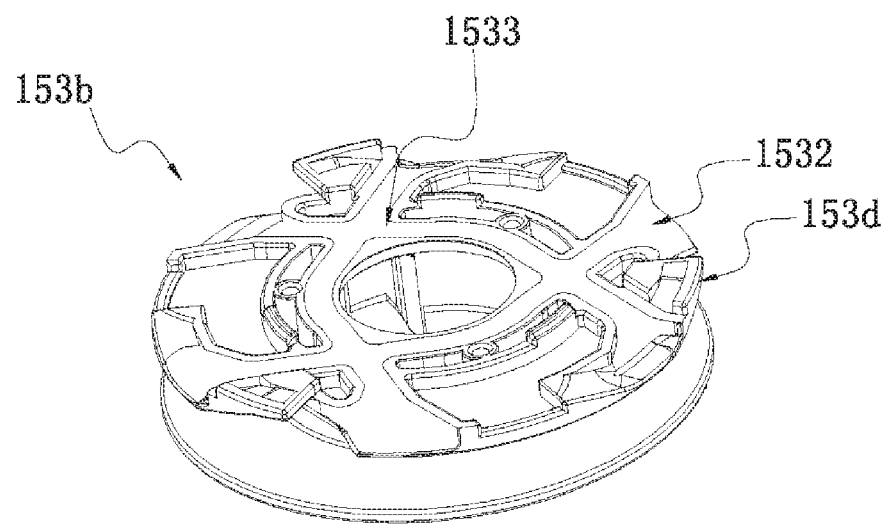
FIG. 15K is a perspective view of a lower spool of FIG. 15I.
Figure 15L:
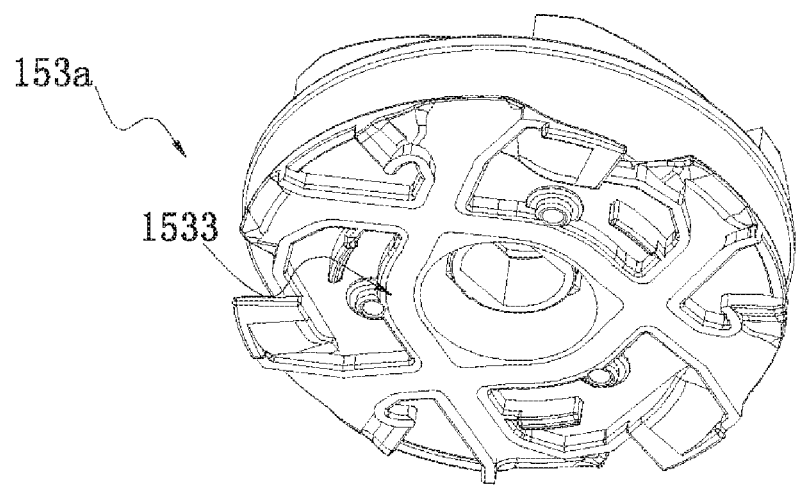
FIG. 15L is another perspective view of the upper spool of FIG. 15I.
Figure 15M:
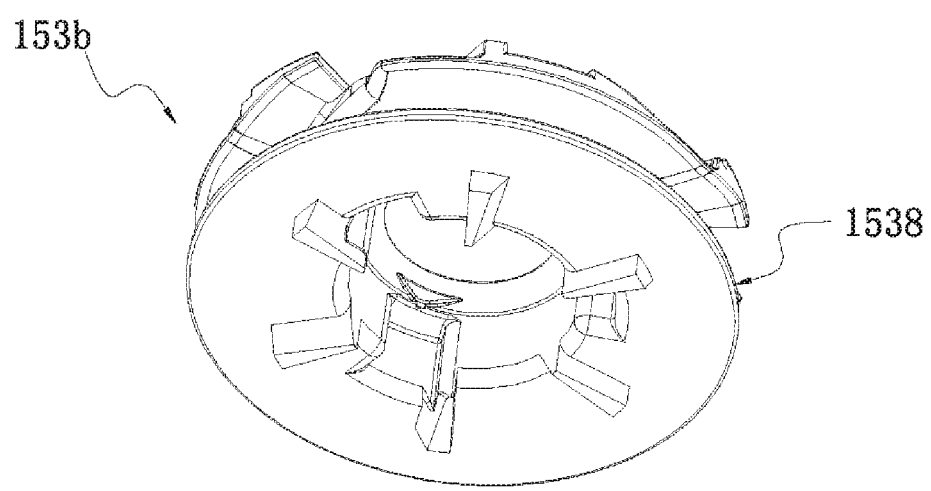
FIG. 15M is another perspective view of the lower spool of FIG. 15I.
Figure 15N:
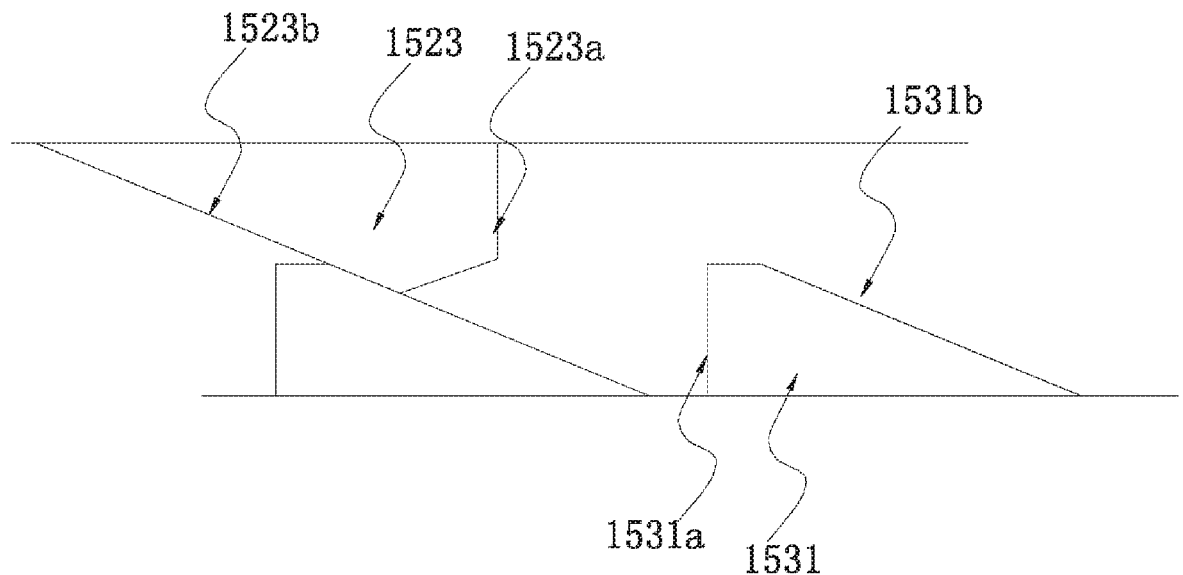

15N is a schematic view of a first engaging tooth and a first matching tooth in FIG. 15E contacting each other.

Figure 15O:
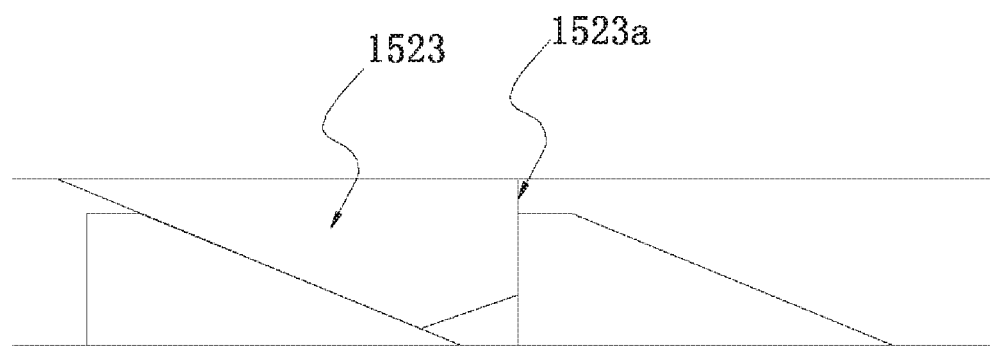

FIG. 15O is a schematic view of the first engaging tooth and the first matching tooth of FIG. 15E when a first positioning surface and a second positioning surface are in contact.

Figure 15P:
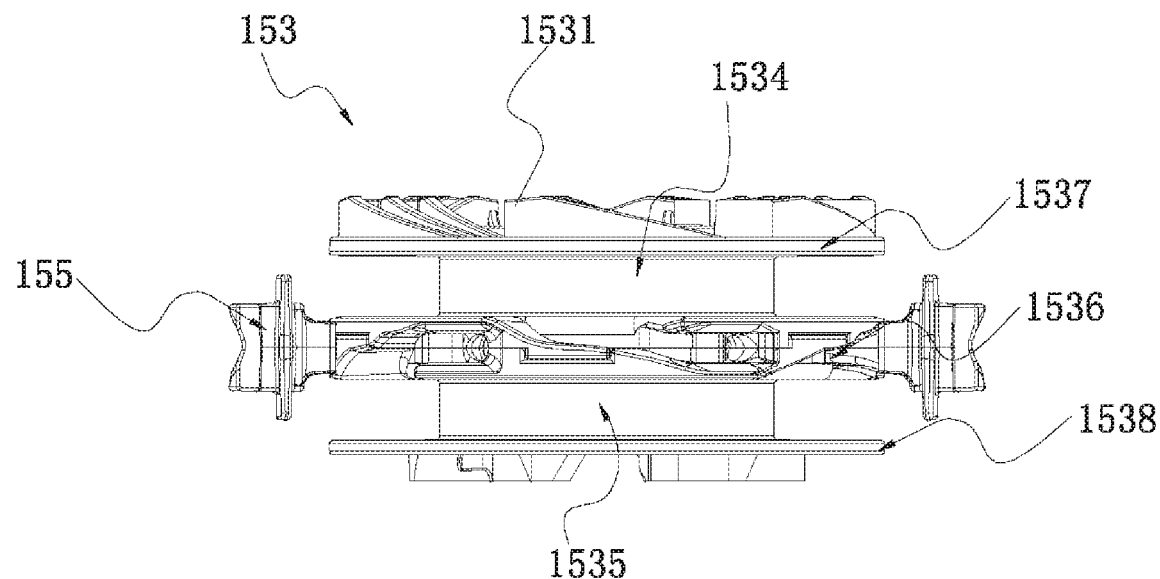

FIG. 15P is a plan view of the spool and eyelet members of FIG. 15E.

Figure 15Q:
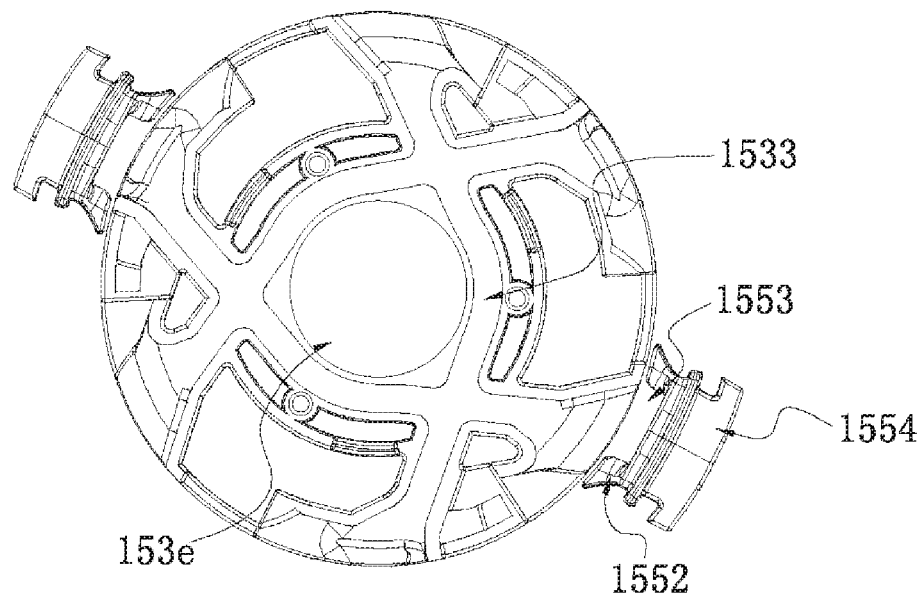

FIG. 15Q is a plan view of the lower spool and the eyelet members of FIG. 15E.

Figure 15R:
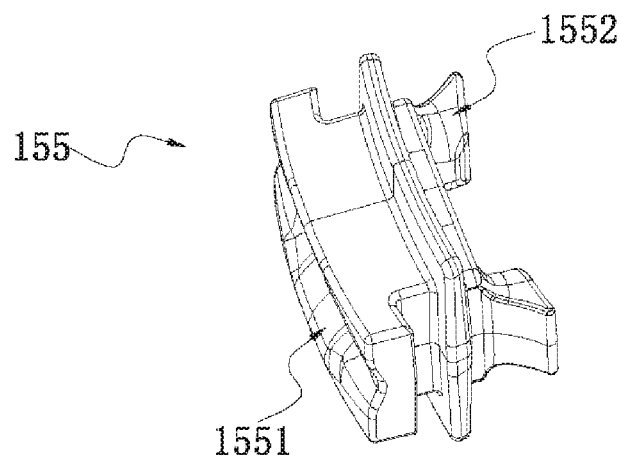

FIG. 15R is a perspective view of one of the eyelet members of FIG. 15E.

Figure 15S:
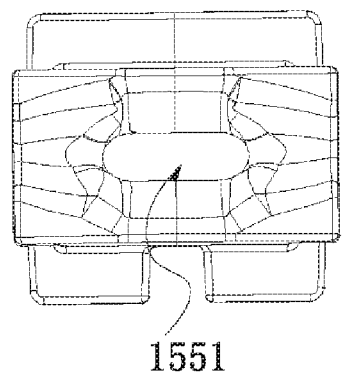

FIG. 15S is a plan view of one of the eyelet members of FIG. 15R.

Figure 15T:
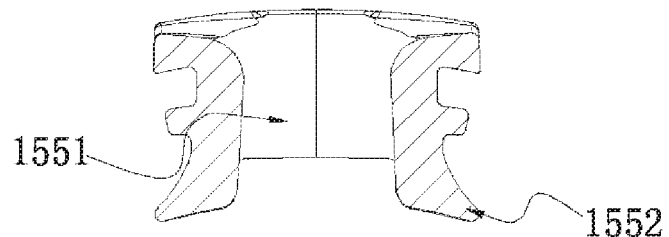

FIG. 15T is a cross-sectional view of one of the eyelet members of FIG. 15R.

DETAILED DESCRIPTION

The following description of the preferred embodiments is merely exemplary in nature and is in no way intended to limit the scope of the disclosure hereinafter claimed, its application, or uses.

Figure 1A:
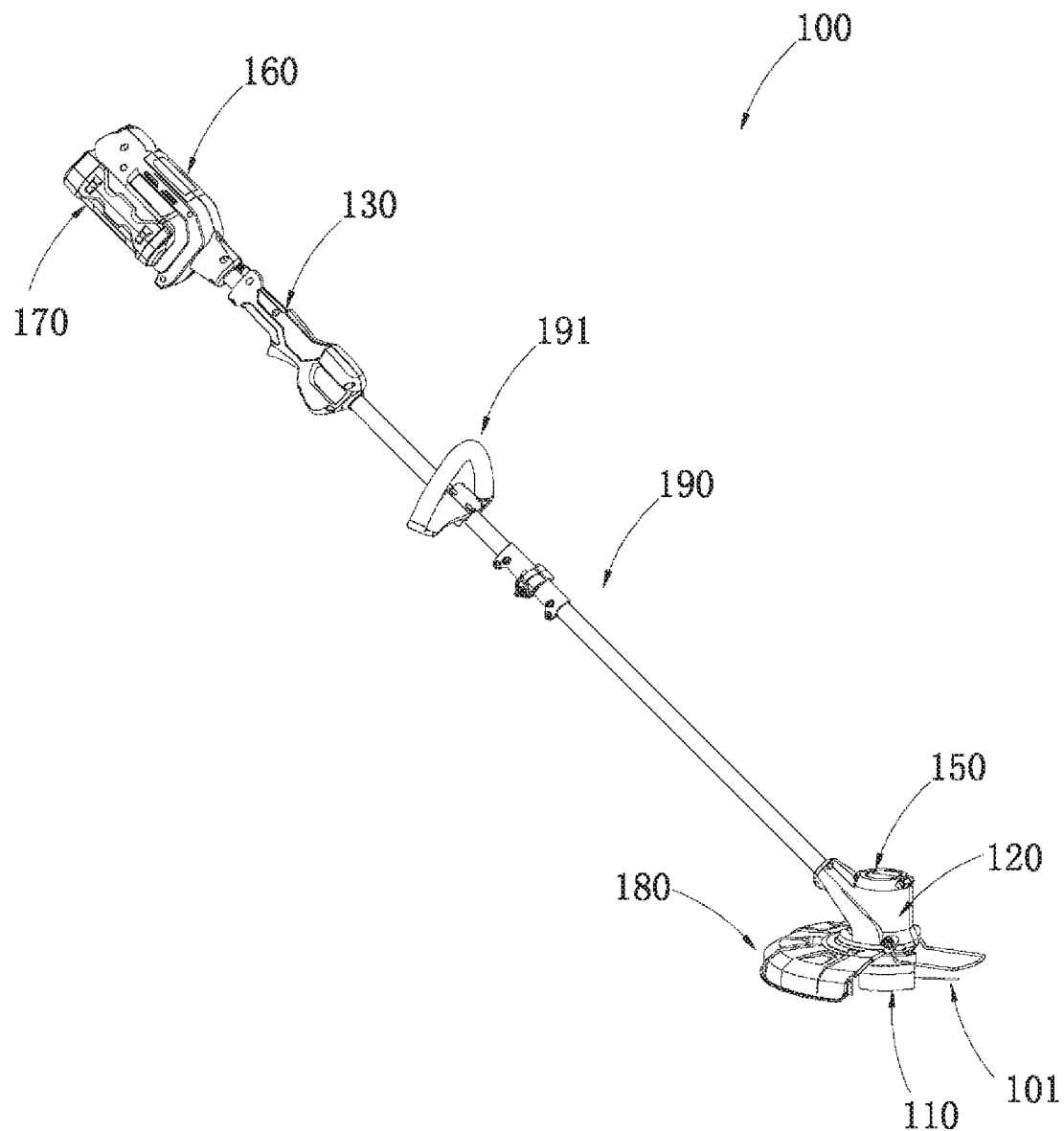
FIG. 1A is a schematic view of an exemplary grass trimmer.
Figure 1B:
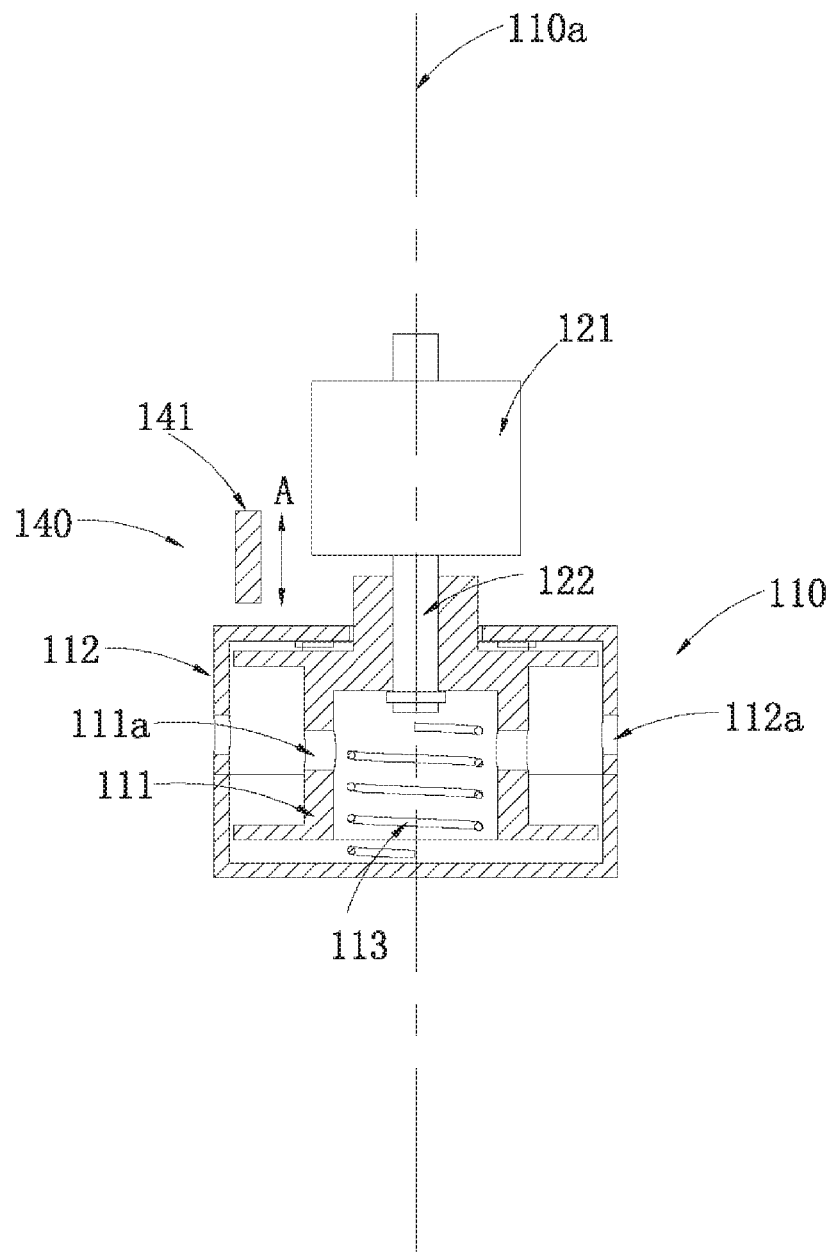
FIG. 1B a schematic view showing the structure of a part of the grass trimmer in FIG. 1A.
Figure 1C:
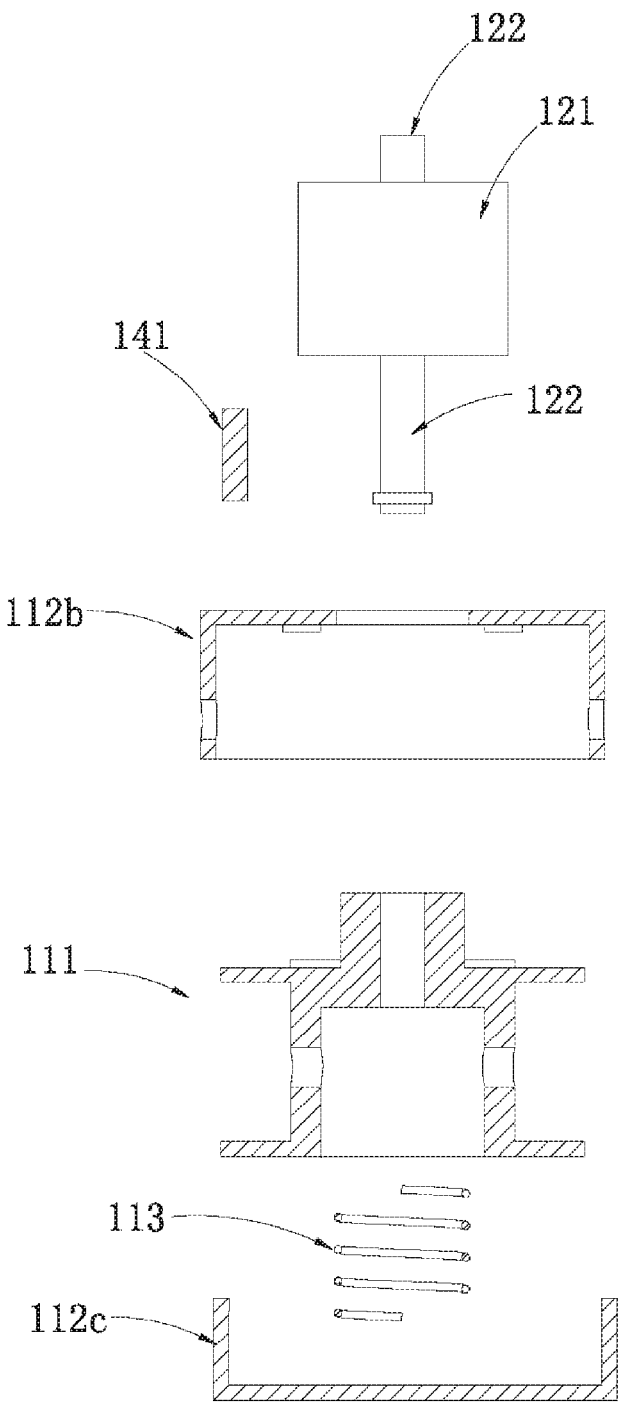
FIG. 1C is an exploded view of the structure in FIG. 1B.

Referring to FIGS. 1A-1C, a grass trimmer 100 includes a trimming head 110, a driving device 120 and an operating device 130.

The trimming head 110 is configured to mount and accommodate a cutting line 101. The cutting line 101 is partially accommodated in the trimming head 110. The cutting line 101 has a part extending out of the trimming head 110 which is used to cut vegetation when the trimming head 110 is rotated.

The driving device 120 is able to drive the trimming head 110 to rotate about an axis 110a so as to cut vegetation. The operating device 130 is used for a user to control the grass trimmer 100.

Specifically, the driving device 120 includes a motor 121 and a driving shaft 122. The driving shaft 122 is connected with the trimming head 110 so as to drive the trimming head 110 to rotate.

The grass trimmer 100 further includes a first housing 150, a second housing 160 and a battery pack 170. The first housing 150 is configured to mount and accommodate the motor 121. The battery pack 170 acting as a power source at least can supply power to the grass trimmer 100. The second housing 160 is configured to engage with the battery pack 170 detachably.

A circuit board is accommodated in the second housing 160, which is connected with the motor 121 electrically so that the battery pack 170 can supply power to the motor 121 and control the motor 121. The first housing 150 and the second housing 160 are connected with each other through a connecting rod assembly 190. The operating device 130 is fixedly mounted on the connecting rod assembly 190. The grass trimmer 100 further includes an auxiliary handle 191 for the user to grip which is fixedly mounted on the connecting rod assembly 190.

The trimmer head 110 includes a spool 111 and a head housing 112. The spool 111 is accommodated in the head housing 112 for winding the cutting line 101. The spool 111 is formed with an inner aperture 111a. The head housing 112 is formed with an outer aperture 112a. As an example, the head housing 112 includes an upper cover 112b and a lower cover 112c, so that the head housing 112 is easy to assemble with the spool 111 and it is easy for the user to open the head housing 112 to check the inside of the head housing 112.

The trimmer head 110 includes a spring 113 which can apply a force between the head housing 112 and the spool 111. The force applied by the spring 113 makes the spool 111 depart from the lower cover 112c.

When it is needed to mount a new cutting line 101, the inner aperture 111a and the outer aperture 112a are aligned, and then the cutting line 101 is passed through the outer aperture 112a and entered into the inner aperture 111a. At this moment, as long as the spool 111 is moved relative to the head housing 112, the cutting line 101 can be wound on the spool 111 under the limiting action of the outer aperture 112a. The driving shaft 122 is connected with the head housing 112, which can drive the spool 111 to rotate about the axis 110a directly.

The spool 111 is connected rotatably with the head housing 112, which can rotate relative to the head housing 112. Meanwhile, the head housing 112 is able to move relative to the spool 111 in a direction parallel to the axis 110a.

Figure 1D:
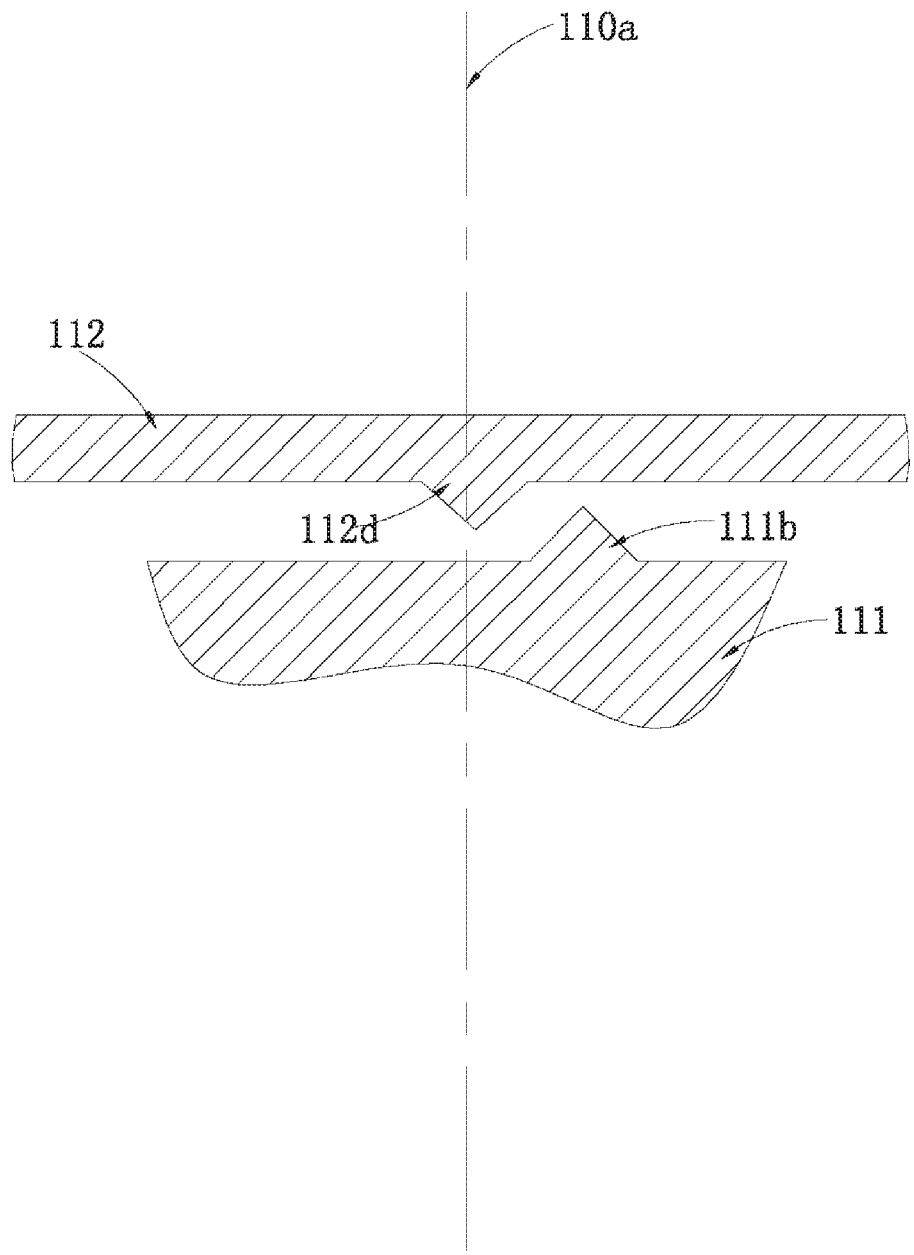
FIG. 1D is a schematic view showing the transmission of a spool and a head housing in FIG. 1B.

As shown in FIG. 1D, the spool 111 is provided with a first circumferential structure 111b, and the head housing 112 is provided with a second circumferential structure 112d. Under the action of the spring 113, the spool 111 can move upward so that the first circumferential structure 111b is engaged with the second circumferential structure 112d. Thus, the spool 111 can be rotated synchronously with the head housing 112. It is noted that, the first circumferential structure 111b and the second circumferential structure 112d have a transmitting surface therebetween which is obliquely inclined with the axis 110a.

When the first circumferential structure 111b and the second circumferential structure 112d are engaged with each other, the user can start the motor 121 to make the grass trimmer 100 be in a cutting mode. At this moment, if the cutting line 101 wound on the spool 111 is sufficiently long, a part of the cutting line 101 exposed out of the head housing 112 can cut the vegetation in a whipping action.

Referring to FIGS. 1B-1C, the grass trimmer 100 further includes a damping device 140. Specifically, the damping device 140 includes a friction element 141. The friction element 141 is connected slidably with the first housing 150 and can move along a direction A. When the friction element 141 is moved to contact with the head housing 112, the head housing 112 tends to rotate relative to the spool 111. As the friction increases, a component force in the direction of the axis 110a is acted on the head housing 112 due to the inclined transmitting surface between the first circumferential structure 111b and the second circumferential structure 112d. The component force can overcome the spring force of the spring 113 sufficiently to make the head housing 112 move upward, so that the first circumferential structure 111b is disengaged with the second circumferential structure 112d. Thus, the spool 111 can rotate relative to the head housing 112, and the grass trimmer 100 is in an auto-winding mode. In the auto-winding mode, the spool 111 driven by the motor 121 can rotate relative to the head housing 112 under the action of the friction element 141 so as to realize an auto-winding function.

However, when the spool 111 is wound with enough cutting line 101 and the part of the cutting line 101 exposed out of the head housing is not long enough to cut the vegetation, the spool 111 can rotate relative to the head housing 112 so as to feed the cutting line 101 automatically for cutting purposes.

In this embodiment, the function of the friction element 141 is to produce damping on the head housing 112 so as to slow down the head housing 112. Thus, the relative rotation is occurred between the head housing 112 and the spool 111. The user can operate the friction element 141 directly or indirectly to switch the grass trimmer 100 between the cutting mode and the auto-winding mode. However, the user can operate the friction element 141 in a status corresponding to the desired mode firstly, and then start the motor 121.

Figure 2A:
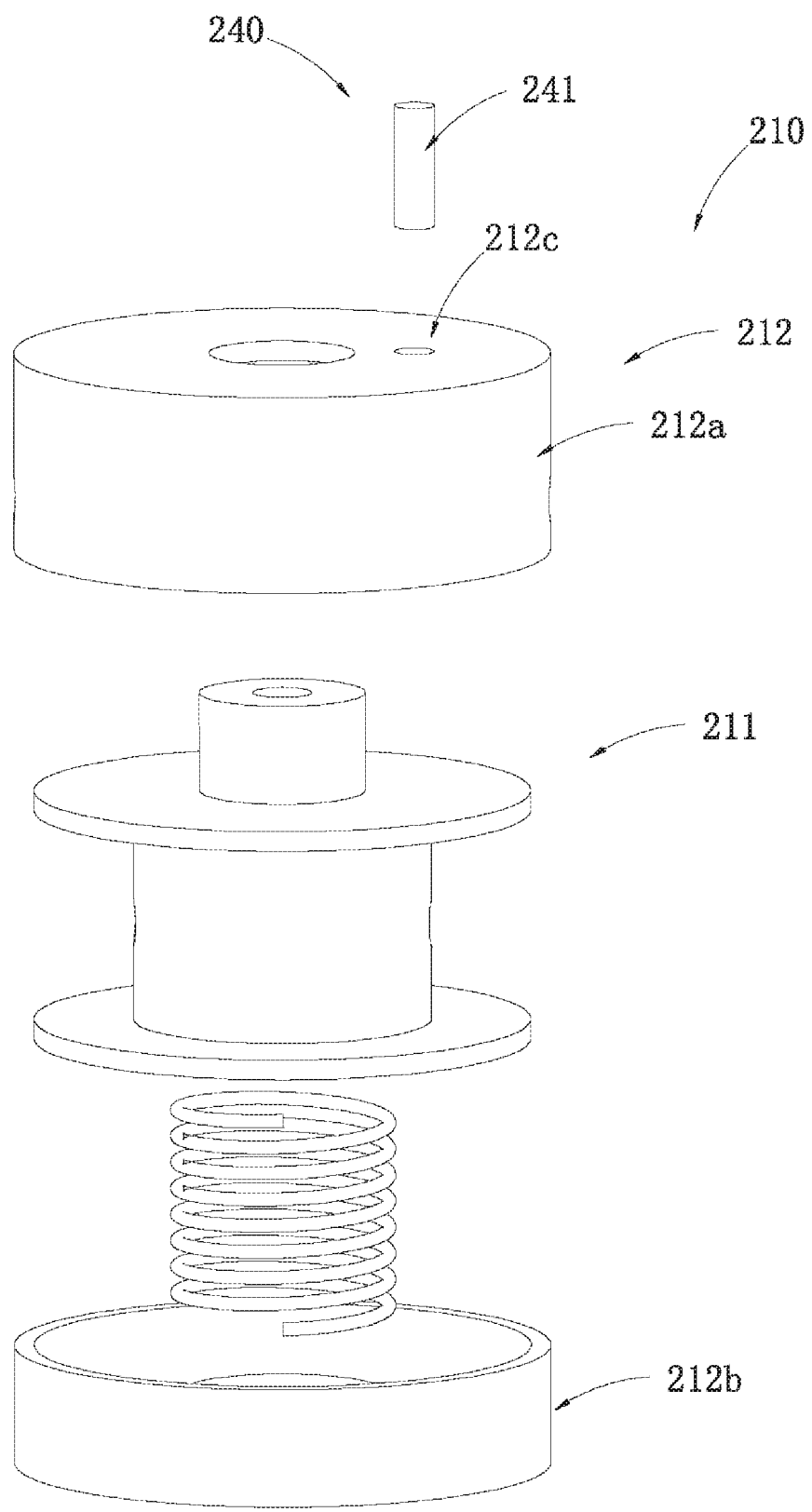
FIG. 2A is an exploded view of an exemplary trimming head and an exemplary damping device.
Figure 2B:
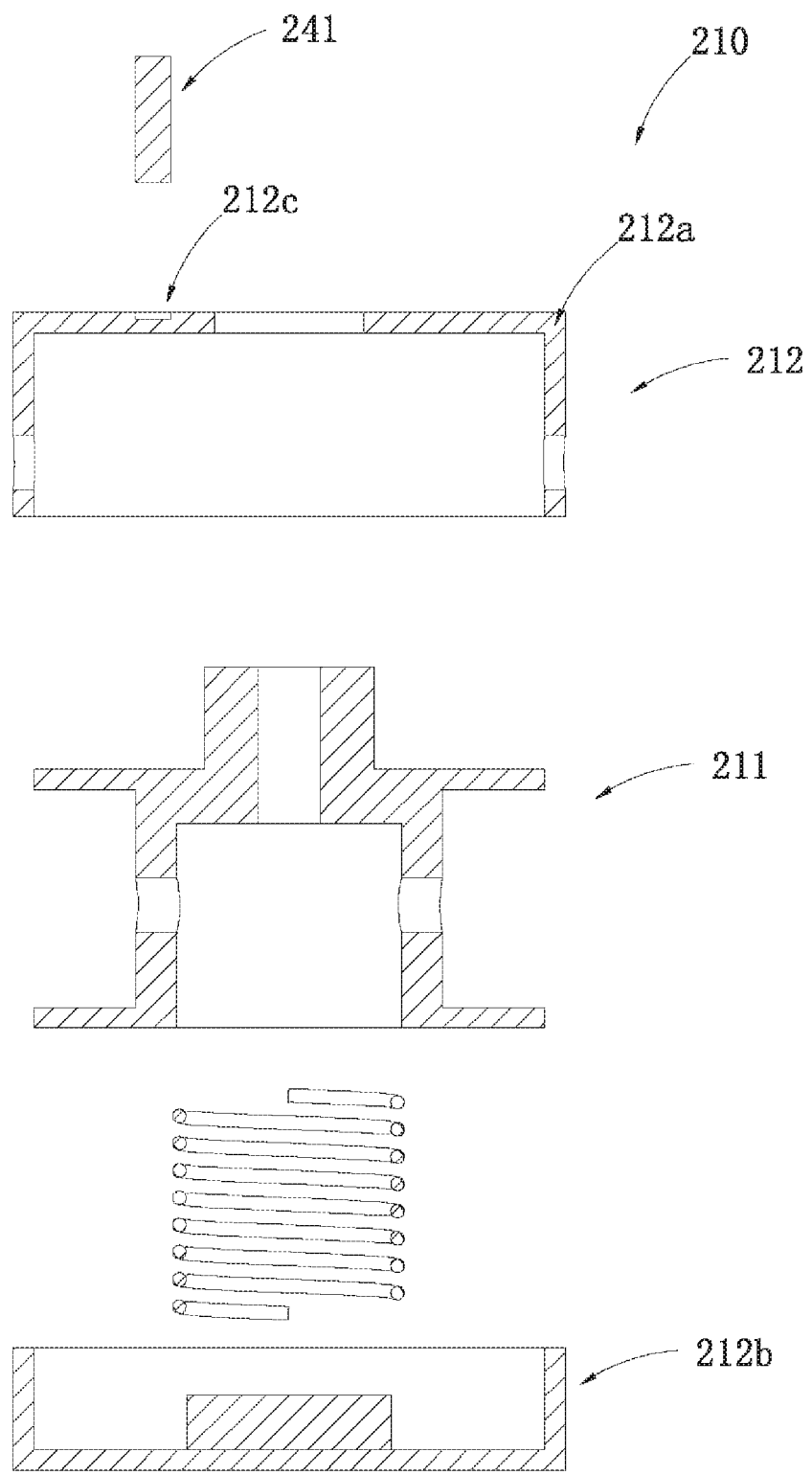
FIG. 2B is a section view of the trimming head and the damping device in FIG. 2A.

Referring to FIGS. 2A-2B, a trimming head 210 which is similar to the trimming head 110 includes a spool 211 and a head housing 212. The spool 211 and the head housing 212 are similar to the spool 111 and the head housing 112 in FIGS. 1-3. The head housing 212 includes an upper cover 212a and a lower cover 212b.

A difference between this example and the prior example is that a damping device 240 in FIGS. 2A-2B includes a stop pin 241 for stopping the head housing 212 rotating wherein the head housing 212 is formed with a stop recess 212c for engaging with the stop pin 241. Specifically, the stop recess 212c is disposed on the upper cover 212a. In the auto-winding mode, the stop pin 241 is inserted in the stop recess 212c so that the head housing 212 is stopped from rotating relative the grass trimmer. As the principle described above, the relative rotation between the spool 211 and the head housing 212 can realize the function of auto-winding.

The function of the stop pin 241 is also to damp the rotation of the head housing 212. The difference is that, the damping function of the friction element 141 is to slow down, and the damping function of the stop pin 241 is to limit the movement. Here, slowing down and limiting movement are both defined as damping. Both the friction element 141 and the stop pin 241 can be considered as a kind of the damping device.

Figure 3A:
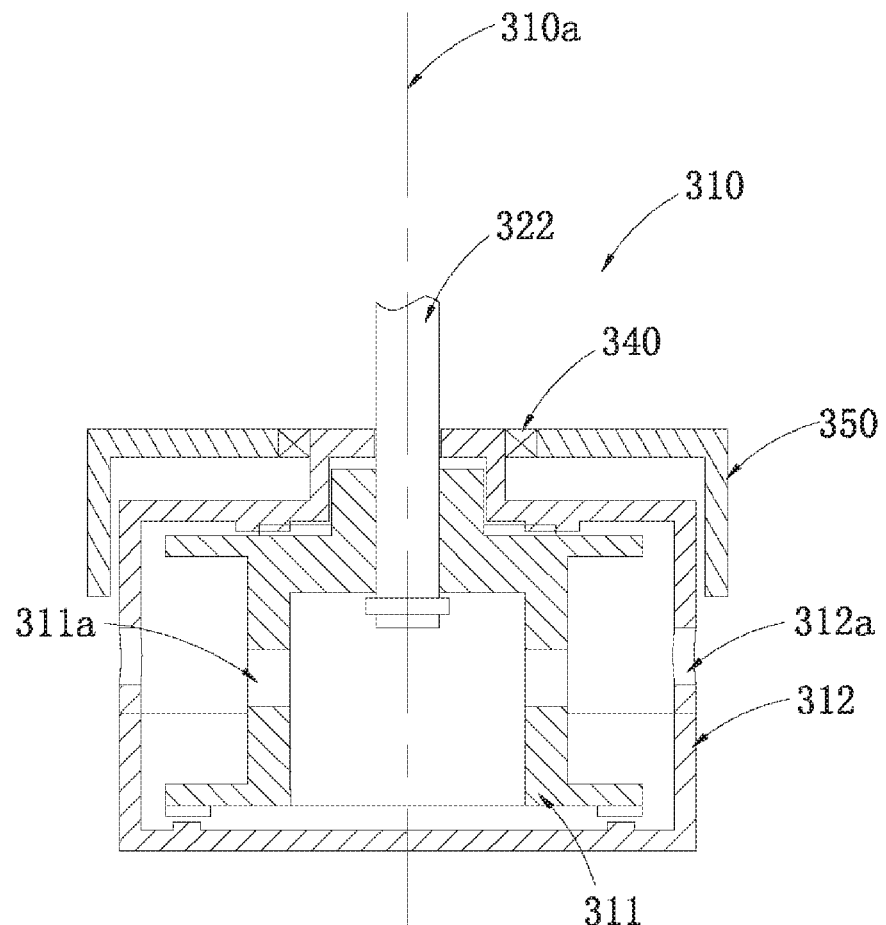
FIG. 3A is also a schematic view of an exemplary trimming head and an exemplary damping device.
Figure 3B:
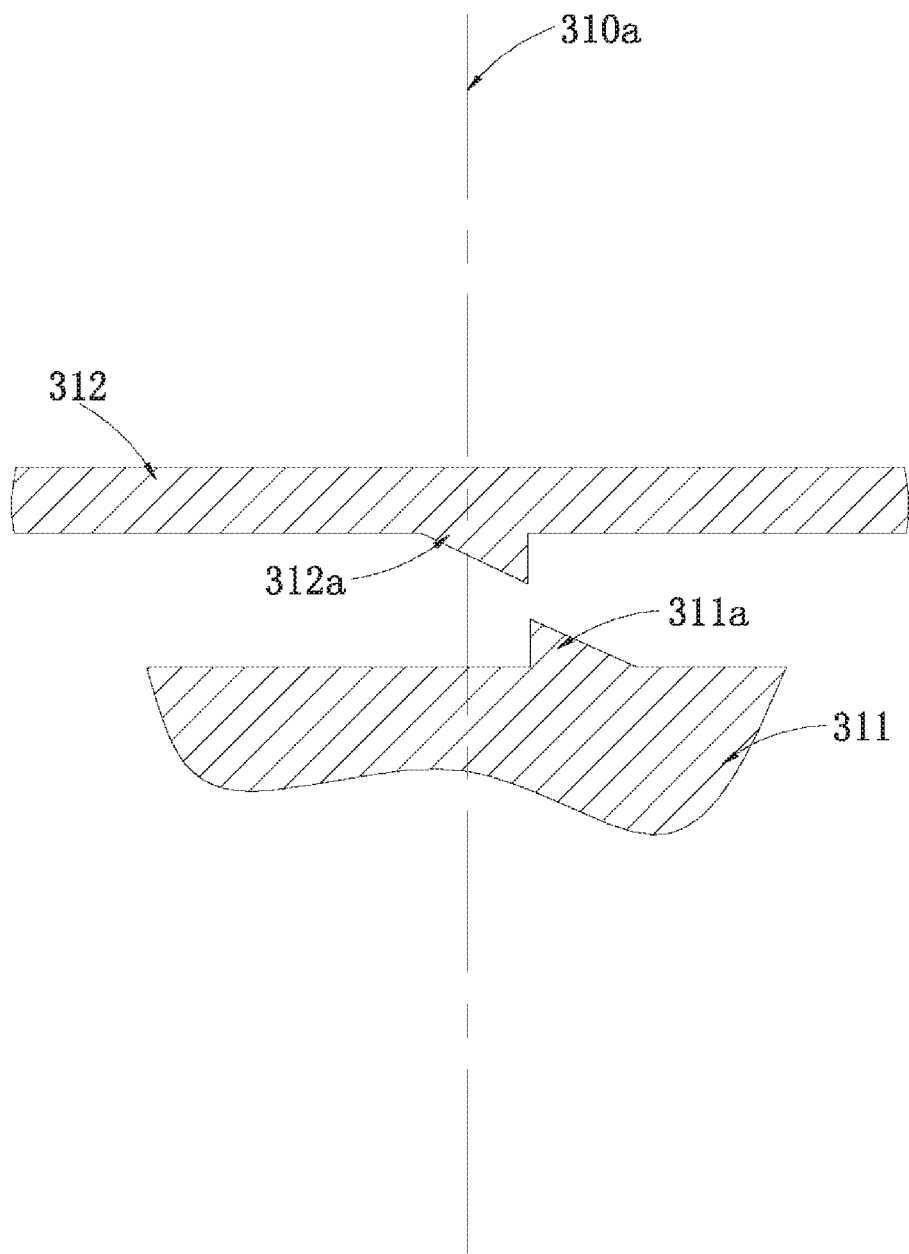
FIG. 3B is a schematic view showing the transmission of a spool and a head housing in FIG. 3A.

Referring to FIGS. 3A-3B, a trimming head 310 can be driven to rotate about an axis 310a. Specifically, the trimming head 310 includes a spool 311 and a head housing 312. The head housing 312 is formed with an outer aperture 312a allowing a cutting line to pass through. The spool 311 is formed with an inner aperture 311a.

In this example, a one-way bearing 340 and a supporting element 350 are provided. The one-way bearing 340 allows two elements or two parts connected therewith to be able to rotate relatively in one direction, but does not allow them to rotate relatively in another direction. The supporting element 350 is connected rotatably with a part of the trimming head 310 and can support the trimming head 310 rotatably. The supporting element 350 may be a first housing for accommodating a motor or a component connected with the first housing fixedly, for example a trimming guard.

More specifically, the one-way bearing 340 is disposed between the supporting element 350 and the head housing 312, so that the supporting element 350 is able to rotate unidirectionally relative to the head housing 312. Taking the supporting element 350 as a reference, the head housing 312 can rotate in one direction and cannot rotate in another direction.

A driving shaft 322 is connected fixedly with the spool 311, so that the spool 311 can rotate relative to the supporting element 350 in two directions. Taking the supporting element 350 as a reference, the spool 311 can rotate forwardly and reversely.

Similar to the foregoing examples, the spool 311 is provided with a first circumferential structure 311a, and the head housing 312 is provided with a second circumferential structure 312a which is able to engage with the first circumferential structure 311a. The difference is that at least one of the transmitting surfaces of the first circumferential structure 311a and the second circumferential structure 312a is substantially parallel to the axis 310a. Thus, when the first circumferential structure 311a and the second circumferential structure 312a are rotated in a direction, they cannot disengage with each other.

Based on the arrangement described above, when the motor is rotated in a forward direction, the spool 311 is driven by the driving shaft 322 to rotate forwardly. At this moment, the torque is transmitted through the transmitting surfaces of the first circumferential structure 311a and the second circumferential structure 312a which are substantially parallel to the axis 310a. Meanwhile, the one-way bearing 340 allows the head housing 312 to be able to rotate forwardly relative to the supporting element 350, i.e. the grass trimmer. So, the spool 311 is rotated synchronously with the head housing 312, and the grass trimmer performs the cutting mode. When the motor is rotated in a reverse direction, the spool 311 is driven by the driving shaft 322 to rotate reversely. The head housing 312 is stopped from rotating reversely by the one-way bearing 340, so that a relative rotation is created between the spool 311 and the head housing 312. At this moment, the first circumferential structure 311a and the second circumferential structure 312a are disengaged with each other because their contacting surfaces are inclined surfaces. The first circumferential structure 311a and the second circumferential structure 312a cannot stop the relative rotation between the spool 311 and the head housing 312 thoroughly, so the relative rotation is created continuously and the grass trimmer performs the auto-winding mode.

The function of the one-way bearing 340 is similar to the stop pin 241 which is to stop the head housing 312 from rotating. So, the one-way bearing 340 can be considered as a kind of the damping device. The difference in the examples is that the friction element 141 and the stop pin 241 are needed to be operated or activated whereas the one-way bearing 340 can realize the damping function in response to a change in the driving direction of the motor. Thereby, the mechanical structure for activating the auto-winding mode is simplified. The auto-winding mode and the cutting mode can be switched therebetween by means of controlling the forward and revers rotation of the motor.

Figure 4A:
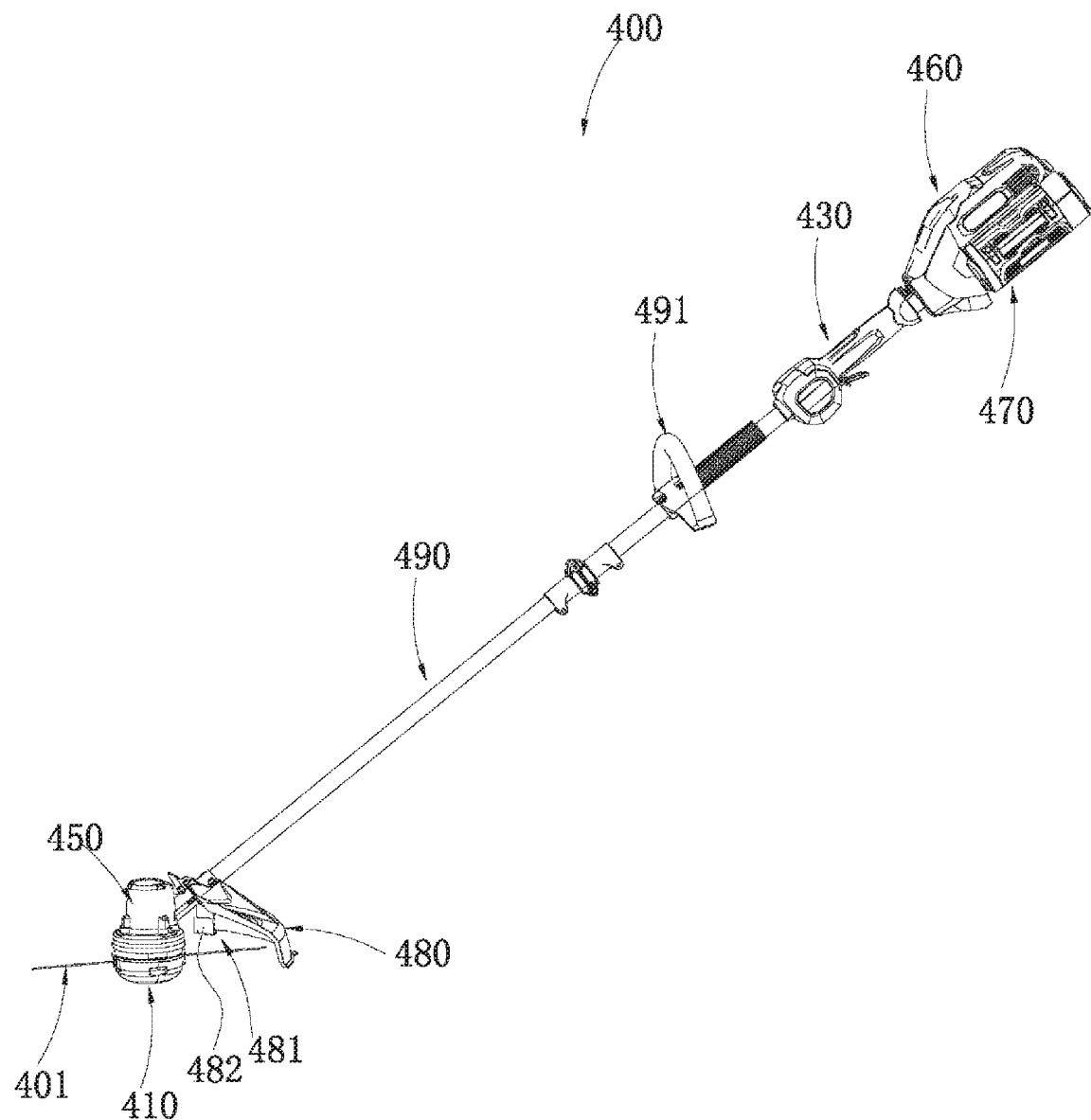
FIG. 4A is also a schematic view of an exemplary grass trimmer.
Figure 4B:
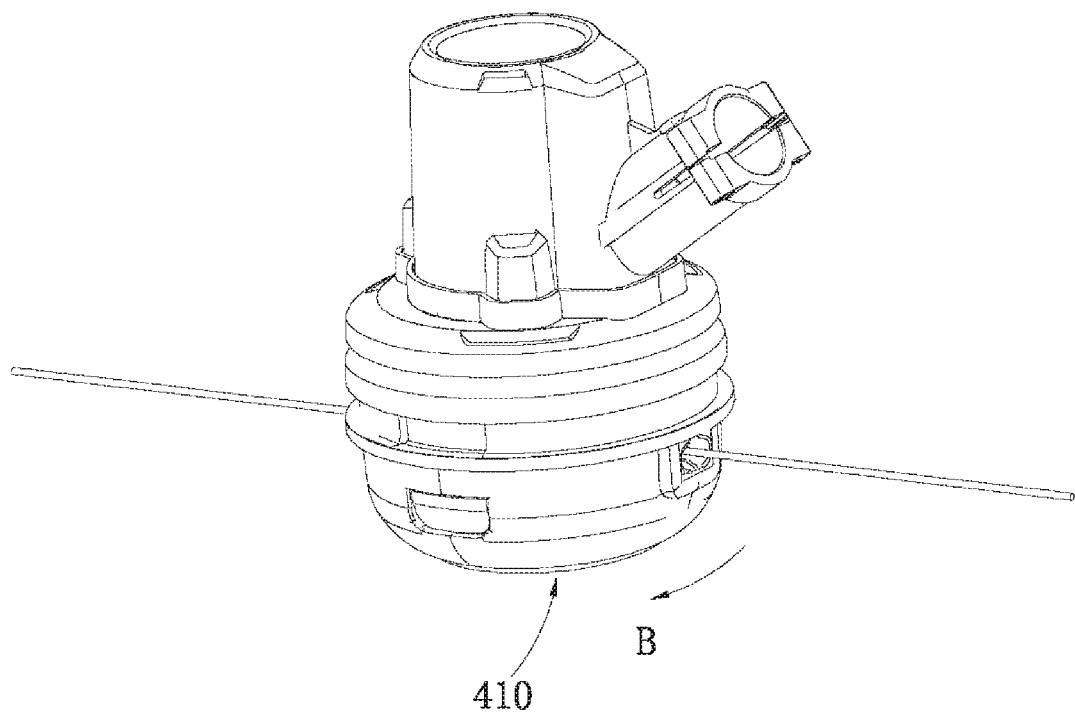
FIG. 4B is a schematic view showing the structure of a part of the grass trimmer in FIG. 4A.
Figure 4C:
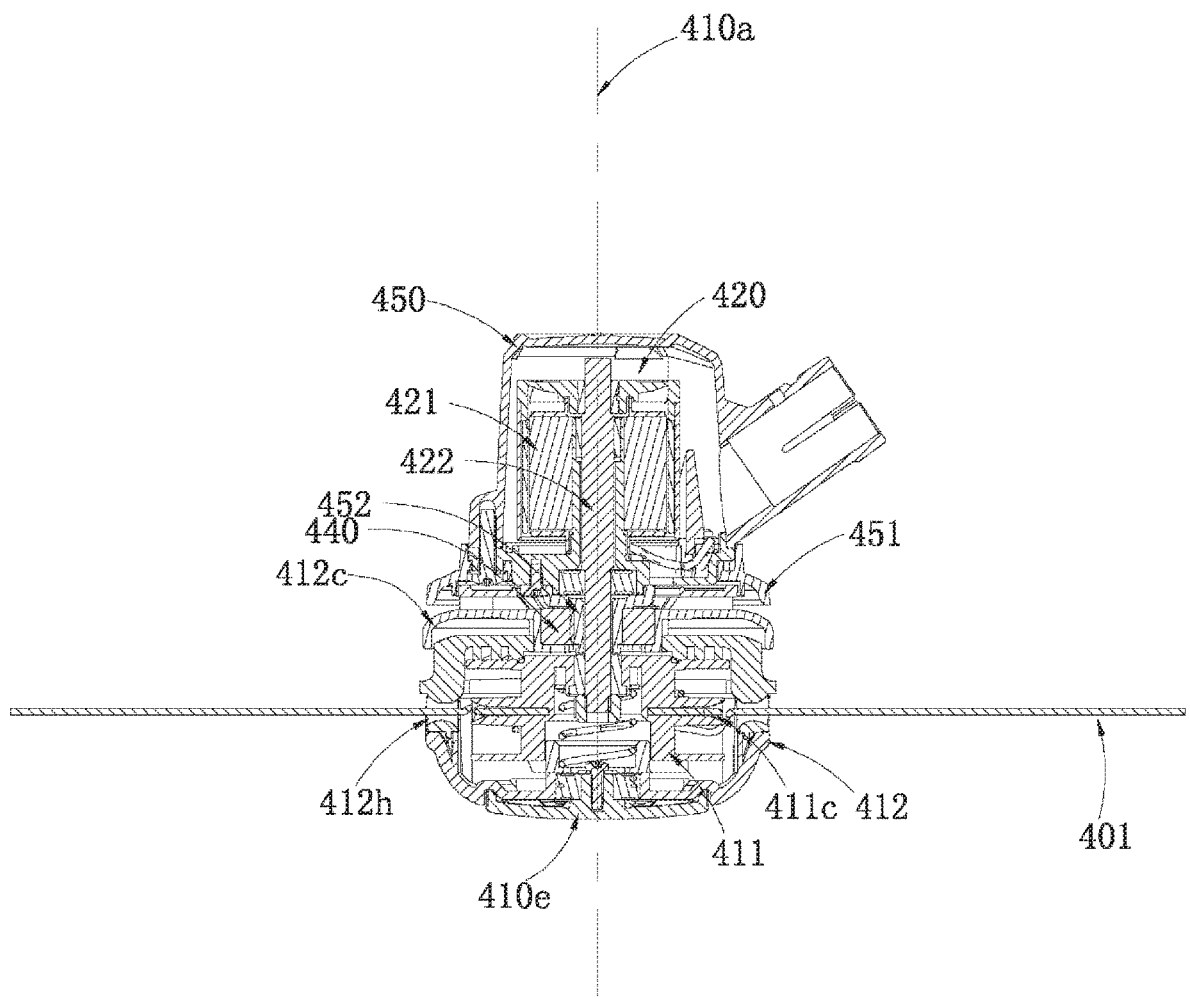
FIG. 4C is a section view of the structure in FIG. 4B.
Figure 4D:
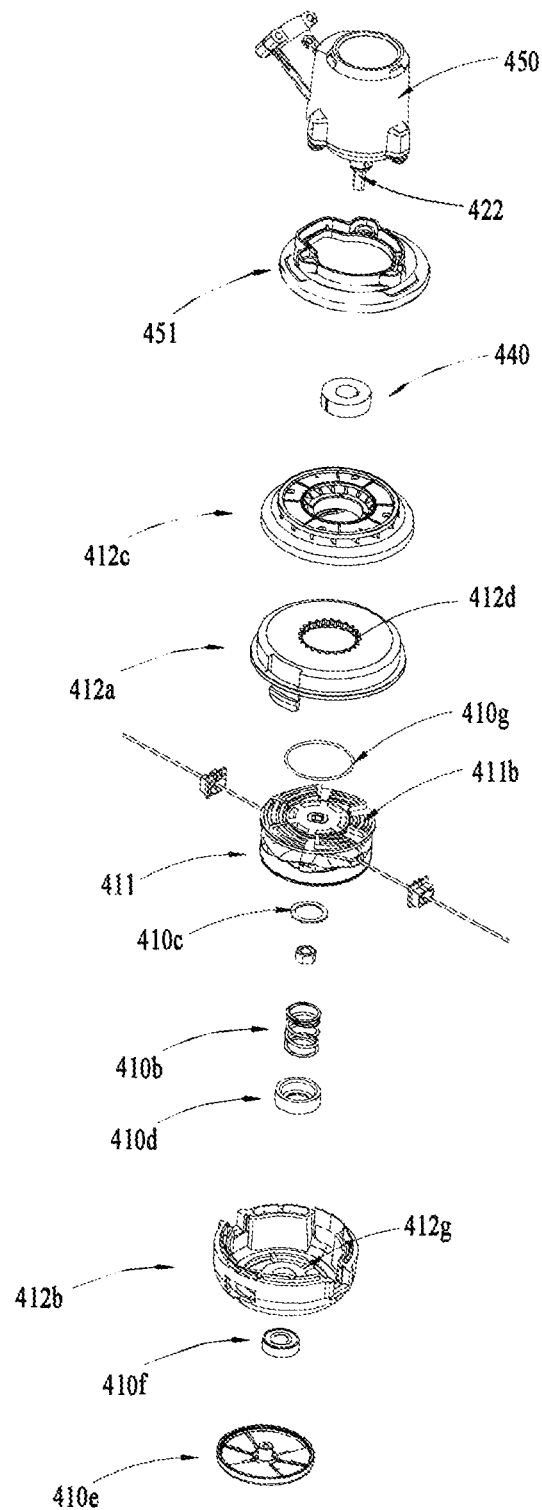
FIG. 4D is an exploded view of the structure in FIG. 4B.
Figure 4E:
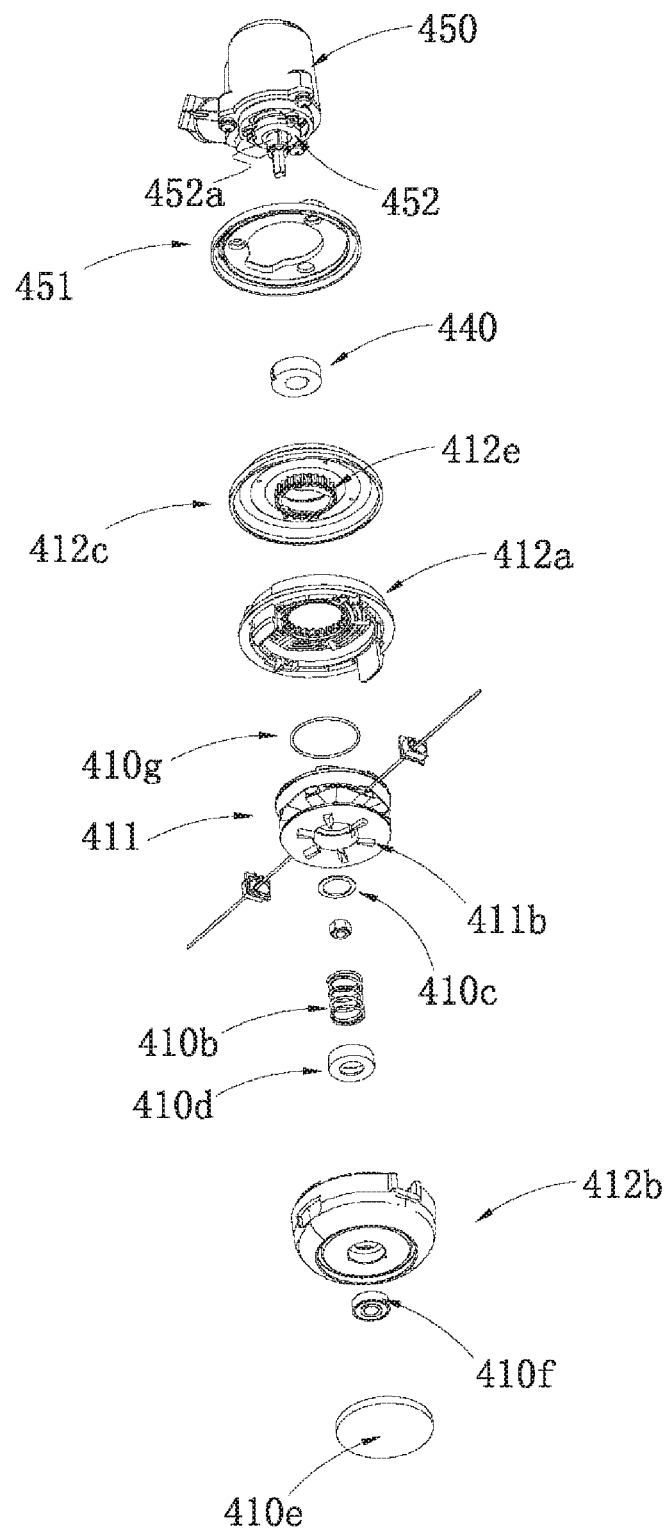
FIG. 4E is another exploded view of the structure in FIG. 4B.
Figure 4F:
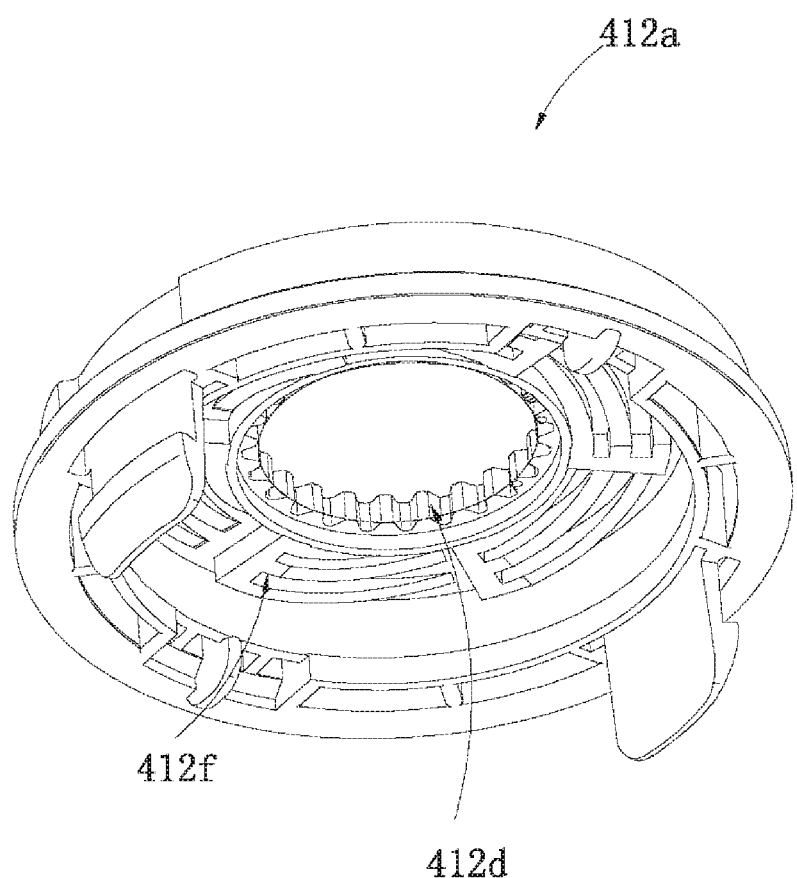
FIG. 4F is a section view of an upper cover in FIG. 4E.
Figure 4G:
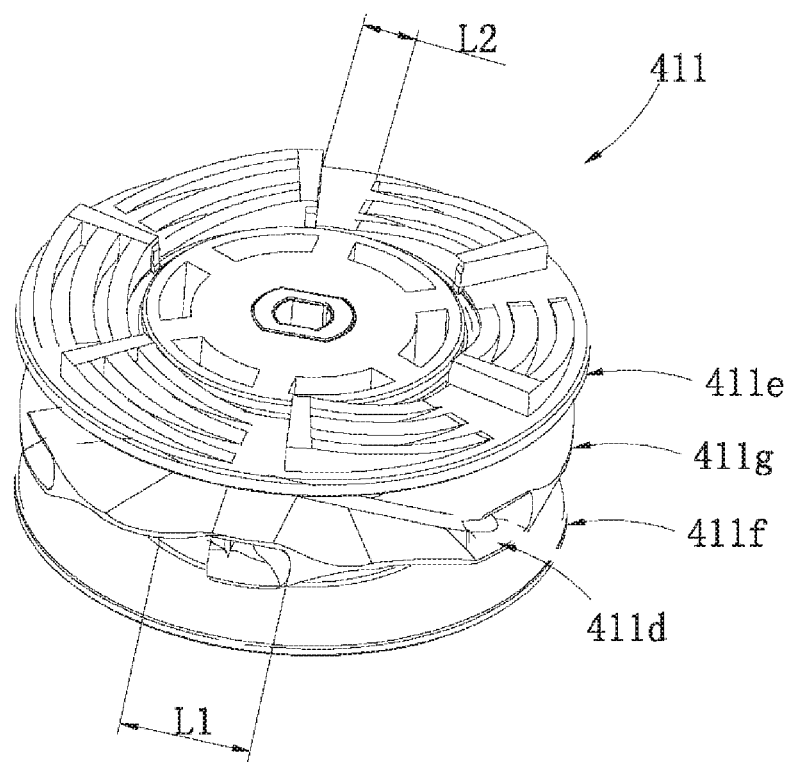
FIG. 4G is a section view of a spool in FIG. 4E.

Referring to FIGS. 4A-4C, a grass trimmer 400 includes a trimming head 410, a driving device 420 and an operating device 430.

The trimming head 410 is configured to mount and accommodate a cutting line 401. The cutting line 401 is partially accommodated in the trimming head 410. The cutting line 401 has a part extending out of the trimming head 410 which is used to cut vegetation when the trimming head 410 is rotated.

The trimming head 410 can be driven by the driving device 420 to rotate about an axis 410a so as to drive the cutting line 401 to cut vegetation. The operating device 430 is used for the user to operate so as to control the grass trimmer 400.

Specifically, the driving device 420 includes a motor 421 and a driving shaft 422. The driving shaft 422 is connected fixedly with the trimming head 410 so as to drive the trimming head 410 to rotate.

The grass trimmer 400 further includes a first housing 450, a second housing 460 and a battery pack 470. The first housing 450 is configured to mount and accommodate the motor 421. The battery pack 470 acting as a power source at least can supply power to the motor 421 of the grass trimmer 400. The second housing 460 is configured to engage with the battery pack 470 detachably.

A circuit board is accommodated in the second housing 460, which is connected with the motor 421 electrically so that the battery pack 470 can supply power to the motor 421 and control the motor 421. The first housing 450 and the second housing 460 are connected with each other through a connecting rod assembly 490. The operating device 430 is fixedly mounted on the connecting rod assembly 490. The grass trimmer 400 further includes an auxiliary handle 491 for the user to grip which is fixedly mounted on the connecting rod assembly 490.

The cutting line 401 is mounted on the trimming head 410. A guard 480 is used to prevent the cutting line 401 from hurting the user, so that it can realize the function of safety and protection.

Referring to FIGS. 4C-4H, the trimming head 410 includes a spool 411 and a head housing 412.

The spool 411 for winding the cutting line 401 is connected with the driving shaft 422 and can be driven by the driving shaft 422 to rotate about the axis 410a.

The head housing 412 includes an upper cover 412a and a lower cover 412b. The trimming head 410 further includes a fan 412c. The fan 412c includes blades for generating airflow. The fan 412c can be driven by the motor 421 to rotate so as to generate airflow.

In the embodiment in FIGS. 4A-4E, a one-way bearing 440 acting as a damping device is used. The function of the one-way bearing 440 is to make the head housing 412 connect with the motor 421 in a unidirectional rotary way. Specifically, a supporting element 452 is connected with the motor 421, which allows the driving shaft 422 to pass through. The supporting element 452 is formed with a projecting portion 452a for supporting an inner ring of the one-way bearing 440. The one-way bearing 440 is not connected with the head housing 412 directly, but connected between the supporting element 452 and the fan 412c. So, the fan 412c is only able to rotate unidirectionally relative to the supporting element 452. Because the fan 412c is connected with the head housing 412 fixedly, the head housing 412 is only able to rotate unidirectionally relative to the supporting element 452 as well.

The upper cover 412a is formed with first connecting teeth 412d. The fan 412c is formed with second connecting teeth 412e for engaging with the first connecting teeth 412d. Through the engagement between the first connecting teeth 412d and the second connecting teeth 412e, the upper cover 412a can be rotated with the fan 412c synchronously. The engagement between the first connecting teeth 412d and the second connecting teeth 412e can provide a guiding effect, so that the head housing 412 is able to slide relative to the fan 412c along the axis 410a and the fan 412c is able to rotate about the axis 410a together with the head housing 412. That is the fan 412c is connected with the head housing 412 fixedly.

The grass trimmer 400 further includes a guard 451 fastened to the first housing 450. The guard 451 is able to cover the blades of the fan 412c in a radial direction of the axis 410a so as to prevent grass clippings from winding on the fan 412c. And the guard 451 is able to change the direction of the airflow of the fan 412c, so that the airflow generated by the fan 412c can blow the grass clippings outward along the radial direction of the axis 410a.

The spool 411 is driven directly by the driving shaft 422 to rotate. The head housing 412 can rotate relative to the spool 411 and slide relative to the spool 411 in the direction of the axis 410a.

Referring to FIGS. 4D-4G, the spool 411 is formed with first engaging teeth 411a on the upper portion and second engaging teeth 411b on the lower portion. The head housing 412 is formed with first matching teeth 412f and second matching teeth 412g therein. Specifically, the first matching teeth 412f is formed on the upper cover 412a, and the second matching teeth 412g is formed on the lower cover 412b.

When the head housing 412 is at a first axial position relative to the spool 411, the first matching teeth 412f are engaged with the first engaging teeth 411a. So, when the spool 411 is rotated, it can drive the head housing 412 to rotate synchronously. Specifically, the transmitting surfaces of the first matching teeth 412f and the first engaging teeth 411a are inclined surfaces, so that the first matching teeth 412f and the first engaging teeth 411a only can rotate together unidirectionally. When the spool 411 is rotated reversely, the spool 411 rotates relative to the head housing 412 due to the skid between the inclined surfaces.

When the head housing 412 is at a second axial position relative to the spool 411, the second engaging teeth 411b is engaged with the second matching teeth 412g. Because the transmitting surfaces of the second engaging teeth 411b and the second matching teeth 412g are inclined surfaces, the skid can occur between the second engaging teeth 411b and the second matching teeth 412g. So, when the head housing 412 is at the second axial position relative to the spool 411, the head housing 412 cannot be driven by the spool 411 completely. The head housing 412 still can rotate relative to the spool 411, but the speed difference of the relative rotation is decreased by the engagement of the second engaging teeth 411b and the second matching teeth 412g.

The trimming head 410 includes a spring 410b. The spring 410b can generate a force acting between the lower cover 412b and the spool 411, so that the head housing 412 is biased to the axial position and can rotate with the spool 411 synchronously. That is the first axial position described above.

The trimming head 410 further includes a first contacting element 410c and a second contacting element 410d. The spring 410b is disposed between the first contacting element 410c and the second contacting element 410d and can act on the first contacting element 410c and the second contacting element 410d directly. The first contacting element 410c and the second contacting element 410d can prevent the spring 410b from wearing on the spool 411 and the head housing 412, which are made of metal.

The trimming head 410 further includes a button 410e which is connected rotatably with the lower cover 412b. A bearing 410f is disposed between the button 410e and the lower cover 412b, so that the button 410e can be rotated relative to the lower cover 412b. Meanwhile, the button 410e and the lower cover 412b can move together in the direction of the axis 410a. When the position of the button 410e is changed, the lower cover 412b can move therewith. That is, the axial position of the head housing 412 can be changed when the button 410e is bumped.

When the grass trimmer 400 is in the cutting mode, the user can bump the trimming head 410, and the button 410e contacts with the ground to make the head housing 412 slide, so that the first engaging teeth 411a is disengaged with the first matching teeth 410f and rotated relative to the first matching teeth 410f. Further, when the button 410e is bumped, the head housing 412 can slide to the second axial position relative the spool 411 and rotate at a lower speed relative to the spool 411. So, the trimmer line 401 wound on the spool 411 can be fed out of the head housing 412 partially, and the grass trimmer 400 performs a line feeding mode. This arrangement has advantages that is, when the motor 421 is rotated at a speed in the cutting mode, the relative rotation speed of the head housing 412 and the spool 411 is controlled, so that the trimmer line 401 cannot be fed excessively during each bumping.

The button 410e is able to rotate freely relative to the lower cover 412b under the action of the bearing 410f, so that the wearing of the trimmer head 410 is reduced. The spring 410b can generate a force acting on the head housing 412 so as to make the head housing 412 move downwardly relative to the spool 411. An anti-vibration element 410g is disposed between the upper cover 412a and the spool 411 for reducing the impact between the upper cover 412a and the spool 411. Specifically, the anti-vibration element 410g is a rubber washer.

The spool 411 is formed with an inner aperture 411c and the head housing 412 is formed with an outer aperture 412h allowing the cutting line 401 to pass from the inside to the outside of the head housing 412. When the cutting mode is finished, the inner aperture 411c and the outer aperture 412h are aligned automatically in the circumferential direction. Or, when the cutting line 40a is not mounted on the trimming head 410 and the motor 421 is stopped, the inner aperture 411c and the outer aperture 412h are aligned automatically in the circumferential direction.

The spool 411 is formed with several inner apertures 411c, and the number of the inner apertures 411c is even. The several inner apertures 411c are distributed uniformly in the circumferential direction of the axis 410e. Specifically, the number of the first engaging teeth 411a is corresponded with the number of the inner apertures 411c. Similarly, the number of the second engaging teeth 411b is corresponded with the number of the inner apertures 411c. The spool 411 is formed with six inner apertures 411c. The spool 411 is further formed with six first engaging teeth 411a and six second engaging teeth 411b.

The spool 411 is formed with a guiding opening 411d for guiding the cutting line 401 to enter the inner apertures 411c. The guiding opening 411d is expanded gradually along the radial direction of the rotating axis of the spool 411. The first engaging teeth 411a are formed with inclined surfaces.

The guiding opening 411d has a maximum size L1 in the circumferential direction of the axis 410a which is greater than a maximum size L2 between two adjacent first engaging teeth 411a in the circumferential direction of the axis 410a.

When the grass trimmer 400 is in the cutting mode, the transmitting surfaces of the first engaging teeth 411a and the first matching teeth 412f are so arranged that the outer apertures 412h and the inner apertures 411c can be aligned automatically in the circumferential direction when the motor 421 is stopped. Here, the word "align" means that the cutting line 401 passing through the outer apertures 412h can be guided into the inner apertures 411c directly.

The spool 411 is formed with a first flange 411e and a second flange 411f on its two ends. The spool 411 is further formed with a division plate 411g in the middle portion. A first winding portion for winding and accommodating the trimmer line 401 is formed between the first flange 411e and the division plate 411g. A second winding portion for winding and accommodating the trimmer line 401 is formed between the second flange 411f and the division plate 411g.

In the cutting mode, the spool 411 is driven by the driving shaft 422 to rotate, and the upper cover 412a is driven by the spool 411 to rotate. The fan 412c is driven by the upper cover 412a to rotate. The fan 412c can rotate relative to the second housing 460 in a first direction referring to an arrow B in FIG. 4b. At this moment, the motor 421 is rotated forwardly so as to drive the spool 411 and the head housing 412 to rotate in the first direction.

Figure 4H:
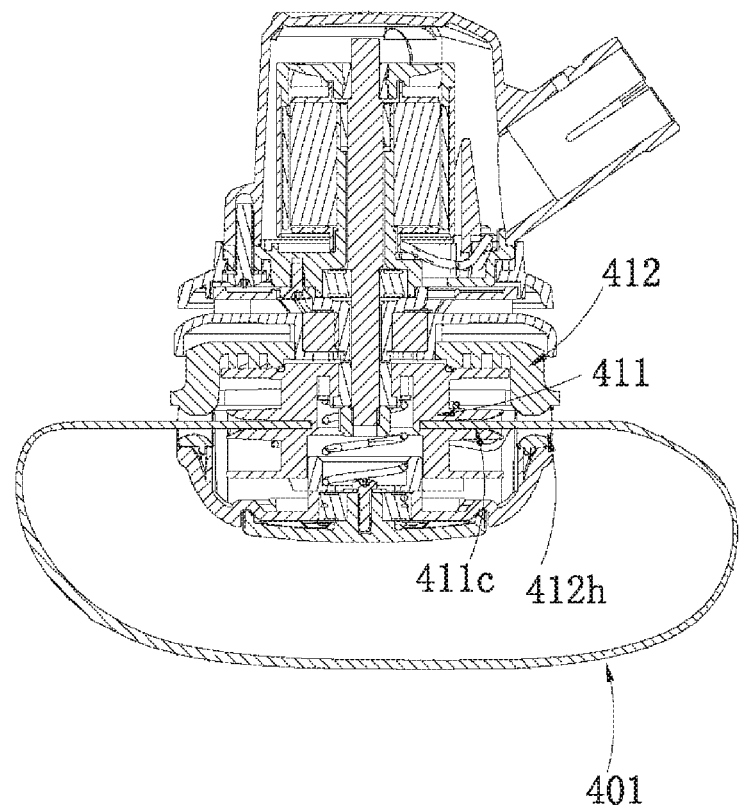
FIG. 4H is a schematic view showing the inserting method of a trimming head in FIG. 4A.

As shown in FIG. 4h, when it is needed to supplement the cutting line 401, two ends of the cutting line 401 can be passed through the opposite outer apertures 412h of the head housing 412 respectively, and then the two ends of the cutting line 401 are extended into the two opposite inner apertures 411c of the spool 411 respectively. Sure, the user can insert two cutting lines 401 into the two inner apertures 411c respectively. At this moment, the user can control the grass trimmer 400 to make it perform the auto-winding mode. The motor 421 is rotated reversely so as to drive the spool 411 to rotate in a second direction opposite to the first direction. Due to the effect of the one-way bearing 440, the fan 412c cannot rotate in the second direction. The fan 412c is connected with the head housing 412 through the first connecting teeth 412d and the second connecting teeth 412e, so the head housing 412 cannot rotate in the second direction. The spool 411 is driven by the driving shaft 422 to rotate relative to the head housing 412 in the second direction so as to realize the auto-winding function.

Otherwise, the first engaging teeth 411a, the second engaging teeth 411b, the first matching teeth 410f and the second matching teeth 410g are inclined teeth. The inclined surfaces of the inclined teeth cannot stop the spool 411 rotating relative to the head housing 412.

When the spool 411 is wound with enough cutting line 401, the excess cutting line 401 which has not been wound needs to be to cut off. Referring to FIGS. 4A and 4H, the grass trimmer 400 includes a line breaking device 481 for cutting off the cutting line 401 automatically in the auto-winding mode.

The line breaking device 481 includes a line breaking element 482. The trimming head 410 can rotate relative to the line breaking element 482. The line breaking element 482 is fastened to the guard 480. In the auto-winding mode, the cutting line 401 can be driven by the trimming head 410 to pass the line breaking element 482. When the cutting line 401 is tensioned, it can be cut off by the line breaking element 482. In the cutting mode and feeding mode, the cutting line 401 can be cut off in the middle by the line breaking element 482, and the cutting line 401 is divided into two parts.

Sure, the cutting line 401 can be cut off in a bumping way when it is tensioned on the outside of the head housing 412.

Figure 4I:
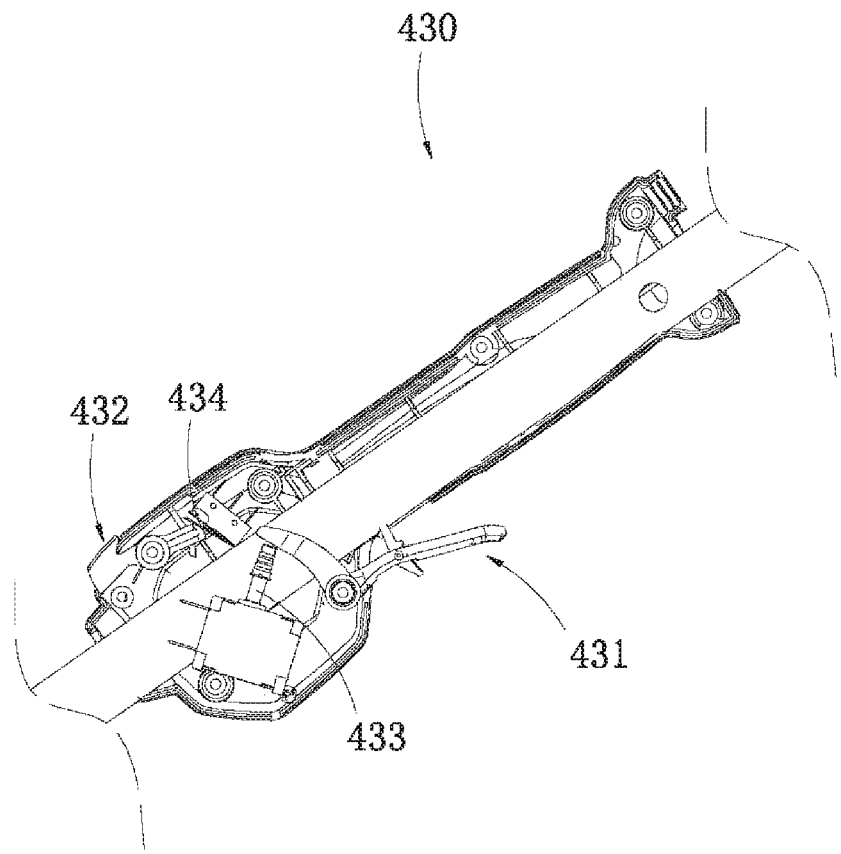
FIG. 4I is a schematic view of an operating device in FIG. 4A.
Figure 4J:
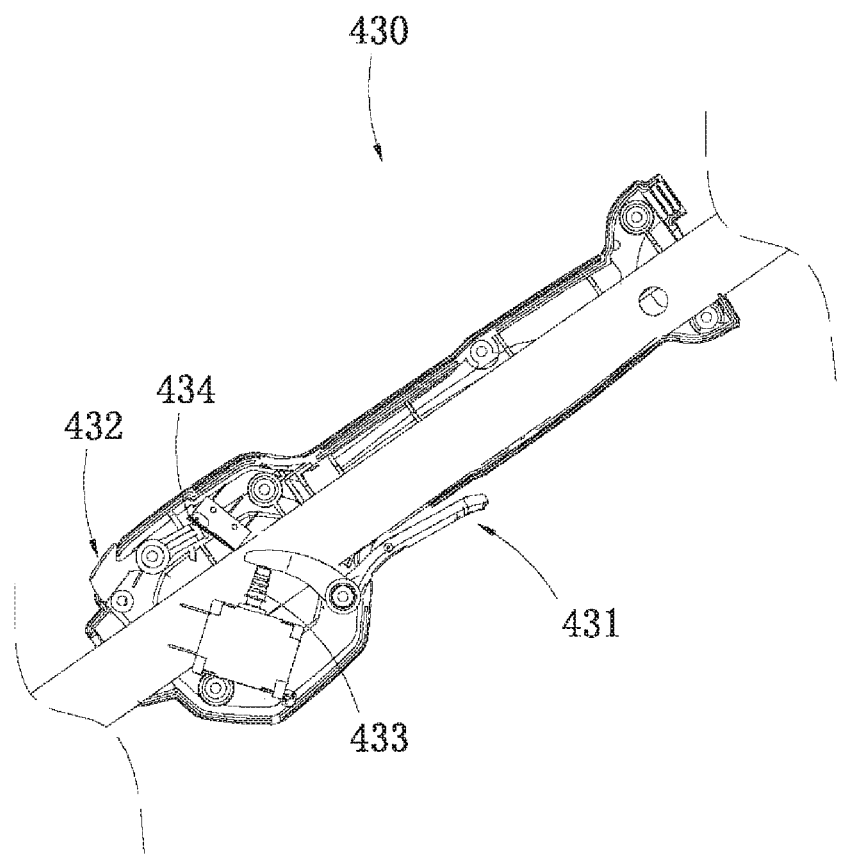
FIG. 4J is another schematic view of the operating device in FIG. 4A, wherein a first operating element and a second operating element are in a first preset operating state and a second preset operating state respectively.

Referring to FIGS. 4I and 4J, the operating device 430 includes a first operating element 431 and a second operating element 432. The first operating element 431 has an initial status and a first preset operating status. The second operating element 432 has an initial status and a second preset operating status. As shown in FIG. 4I, the first operating element 431 and the second operating element 432 are in the initial status. As shown in FIG. 4J, the first operating element 431 is in the first preset operating status and the second operating element 432 is in the second preset operating status. When the first operating element 431 and the second operating element 432 are in the first preset operating status and the second preset operating status respectively, the grass trimmer 100 can start the auto-winding mode.

The operating device 430 includes a first resetting assembly 433 and a second resetting assembly 434. The first resetting assembly 433 can make the first operating element 431 get out of the first preset operating status when the first operating element 431 is not operated by the user. The second resetting assembly 434 can make the second operating element 432 get out of the second preset operating status when the second operating element 432 is not operated by the user.

When the user only operates the first operating element 431 and does not operate the second operating element 432, that is the second operating element 432 is not in the second preset operating status, the first operating element 431 is operated to move to the first preset operating status. At this moment, the grass trimmer 400 is in the cutting mode.

Figure 4K:
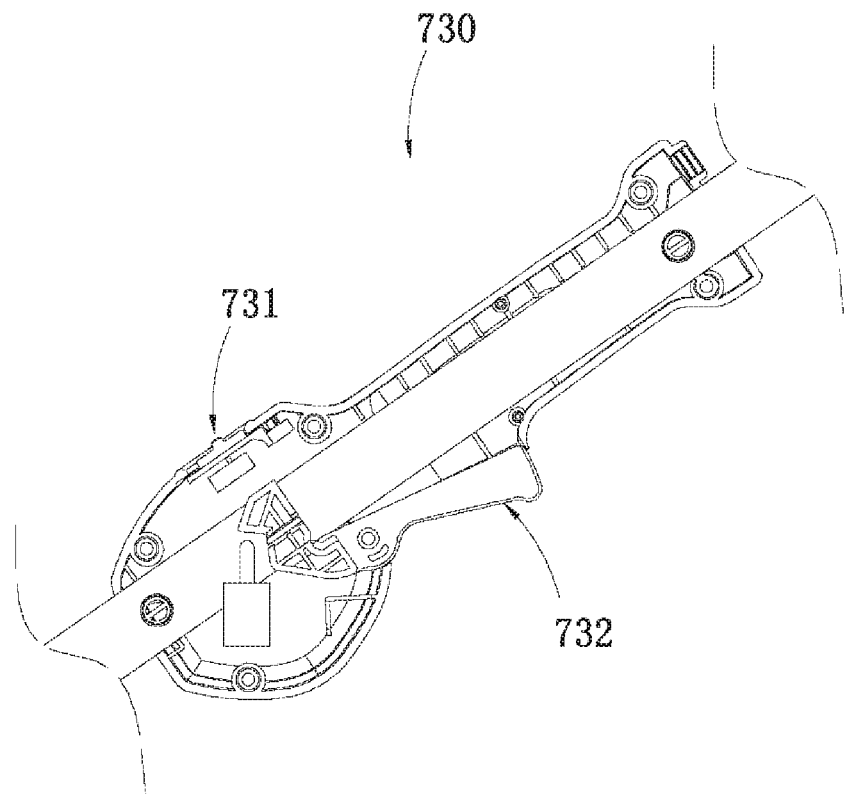
FIG. 4K is a schematic view of an operating device.
Figure 4L:
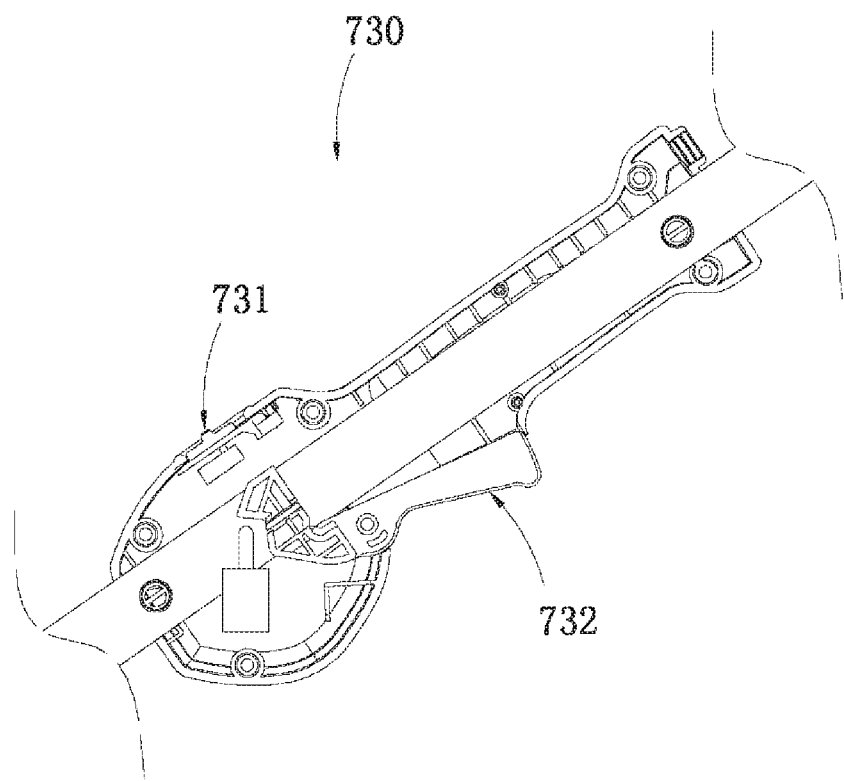
FIG. 4L is a schematic view showing a second operating element of the operating device in FIG. 4K, wherein the second operating element is in a second position.

Referring to FIGS. 4K and 4L, another operating device 730 includes a first operating element 731 and a second operating element 732. The first operating element 731 is used to activate a motor. The second operating element 732 is used for the user to operate so as to choose the auto-winding mode of the grass trimmer. The second operating element 732 has a first position a second position. As shown in FIG. 4K, the second operating element 732 is in the first position which corresponds with the auto-winding mode. At this moment, when the motor is activated by the first operating element 731, the grass trimmer goes into the auto-winding mode. As shown in FIG. 4L, the second operating element 732 is in the second position which corresponds with the cutting mode. At this moment, when the motor is activated by the first operating element 731, the grass trimmer goes into the cutting mode.

Figure 4M:
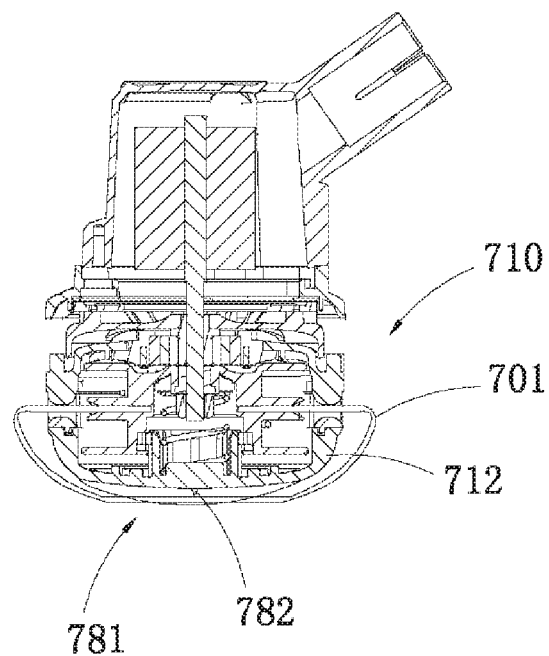
FIG. 4M is a schematic view of a line breaking device.

As shown in FIG. 4M, in another alternative embodiment, a line breaking device 781 can cut off a cutting line 701 in the auto-winding mode. The line breaking device 781 includes a line breaking element 782 which is able to rotate with a trimming head 710 synchronously. In the auto-winding mode, the cutting line 701 is driven by the trimming head 710 to close to the line breaking element 782 so that the cutting line 701 is cut off. The line breaking element 782 is fixed to a head housing 712. In the auto-winding mode, the cutting line 701 is close to the head housing 712. When the cutting line 701 is tensioned and contacts with the line breaking element 782, it is cut off by the line breaking element 782.

In the embodiment in FIG. 4A, the head housing 412 is formed with outer apertures 412h. In the auto-winding mode, the head housing 412 is rotated relative to the spool 411. The head housing 412 acts as a hand of the user winding the cutting line 401, and the outer apertures 412h act as the fingers of the user holding the cutting line 401. So, the head housing 412 can be defined as a line holding member. The line holding member can hold the cutting line 401 so that the cutting line 401 can rotate relative to the spool 411. The outer apertures 412h can be defined as a line holding structure. The line holding structure acts as the fingers to hold and locate the cutting line 401, and meanwhile allow the cutting line 401 to pass the outer apertures 412h continuously and wind on the spool 411.

Figure 5A:
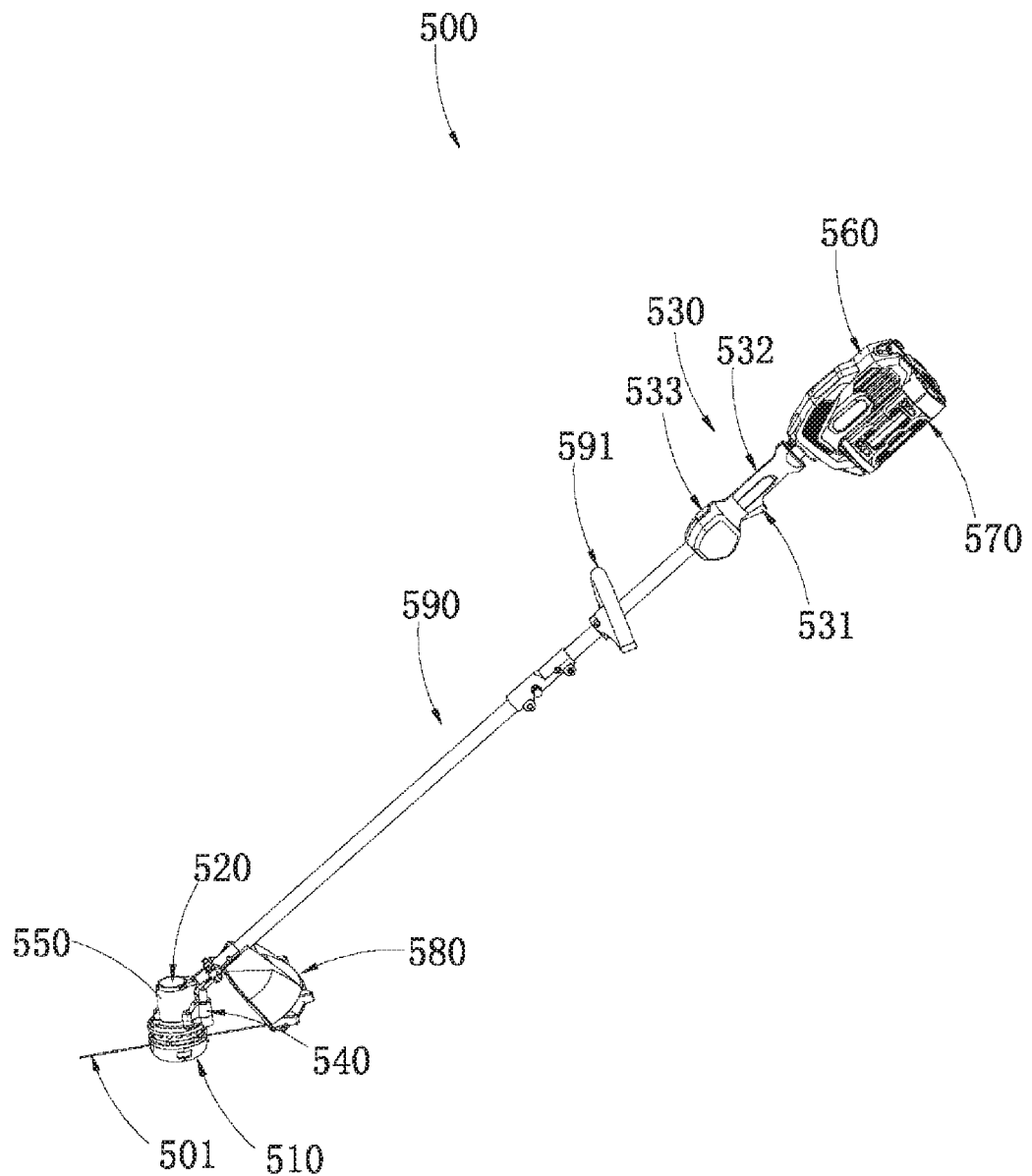
FIG. 5A is also a schematic view of an exemplary grass trimmer.
Figure 5B:
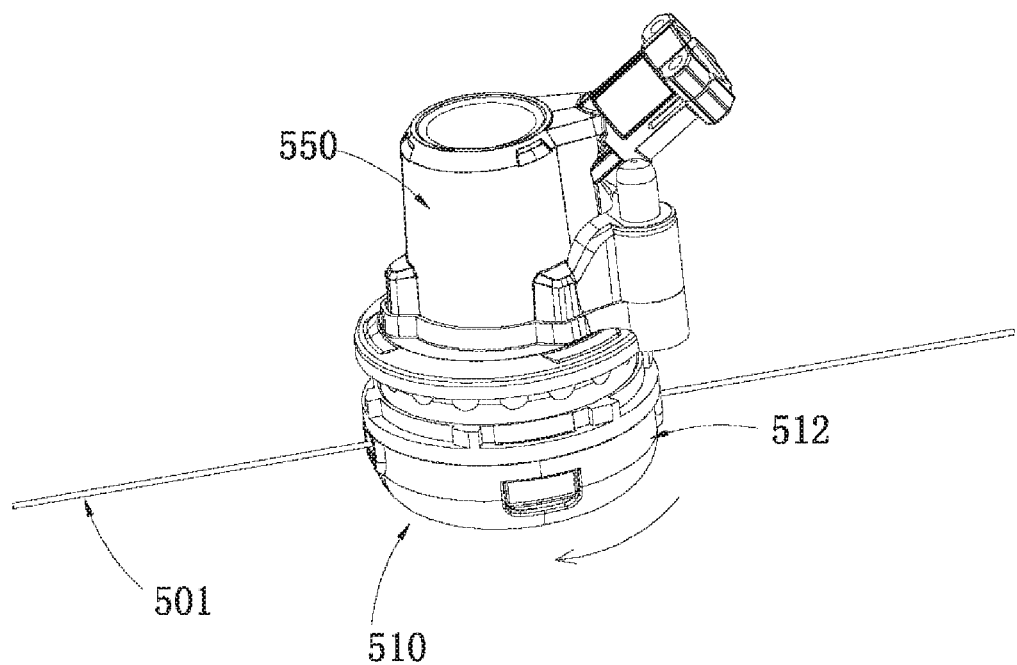
FIG. 5B is a schematic view of a trimming head and a first housing of the grass trimmer in FIG. 5A.
Figure 5D:
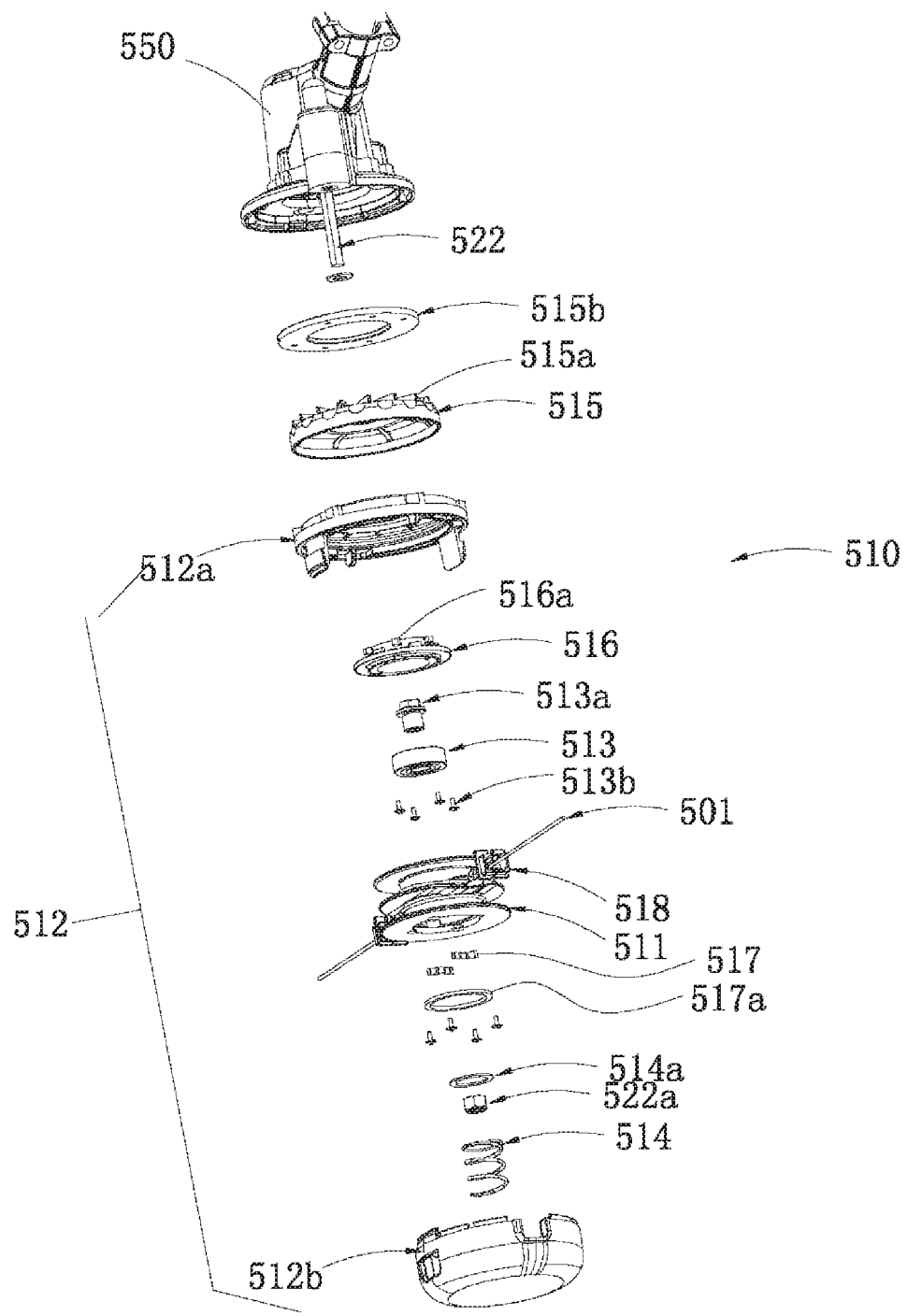
FIG. 5D is an exploded view of the structure in FIG. 5B.
Figure 5E:
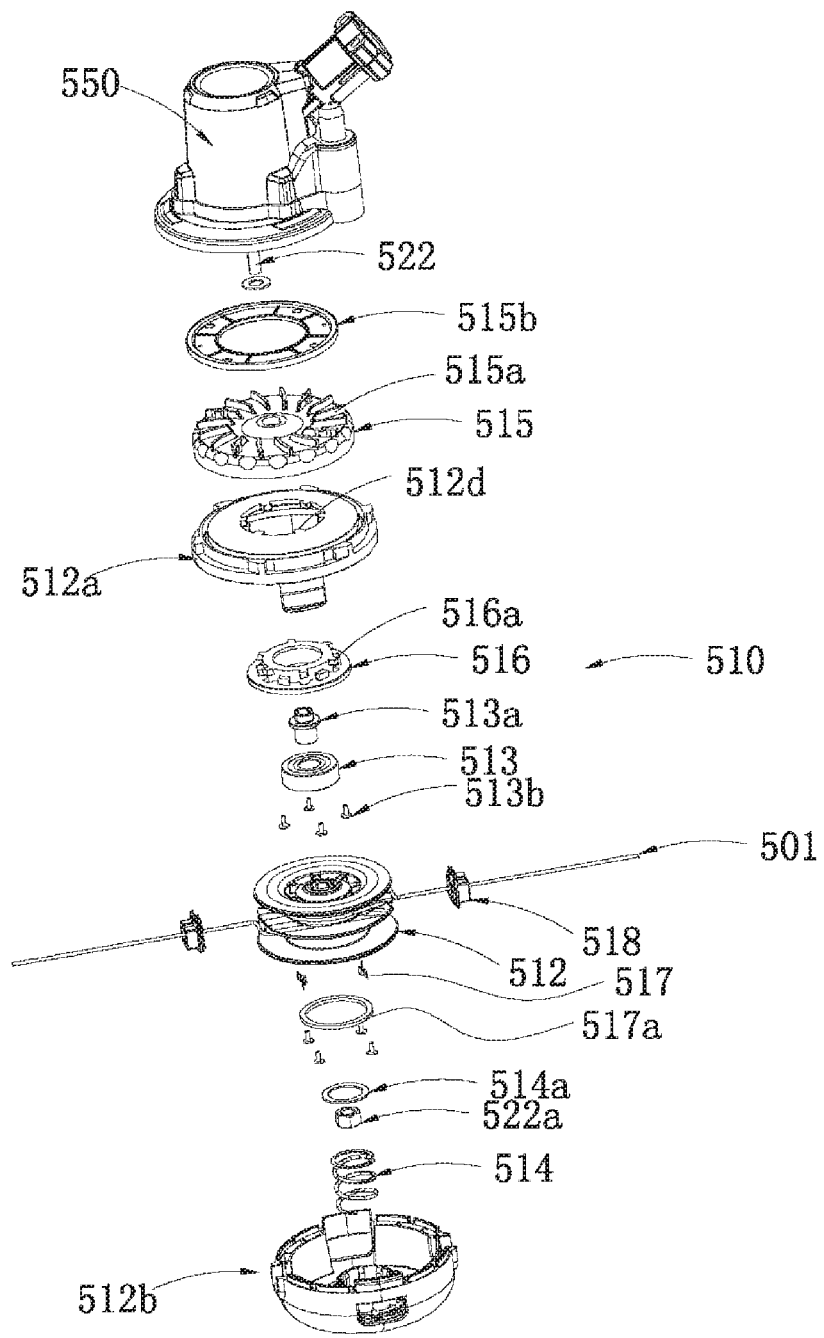
FIG. 5E is another exploded view of the structure in FIG. 5B.

Referring to FIGS. 5A-5C, a grass trimmer 500 includes a trimming head 510, a driving device 520 and an operating device 530.

The driving device 520 includes a driving shaft 522. The driving shaft 522 is connected with the trimming head 510 so as to drive the trimming head 510 to rotate about a central axis 502. The driving device 520 further includes a motor 521. Specifically, the driving shaft 522 is an output shaft of the motor 521.

The grass trimmer includes a first housing 550, a second housing 560 and a battery pack 570. The motor 521 is fixed to the first housing 550. The battery pack 570 for supplying power to the motor 521 is connected with the second housing 560 detachably. Further, a circuit board is disposed in the second housing 560, which is connected with the motor 521 to control the motor 521. The first housing 550 and the second housing 560 is connected through a connecting rod assembly 590. The operating device 530 is fixed to the connecting rod assembly 590. The grass trimmer 500 further includes an auxiliary handle 591 fixed to the connecting rod assembly 590 for the user to grip.

A cutting line 501 is mounted on the trimming head 510. A guard 580 can prevent the cutting line 501 from hurting the user so as to realize the function of protection.

Referring to FIGS. 5D-5G, the trimming head 510 includes a spool 511 and a head housing 512. The spool 511 allowing the cutting line 501 to wind thereon is formed with an inner aperture 511a and the end of the cutting line 501 is extended into the inner aperture 511a. Specifically, the spool 511 is formed with two inner apertures 511a on the opposite sides. Two cutting lines 501 can be inserted in the two inner apertures 511a respectively. Or, two ends of one cutting line 501 can be inserted in the two inner apertures 511a respectively. The spool 511 is accommodated in the head housing 512. The head housing 512 includes an upper cover 512a and a lower cover 512b which are coupled with each other through a snap joint.

The spool 511 is disposed between the upper cover 512a and the lower cover 512b. The head housing 512 is formed with outer apertures 512c allowing the cutting line 501 to go through the head housing 512 from the inside. Specifically, the outer apertures 512c are formed on the lower cover 512b. Further, the trimming head 510 includes eyelets 518 fastened on the lower cover 512b which allow the cutting line 501 to pass through. More specifically, the eyelets 518 are made of metal which can prevent the cutting line 501 from wearing the lower cover 512b.

The grass trimmer 500 further includes a one-way bearing 513. When the one-way bearing 513 is rotated in one direction, an inner ring and an outer ring of the one-way bearing 513 are rotated synchronously. While, when the one-way bearing 513 is rotated in the reverse direction, the inner ring is rotated relative to the outer ring. When the driving shaft 522 is rotated in one direction, the one-way bearing 513 allows the head housing 512 and the spool 511 to rotate synchronously. While, when the driving shaft 522 is rotated in the reverse direction, the spool 511 is rotated relative the head housing 512 under the action of the one-way bearing 513.

The trimming head 510 includes an elastic element 514 which is able to generate a force between the head housing 512 and the spool 511. The force acts on the head housing 512 to make the head housing 512 depart from the first housing 550 or the motor 521. Specifically, elastic element 514 is disposed between the lower cover 512b and the spool 511. The spool 511 can apply force on the lower cover 512b and the spool 511 respectively through its two ends. The two ends can be connected with the lower cover 512b and the spool 511 directly and apply force on them, or connected with the lower cover 512b and the spool 511 indirectly and apply force on them through other components.

Specifically, the trimming head 510 further includes a washer 514a disposed between the elastic element 514 and the spool 511. The force of the elastic element 514 is transferred to the spool 511 through the washer 514a. When the spool 511 is rotated relative to the head housing 512, the elastic element 514 is rotated relative to the spool 511. The washer 514a is able to prevent the elastic element 514 from wearing the spool 511. When the trimming head 510 is bumped by the user, the elastic element 514 is compressed, and the head housing 512 is moved in a direction close to the first housing 550 or the motor 521. As shown in FIG. 5B, the head housing 512 is moved upward. When the bumping is finished, the elastic element 514 can apply force on the lower cover 512b so as to make the lower cover 512b to move downward or in the direction far from the first housing 550 or the motor 521. So, the line bump feeding is realized.

The grass trimmer 500 further includes a fan 515. The fan 515 can be formed by the head housing 512 or a separate element. Specifically, the fan 515 is a separate element, which is connected with the driving shaft 522 and driven by the driving shaft 522 to rotate. Alternatively, the fan can be connected with the head housing and driven by the head housing to rotate.

Specifically, the fan 515 is provided with several blades 515a. The trimming head 510 includes an end cap 515b fixed to the fan 515. More specifically, the end cap 515b is fixed to the blades 515a. The end cap 515b has an annular shape and allows the driving shaft 522 to pass through. The fan 515 is disposed between the motor 521 and the head housing 512. The fan 515 is also disposed between the first housing 550 and the head housing 512. The fan 515 is also disposed between the first housing 550 and the spool 511. The upper cover 512a is disposed between the fan 515 and the lower cover 512b. The upper cover 512a is also disposed between the fan 515 and the spool 511. It can be considered as the fan 515 is disposed above the head housing 512.

The spool 511 is connected with the driving shaft 522 so as to rotate with the driving shaft 522 synchronously. The fan 515 is rotated with the driving shaft 522 and the spool 511 synchronously. The spool 511 is fixed to the driving shaft 522 through a locating nut 522a, so the axial position of the spool 511 relative to the driving shaft 522 is limited.

The trimming head 510 further includes a connecting element 516 which is formed with a plurality of feeding teeth 516a for feeding line. The head housing 512 is formed with a plurality of matching teeth 512d for engaging with the feeding teeth 516a. The matching teeth 512d is engaged with the feeding teeth 516a so as to control the line bump feeding.

The trimming head 510 further includes a connecting shaft 513a fixed to the driving shaft 522. The fan 515 is fixed to the connecting shaft 513a, so that the fan 515 can be driven by the driving shaft 522 to rotate. The one-way bearing 513 is fixed to the connecting shaft 513a. Specifically, the connecting shaft 513a is disposed in the inner ring of the one-way bearing 513. So, the driving shaft 522 can drive the inner ring of the one-way bearing 513 to rotate, and the inner ring is rotated with the driving shaft 522 synchronously. Further, the connecting shaft 513a can limit the axial position of the one-way bearing 513 relative to the driving shaft 522. The connecting element 516 is fixed to the outer ring of the one-way bearing 513 and rotated with the outer ring synchronously. The one-way bearing 513 and the connecting element 516 are fixed by a screw 513b, so the displacement of the one-way bearing 513 and the connecting element 516 in the axial direction is limited. The connecting element 516 is engaged with the head housing 512 through the engagement of the feeding teeth 516a and the matching teeth 512d. The head housing 512 is driven to rotate by the connecting element 516.

Referring to FIGS. 5D-5L, the trimming head 510 further includes locating elements 517 for aligning the inner apertures 511a and the outer apertures 512c. When it is needed to add a new cutting line 501 to the spool 511, the user can make the head housing 512 rotate to align with the spool 511 conveniently. The cutting line 501 is passed through the outer apertures 512c of the head housing 512 and entered into the inner apertures 511a. The locating elements 517 are fixed to the spool 511. The trimming head 510 includes a pressing plate 517a for fixing the locating elements 517 to the spool 511. The lower cover 512b is formed with locating recesses 512e for engaging with the locating elements 517. When the locating elements 517 are entered into the locating recesses 512e partially, the inner apertures 511a and the outer apertures 512c are aligned.

Figure 5F:
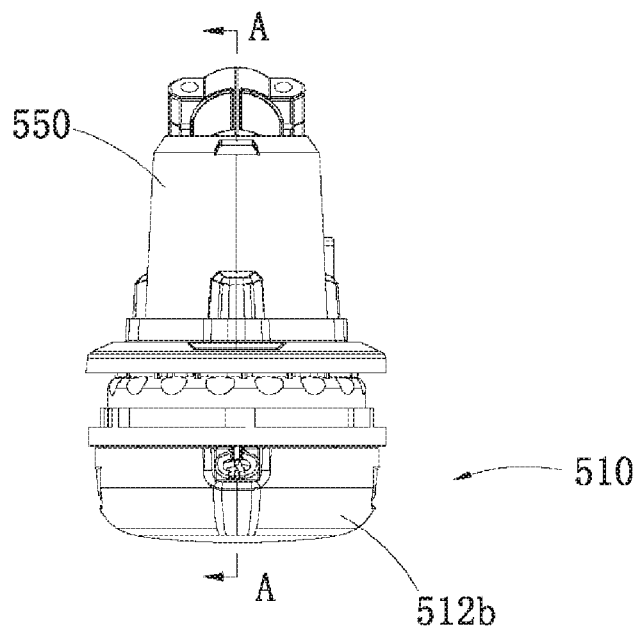
FIG. 5F is a plane view of the structure in FIG. 5B.
Figure 5G:
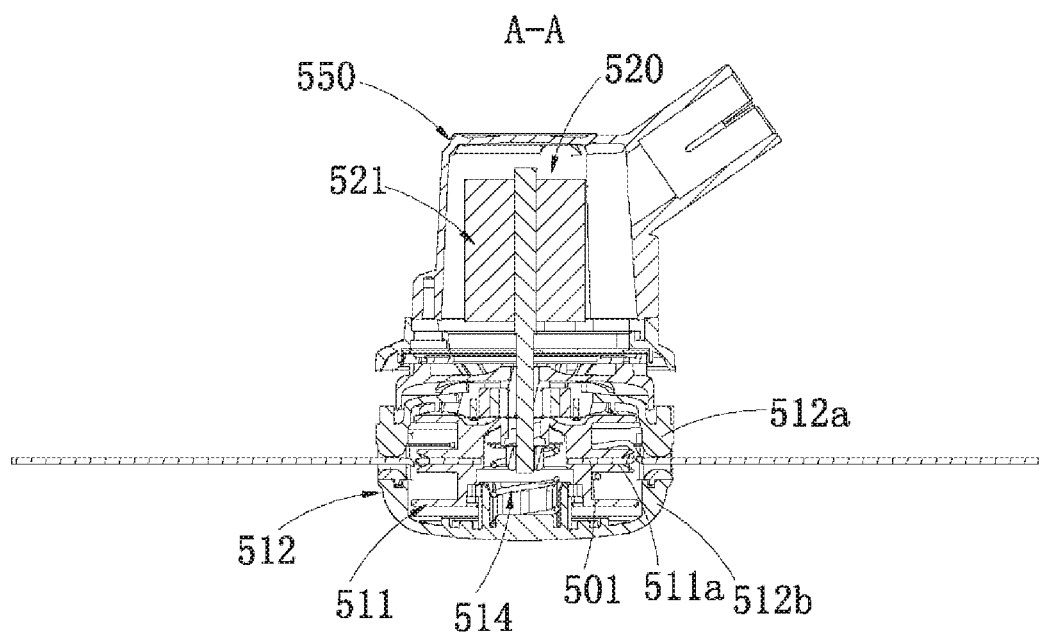
FIG. 5G is a sectional view of the structure cut along line A-A in FIG. 5F.
Figure 5H:
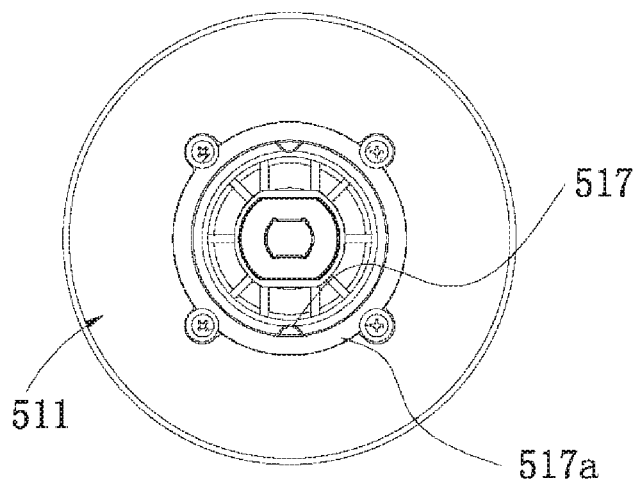
FIG. 5H is a schematic view of a spool and a positioning element in FIG. 5D.
Figure 5I:
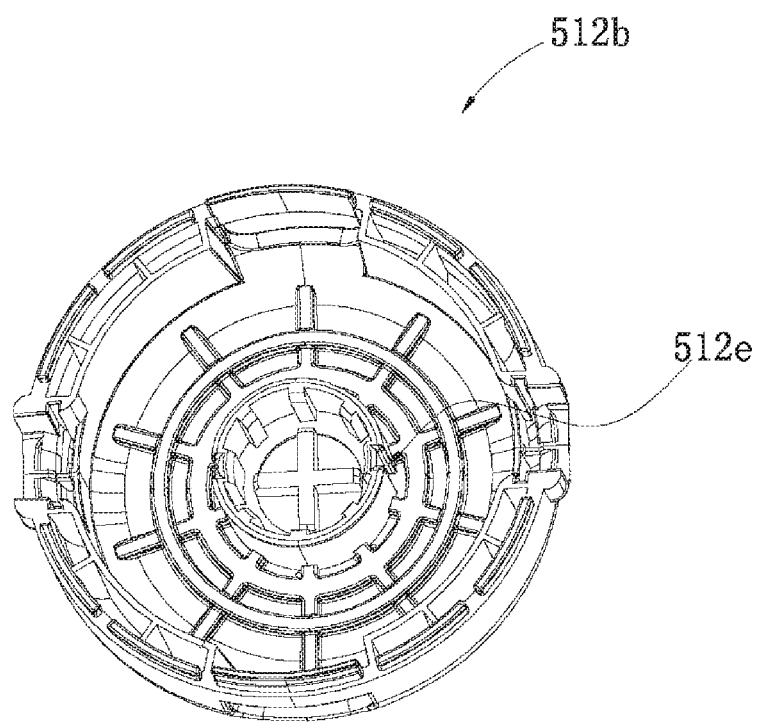
FIG. 5I is a schematic view of a lower cover in FIG. 5D.
Figure 5J:
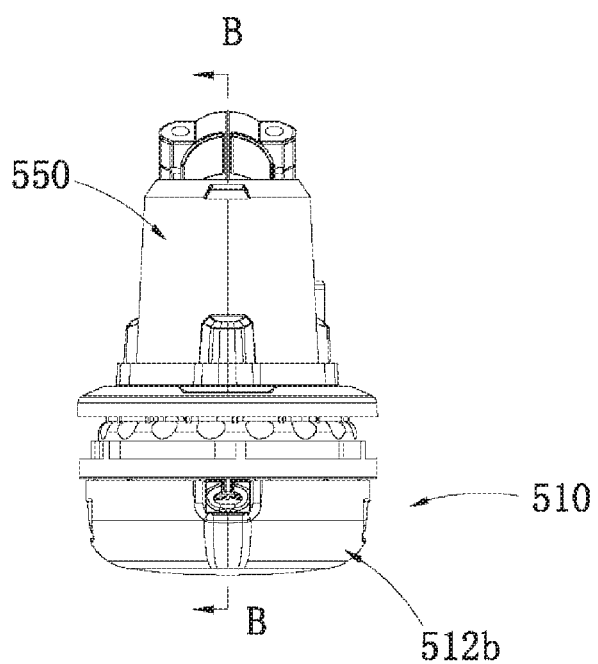
FIG. 5J is a schematic view of the trimming head in FIG. 5F, wherein the trimming head is moved upwardly relative to the first housing.
Figure 5K:
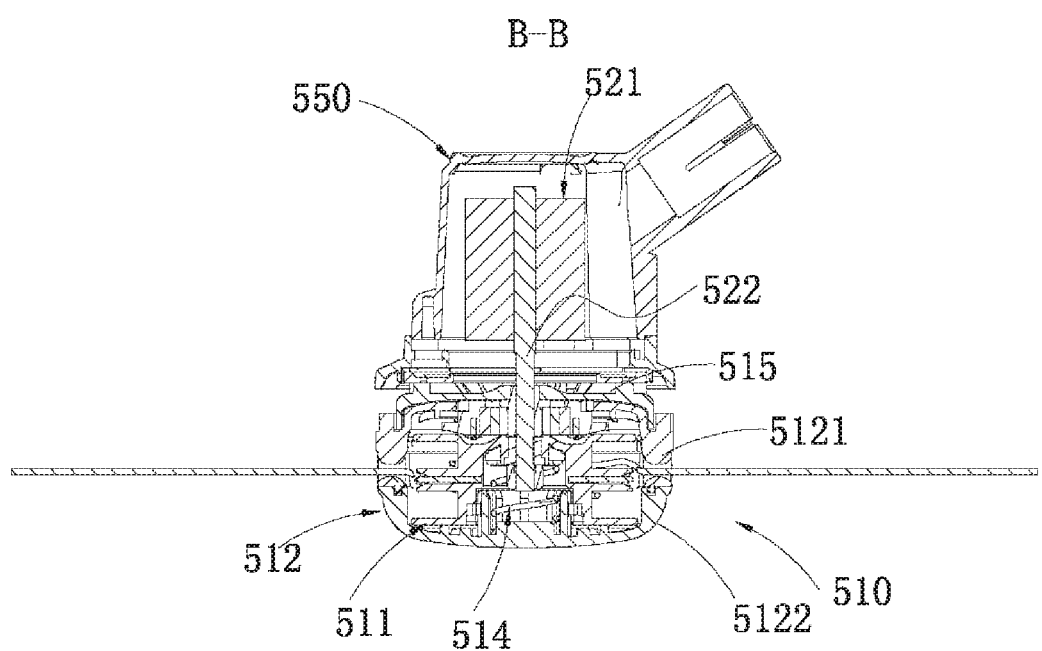
FIG. 5K is a sectional view of the structure cut along line B-B in FIG. 5J.

Referring to FIGS. 5F and 5G, the trimming head 510 is in a free state which is not bumped. Referring to FIGS. 5J and 5K, the trimming head 510 is in a compressed state which is bumped. When the user bumps the trimming head 510 to feed the cutting line 501, the lower cover 512b is contacted with the ground, and the ground applies an upward force to the lower cover 512b so that the upper cover 512a and the lower cover 512b move upward to the state in FIGS. 5J and 5K relative to the spool 511, the fan 515, the motor 521 and the driving shaft 522. At this moment, the head housing 512 is rotated to a certain angle relative to the spool 511. The angle is limited by the engagement of the feeding teeth 516a and the match teeth 512d, so a specific length of the cutting line 501 is released. When the user raises the trimming head 510, the force acting on the lower cover 512b by the ground disappears. The elastic element 514 generates a force to make the lower cover 512b move downward or in a direction far from the spool 511 to the state in FIGS. 5F and 5G. The line bump feeding is finished. This feeding mode is called bump feeding mode. The feeding mode means that an end of the cutting line 501 is disengaged from the spool 511 and extended out of the head housing 512. Or, it could be said that the length of the cutting line 501 located out of the head housing 512 is increased. Or, it could be said that the length of the cutting line 501 for cutting vegetation is increased.

As shown in FIG. 5B, when the grass trimmer is in the cutting mode, the trimming head 510 is rotated clockwise in a direction indicated by an arrow. The spool 511 and the head housing 512 are all rotated clockwise. In the cutting mode, the cutting line 501 is fixed relative to the trimming head 510. The spool 511 is fixed relative to the head housing 512. The grass trimmer 500 also has the auto-winding mode. In the auto-winding mode, the spool 511 is rotated relative to the head housing 512, and the cutting line 501 located out of the head housing 512 is wound on the spool 511 gradually. The rotation direction of the spool 511 in the auto-winding mode is opposite to the rotation direction of the spool 511 in the cutting mode. In the auto-winding mode, the head housing 512 is fixed. Specifically, the head housing 512 is stopped from rotating in the same direction as the spool 511. That is the head housing 512 is stopped from rotating counterclockwise.

Refereeing to FIGS. 5L to 5Q, the grass trimmer 500 further includes a damping device 540 which is fixed by the first housing 550. The damping device 540 includes a stopping element 541 which is a damping element. The stopping element 541 is used to stop the head housing 512 rotating in one direction relative to the first housing 550. The damping device 540 further includes an activating element 542 and a reset spring 543. The stopping element 541 is controlled to be at different positions by the activating element 542. The reset spring 543 can generate force acting on the stopping element 541 so as to make the stopping element 541 restore to an initial state. The grass trimmer 500 further includes a guard 551 fixed on the first housing 550.

The reset spring 543 is connected with the stopping element 541 and the guard 551 on its two ends respectively and can apply force between the stopping element 541 and the guard 551. The damping device 540 includes a protecting element 544 and a guiding element 545. The activating element 542 is covered by the protecting element 544 so that the user is easy to operate the activating element 542. The guiding element 545 is engaged with the stopping element 541 and the activating element 542 so as to guide the stopping element 541 and the activating element 542. The guiding element 545 is fixed on the first housing 550, which can be integrated with the guard 551 or the first housing 550. The guard 551 can be integrated with the first housing 550. The guard 551, the first housing 550 and the guiding element 545 can be integrated as a component.

The head housing 512 is provided with stopping bulges 512f. The stopping bulges 512f can be engaged with the stopping element 541 for stopping the head housing 512 from rotating relative to the spool 511. Specifically, the stopping bulges 512f are formed on the upper cover 512a and located on the edge of the upper cover 512a.

Figure 5L:
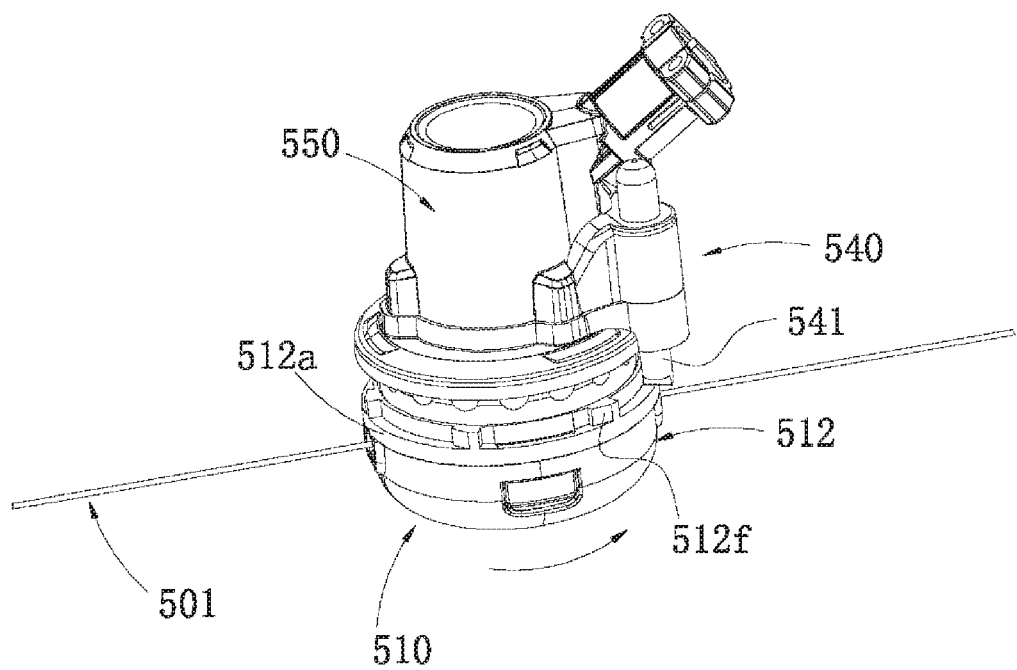
FIG. 5L is a schematic view of a damping device in FIG. 5A.
Figure 5M:
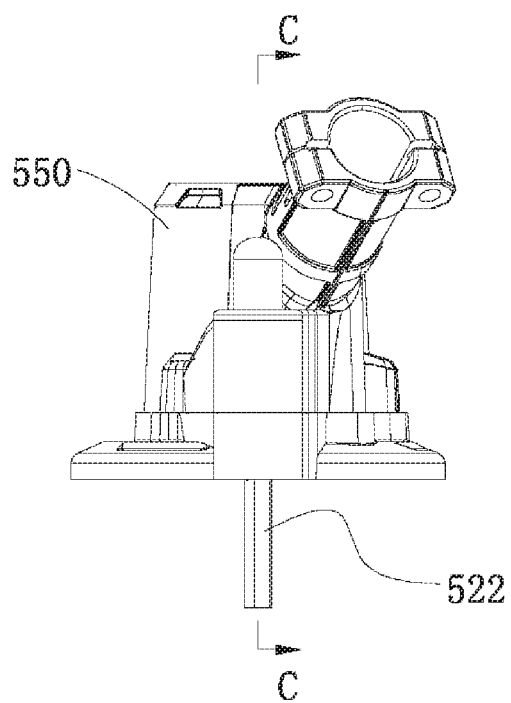
FIG. 5M is a schematic view of the first housing and a driving shaft in FIG. 5C.
Figure 5N:
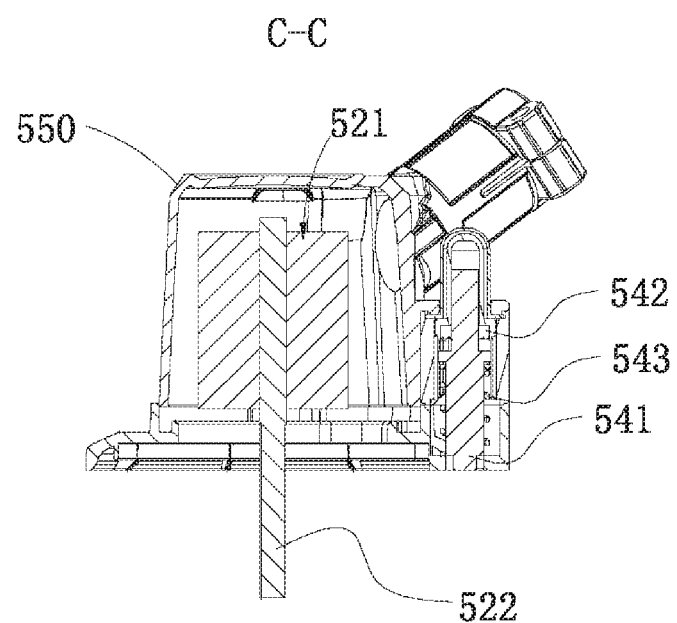
FIG. 5N is a sectional view of the structure cut along line C-C in FIG. 5M.
Figure 50:
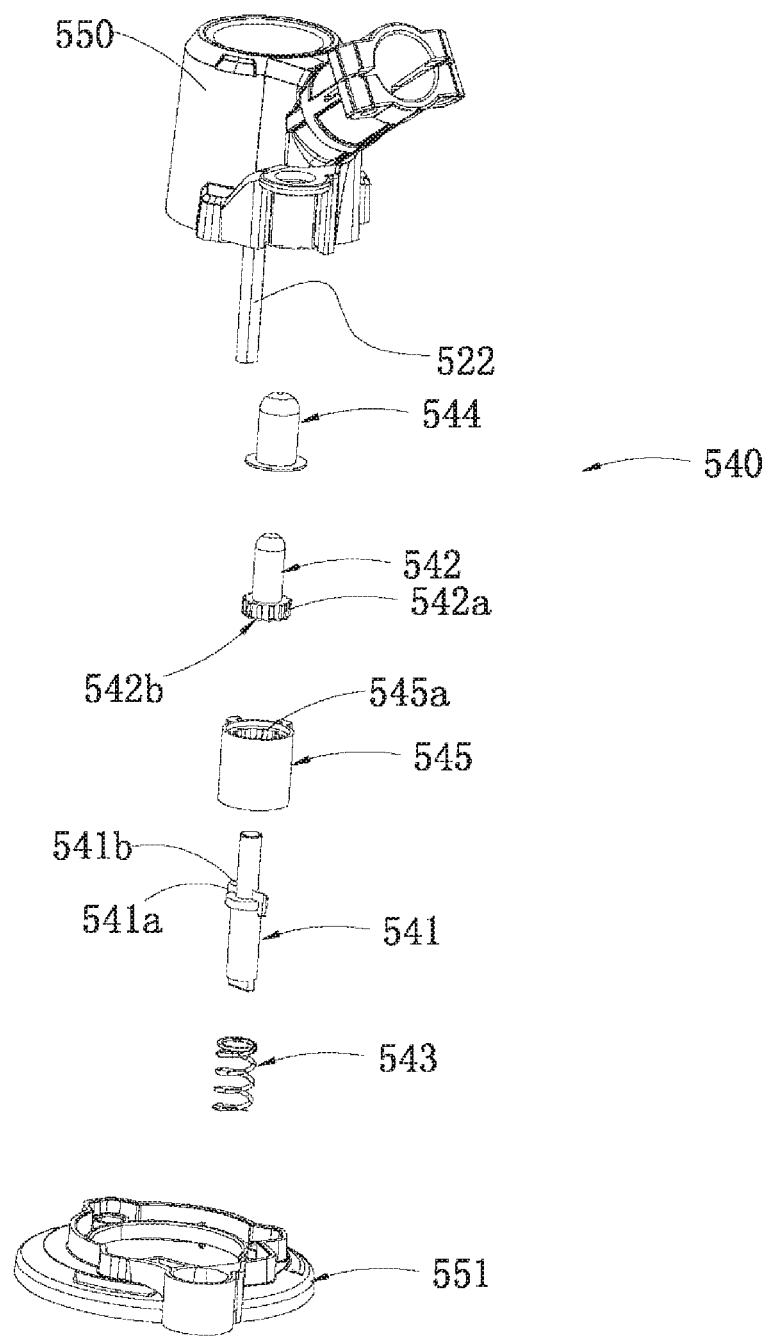
Figure 5P:
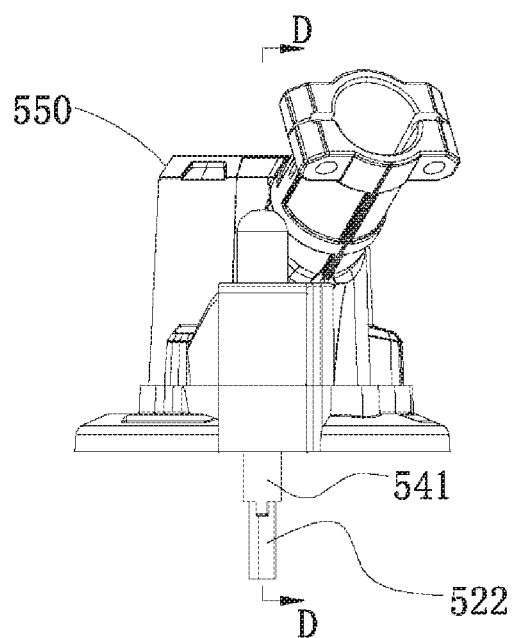
FIG. 5P is a plane view of the damping device in FIG. 5A, wherein a stopping element of the damping device is at a stopping position.
Figure 5Q:
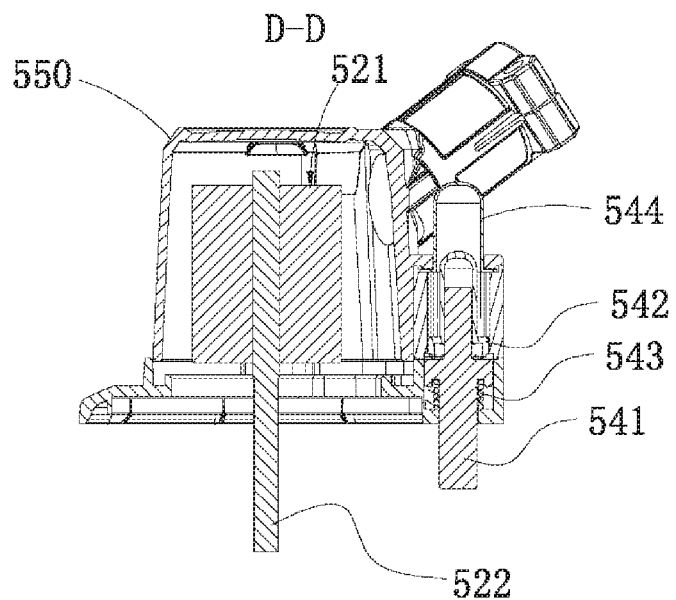
FIG. 5Q is a sectional view of the structure cut along line D-D in FIG. 5P.

The stopping element 541 has a first position and a second position relative to the trimming head 510 or the first housing 550. Referring to FIGS. 5B and 5N, in the first position, that is the initial position of the stopping element 541, the stopping element 541 is separated from the head housing 512 and disengaged with the stopping bulges 512f to stop the head housing 512 from rotating in one direction. Or, it could be said that the stopping element 541 is not extended downward. Referring to FIGS. 5L and 5Q, in the second position, that is a stopping position, the stopping element 541 is contacted with the head housing 512 so as to stop the head housing 512 from rotating in one direction relative to the first housing 550. Specifically, the engagement of the stopping element 541 and the stopping bulges 512f can stop the head housing 512 from rotating counterclockwise as the arrow shown in FIG. 5L.

The stopping element 541 is able to slide relative to the trimming head 510 or the first housing 550. The stopping element 541 is able to slide in the direction of the rotating axis of the trimming head 510. Or, it could be said that the sliding direction of the stopping element 541 is substantially parallel to the rotating axis of the trimming head 510. The stopping element 541 is able to rotate relative to the first housing 550 about a rotating axis. The rotating axis of the stopping element 541 is substantially parallel to the rotating axis of the trimming head 510 or the driving shaft 522.

Specifically, the stopping element 541 is provided with guiding ribs 541a. The guiding element 545 is formed with guiding slots 545a. When the stopping element 541 slides relative to the first housing 550, the guiding ribs 541a slide in the guiding slots 545a. The engagement of the guiding ribs 541a and the guiding slots 545a can stop the stopping element 541 from rotating relative to the first housing 550. The activating element 542 is provided with limiting ribs 542a. The engagement of the limiting ribs 542a and the guiding slots 545a can stop the activating element 542 from rotating relative to the first housing 550. The activating element 542 is formed with a driving surface 542b. The stopping element 541 is formed with an engaging surface 541b. Specifically, the driving surface 542b is formed on the bottom of the activating element 542, and the engaging surface 541b is formed on the top of the guiding ribs 541a. When the activating element 542 is pressed downward, the stopping element 541 is pressed to move downward by the activating element 542. The guiding ribs 541a of the stopping element 541 slide in the guiding slots 545a and disengage from the guiding slots 545a finally, and the limiting ribs 542a of the activating element 542 are still in the guiding slots 545a. So, the activating element 542 is stopped from rotating relative to the first housing 550. At this moment, the driving surface 542b is engaged with the engaging surface 541b so as to constitute an engagement of inclined surfaces. Thus, the stopping element 541 is rotated relative to the activating element 542 or the first housing 550 and reaches the stopping position finally.

When the auto-winding mode is finished, the user can control the trimming head 510 to enter the cutting mode or the feeding mode, and the trimming head 510 is rotated in another direction. Specifically, the rotation direction of the motor in the cutting mode is different from the rotation direction of the motor in the auto-winding mode. And the rotation direction of the motor in the feeding mode is different from the rotation direction of the motor in the auto-winding mode. When the auto-winding mode is finished and going into the cutting mode or the feeding mode, the trimming head 510 is driven to rotate reversely by the motor. At this moment, the head housing 512 is rotated clockwise in a direction indicated by the arrow in FIG. 19. This direction is opposite to the rotation direction of the head housing 512 stopped by the stopping element 541. The stopping bulges 512f on the head housing 512 is contacted with the stopping element 541 so as to drive the stopping element 541 to rotate. When the guiding ribs 541a of the stopping element 541 is rotated to align with the guiding slots 545a, the stopping element 541 is moved upward under the action of the reset spring 543. The guiding ribs 541a slide upward in the guiding slots 545a and restore to the initial position.

As shown in FIG. 5A, the operating device 530 includes a first operating element 531 and a second operating element 533. When the first operating element 531 is triggered, the grass trimmer 500 is in the cutting mode. The second operating element 533 is used for the user to start the auto-winding mode of the grass trimmer 500. The operating device 530 further includes a handle housing 532 for the user to grip. The first operating element 531 and the second operating element 533 are connected with the handle housing 532. The first operating element 531 and the second operating element 533 are close to each other for easy operation by the user.

Specifically, the grass trimmer 500 includes a first electronic switch and a second electronic switch. The first electronic switch is controlled by the first operating element 531, and the second electronic switch is controlled by the second operating element 533. When the first operating element 531 is triggered, the second operating element 533 cannot be triggered. Similarly, when the second operating element 533 is triggered, the first operating element 531 cannot be triggered. When the first operating element 531 is triggered, the grass trimmer 500 is in the cutting mode. And when the second operating element 533 is triggered while the first operating element 531 is not released, the grass trimmer 500 cannot go into the auto-winding mode. Similarly, when the second operating element 533 is triggered, the grass trimmer 500 is in the auto-winding mode. And when the first operating element 531 is triggered while the second operating element 533 is not released, the grass trimmer 500 cannot go into the feeding mode. Alternatively, the grass trimmer includes a first electronic switch which can be controlled by the first operating element and the second operating element.

The first operating element 531 is able to start the motor 521. When the motor 521 is started by the first operating element 531, the motor 521 rotates in a first running state.

The second operating element 533 is able to start the motor 521. When the motor 521 is started by the second operating element 533, the motor 521 rotates in a second running state. The rotation direction of the motor 521 in the first running state is different from the rotation direction of the motor 521 in the second running state. In the auto-winding mode, the motor 521 runs in the second running state. In the cutting mode, the motor 521 runs in the first running state, and the rotational speed of the motor 521 is greater than or equal to 4000 rpm and less than or equal to 8000 rpm.

Specifically, when the grass trimmer 500 is in the auto-winding mode, the rotational speed of the spool 511 is greater than or equal to 100 rpm and less than or equal to 2000 rpm. More specifically, the rotational speed of the spool 511 is greater than or equal to 300 rpm and less than or equal to 800 rpm. Alternatively, the rotational speed of the spool 511 is greater than or equal to 30 rpm and less than or equal to 600 rpm. Or, the rotational speed of the spool 511 is greater than or equal to 60 rpm and less than or equal to 300 rpm. A ratio of the rotational speeds of the spool 511 in the cutting mode and in the auto-winding mode is greater than or equal to 5 and less than or equal to 300. Further, the ratio of the rotational speeds of the spool 511 in the cutting mode and in the auto-winding mode is greater than or equal to 10 and less than or equal to 200.

Figure 6A:
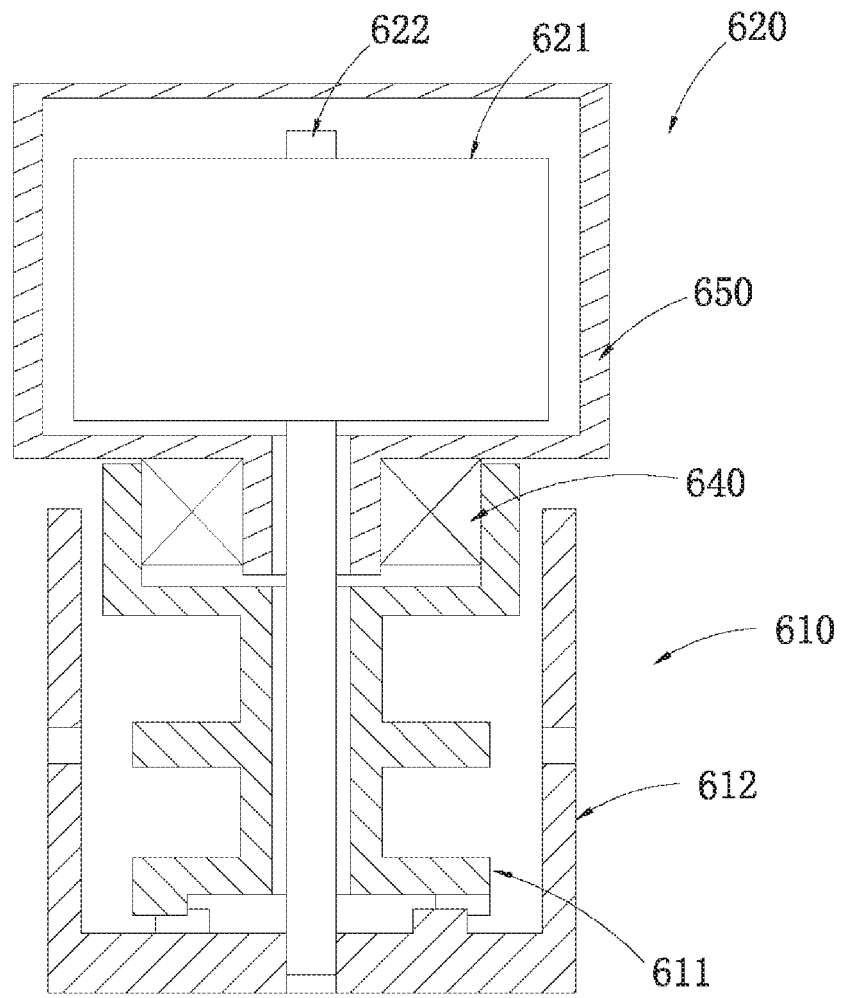
FIG. 6A is a schematic view of a trimming head, a motor and a damping device.

As shown in FIG. 6A, a motor 621 has a driving shaft 622 for driving a head housing 612 and a one-way bearing 640 and a damping device 611 are provided.

A driving device 620 includes the motor 621. A trimming head 610 includes a spool 611 and the head housing 612.

A supporting element 650 is configured as a housing for accommodating the motor 621. The one-way bearing 640 is disposed between the spool 611 and the supporting element 650, so that the spool 511 can only rotate unidirectionally relative to the supporting element 650.

The driving shaft 622 passes through the spool 611, but the spool 611 is not driven by the driving shaft 622 directly. That is, the torque is not transmitted directly between the driving shaft 622 and the spool 611. The driving shaft 622 is connected fixedly with the head housing 612, and the head housing 612 is driven by the head housing 612 directly. And then the spool 611 is driven by the head housing 612 through the transmission structure in FIG. 3B.

According to the example and the principle described above, when the motor 621 is rotated forwardly, the spool 611 and the head housing 612 can be rotated synchronously so as to perform the cutting mode. When the motor 621 is rotated reversely, the spool 611 is rotated relative to the head housing 612 so as to perform the auto-winding mode.

It can be understood that the damping device can not only apply a resistance force on the head housing to damp its rotation, but can also apply a resistance force on the spool to damp its rotation.

In another example, the damping device can apply a resistance force both on the head housing and on the spool. For example, more than one damping element can be disposed based on the embodiment in FIG. 6A, so that the head housing 612 can be damped and slowed down through contacting in the auto-winding mode.

In other words, the damping device includes a first damping element and a second damping element. The first damping element can apply a first resistance force on the spool to damp its rotation. The second damping element can apply a second resistance force on the head housing to damp its rotation. Thus, the head housing can be rotated relative to the spool under the effect of the first resistance force and the second resistance force.

Figure 7A:
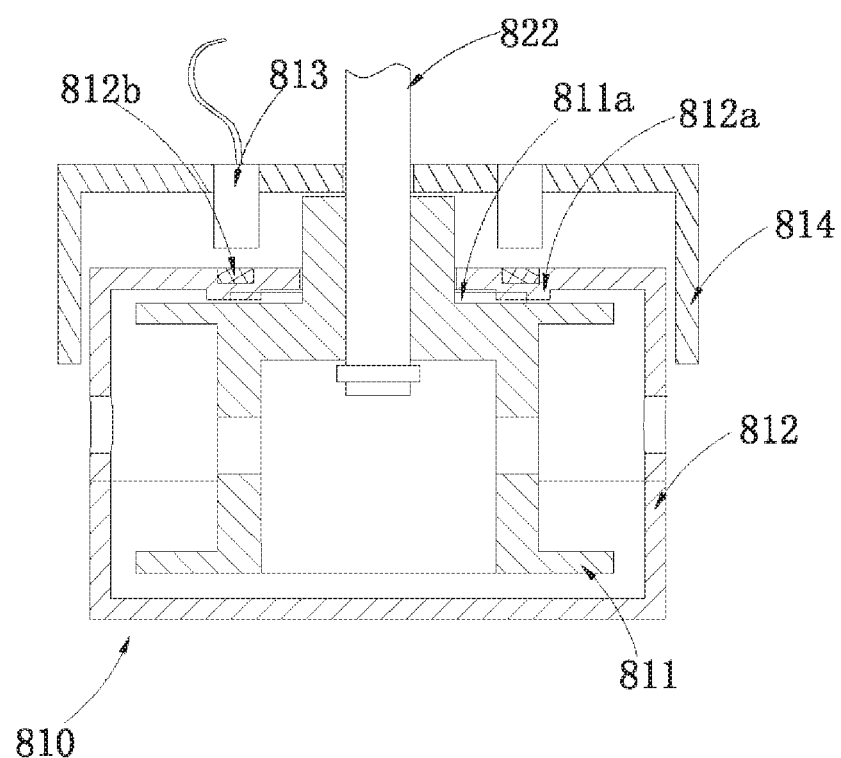
FIG. 7A is a schematic view of an electric magnet and a trimming head.
Figure 7B:
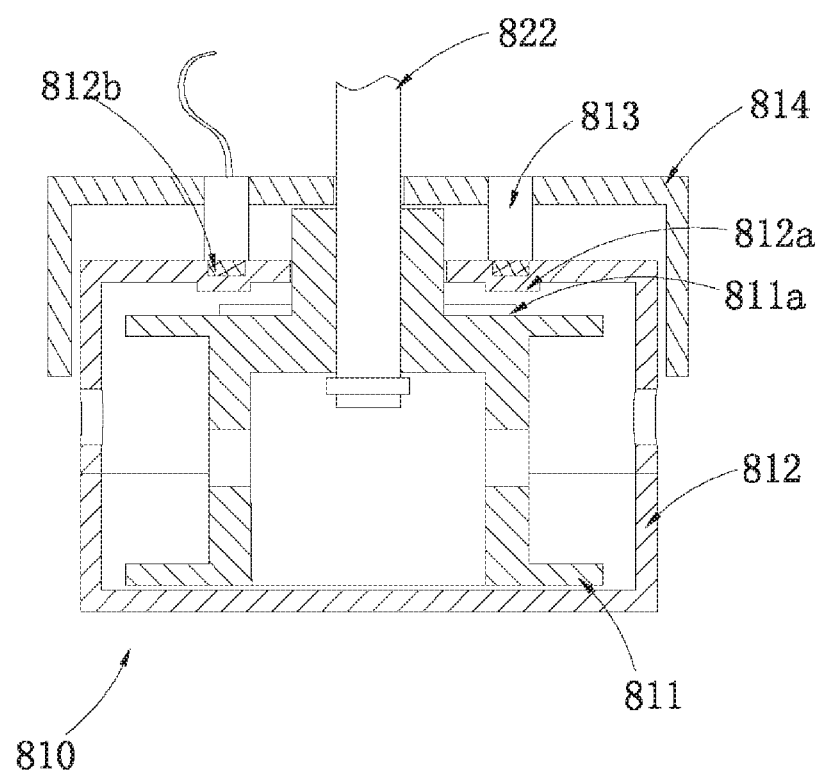
FIG. 7B is a schematic view of a head housing in FIG. 7A, wherein the head housing is moved relative to a spool.

Referring to FIGS. 7A-7B, a trimming head 810 includes a spool 811 and a head housing 812 which are similar to the spool and the head housing described previously. A driving shaft 822 is connected directly with the spool 811 so as to drive the spool 811 to rotate. The spool 811 and the head housing 812 are formed with transmission structures 811a and 812a respectively which can be engaged with each other. When the head housing 812 is at an axial position as shown in FIG. 7A, the transmission structures 811a and 812a are engaged with each other, so the head housing 812 is driven by the spool 811 to rotate together. While, when the head housing 812 is at an axial position as shown in FIG. 7B, the transmission structures 811a and 812a are disengaged from each other. At this moment, if the head housing 812 is damped, the spool 811 is rotated relative to the head housing 812.

For controlling the axial position of the head housing 812, an electromagnet 813 is provided, and a magnetic element 812b is fastened on the head housing 812. A supporting element 814 can be provided for mounting the electromagnet 813. The supporting element 814 can be a guard of the grass trimmer, a housing of the motor or other parts connected fixedly with them.

When it is needed to perform the auto-winding mode, the electromagnet 813 is powered on to generate a magnetic field so as to attract the magnetic element 812b. So, the axial position of the head housing 812 is changed. At this moment, the motor is controlled so as to make the driving shaft 822 drive the spool 811, and a relative rotation is created between the spool 811 and the head housing 812. While, when it is needed to perform the cutting mode, the electromagnet 813 does not generate the magnetic field, and the head housing 812 is moved in the axial direction so as to make the transmission structures 811a and 812a engage. Thus, the spool 811 and the head housing 812 are rotated synchronously.

Alternatively, the magnetic element 812b is an annular element. The electromagnet 813 is disposed at a corresponding position. However, a part of the head housing 812 can be made of magnetic material or metal material.

Figure 8A:
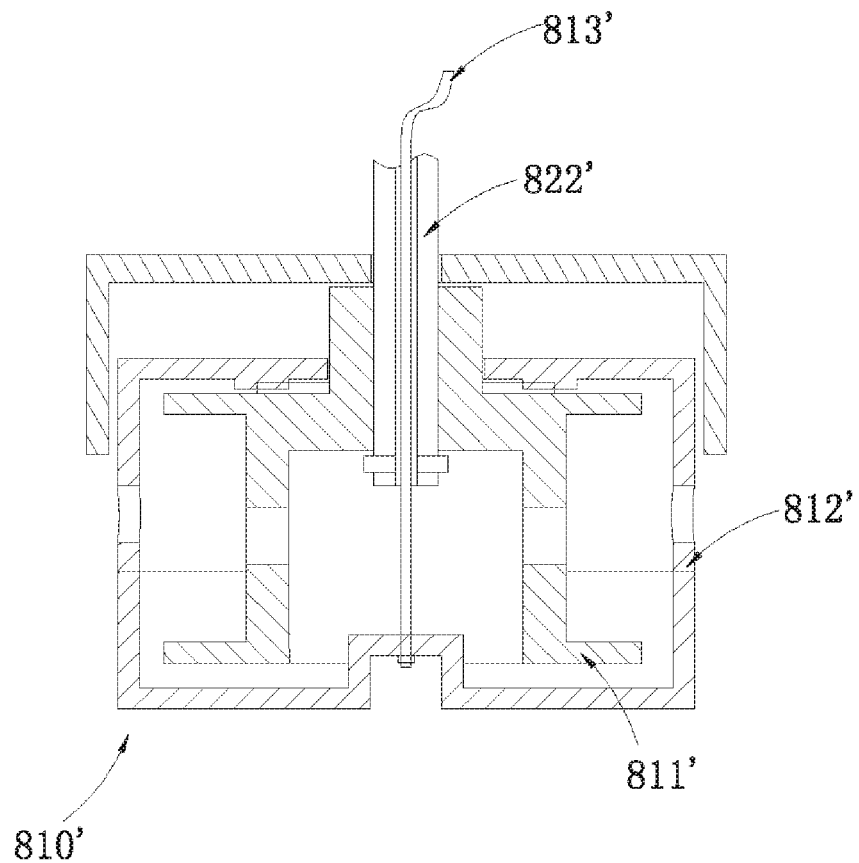
FIG. 8A is a schematic view of a head housing, wherein the head housing can be pulled by a rope.
Figure 8B:
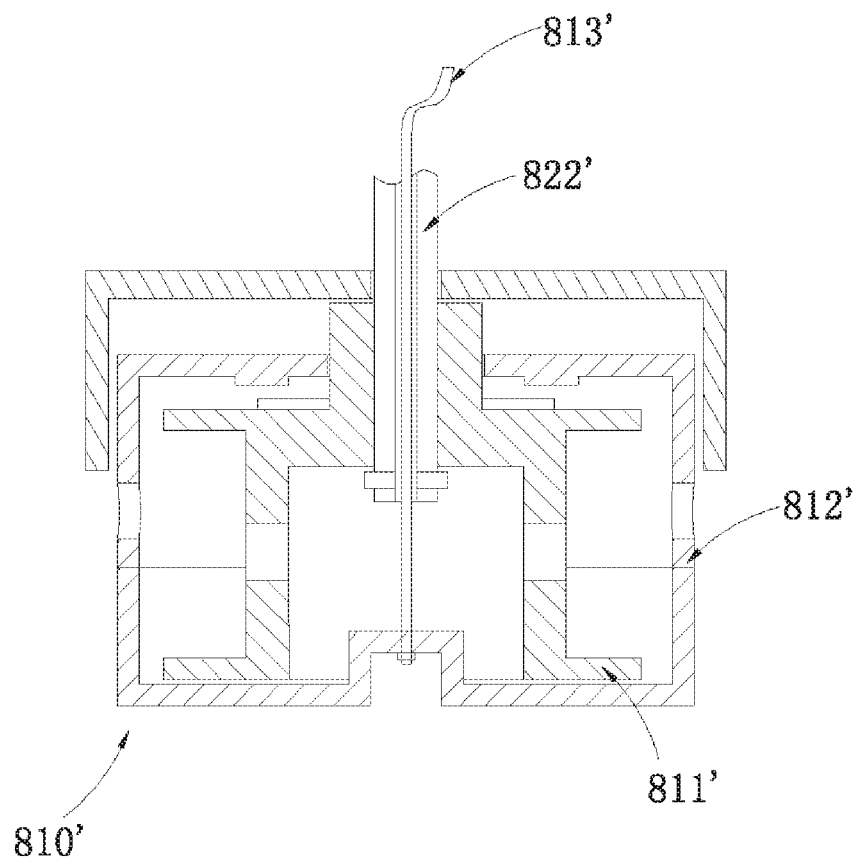
FIG. 8B is a schematic view of the head housing in FIG. 8a, wherein the head housing is moved relative to a spool.

Referring to FIGS. 8A-8B, a trimming head 810' includes a rope, wire, cable, or the like 813'. The rope 813' passes through a driving shaft 822' directly, which is used to pull a head housing 812' to change the position of the head housing 812'. Thus, a spool 811' can be rotated relative to the head housing 812'.

Figure 8C:
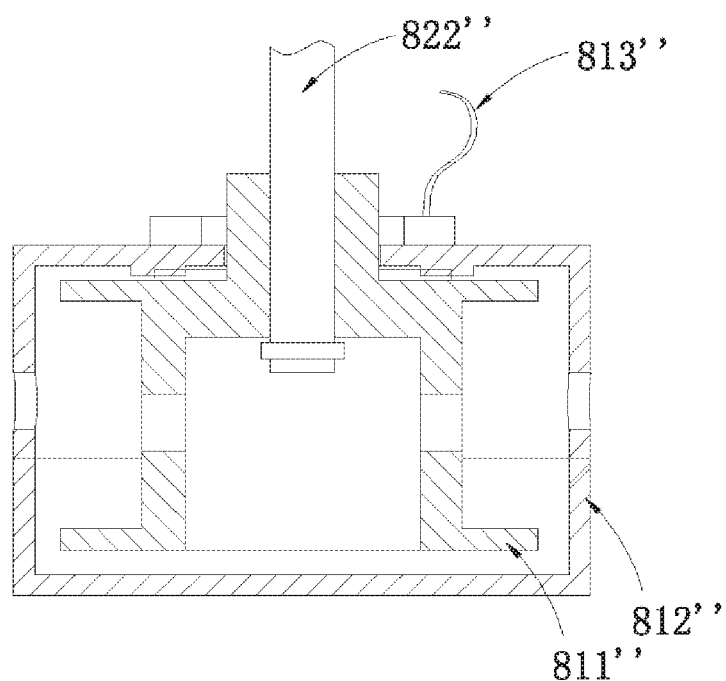
FIG. 8C is another schematic view of a head housing, wherein the head housing can be pulled by a rope.
Figure 8D:
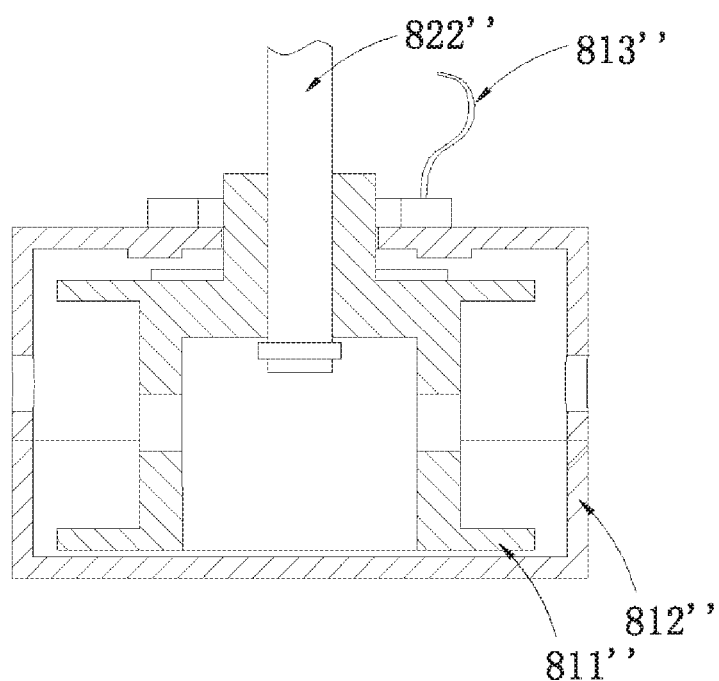
FIG. 8D is a schematic view of the head housing in FIG. 8C, wherein the head housing is moved relative to a spool.

Referring to FIGS. 8C-8D, a trimming head 810" includes a rope 813" for pulling a head housing 812" from the top so as to change the position of the head housing 812". Thus, a spool 811" can be rotated relative to the head housing 812". Surely, the motor can be used to drive the head housing or the similar method can be used to change its position so as to realize the function above.

In the embodiments as shown in FIG. 7A-8D, a clutch device is provided for disengaging the spool and the head housing when it is needed. So, only one of the spool and the head housing is driven by the driving shaft, and the relative rotation is created between them. While, when the spool and the head housing are needed to rotate synchronously, they are engaged, so that one of them can drive the other.

Figure 9A:
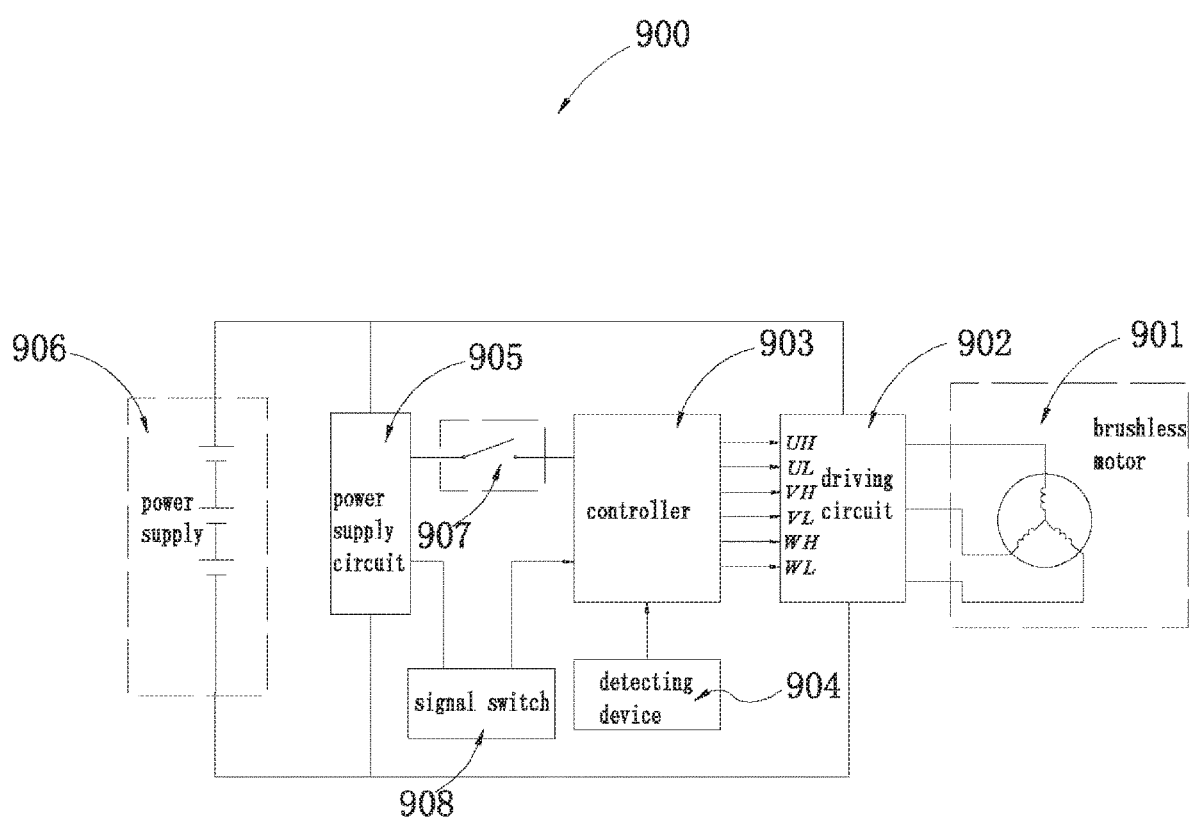
FIG. 9A is a circuit block diagram of a grass trimmer using a brushless motor.

As shown in FIG. 9A, a grass trimmer 900 includes a brushless motor 901, a driving circuit 902, a controller 903, a detecting device 904, a power supply circuit 905 and a power supply 906.

The brushless motor 901 includes three-phase windings with Y-type connection. Surely, the three-phase windings can use triangular connection.

Figure 9B:
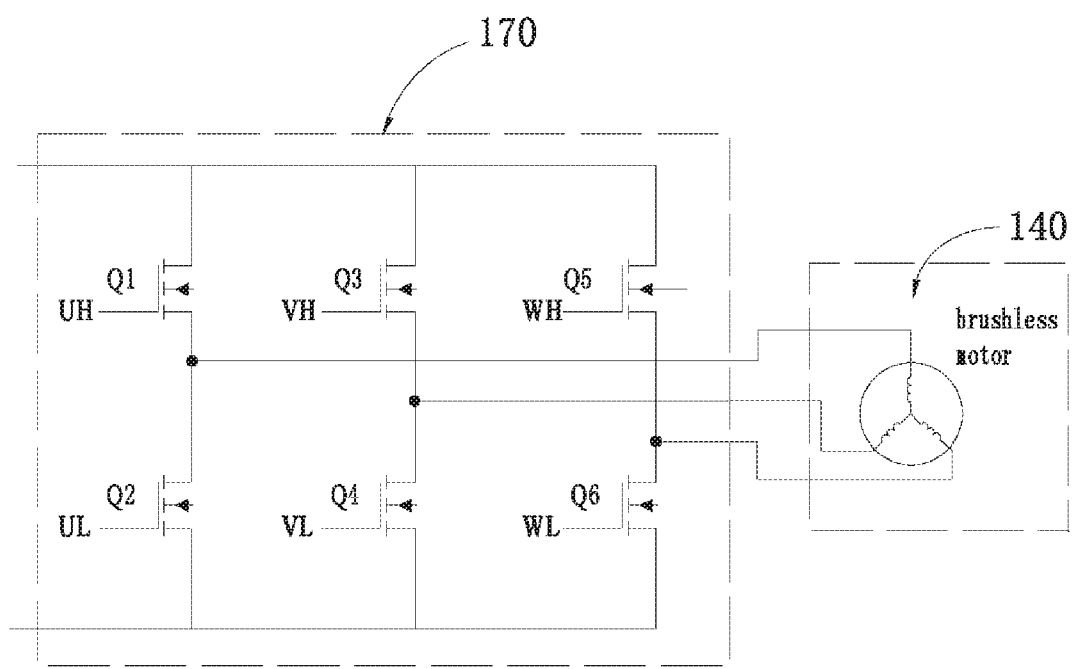
FIG. 9B is a schematic view of a driving circuit in FIG. 9A.

The driving circuit 902 is used to drive the brushless motor 901. As shown in FIG. 9B, specifically, the driving circuit 902 includes six semiconductor switches Q1-Q6 which constitute a full-bridge circuit with six arms. The terminals of the windings of the brushless motor 901 are connected between two corresponding semiconductor switches of the driving circuit 902. The semiconductor switches Q1-Q6 can be driven by corresponding electrical signals so as to conduct the circuit at a certain duty cycle. Thus, the current passes the corresponding winding to drive the brushless motor 901. It is noted that the controlling signal can control the current of the brushless motor 901 through controlling the duty cycle of the semiconductor switches Q1-Q6 so as to control the speed of the brushless motor 901.

The controller 903 is used to control the driving circuit 902, and in particular to send controlling signals to the driving circuit 902. The controller 903 can be constituted by a main chip mainly for operating and outputting signals and a driving chip mainly for sending driving signals to the driving circuit 902. The main chip controls the driving circuit 902 through controlling the driving chip. Surely, the controller 903 can be constituted by one chip.

The detecting device 904 includes a Hall sensor which including several Hall elements. The detecting device 904 can determine the speed of a rotor of the brushless motor 901 according to the signal change of the Hall elements.

The detecting device 904 can detect the voltage and current of the windings of the brushless motor 901 and feedback to the controller 903 as the control basis of the controller 903.

The power supply circuit 905 is mainly used to adjust the voltage of the power supply 906 so that the controller 903 can obtain proper power supply. The power supply 906 is mainly used to supply power to the grass trimmer 900. Alternatively, the power supply 906 is a battery device which can be charged repeatedly.

In this example, a physical switch 907 can be disposed between the controller 903 and the power supply circuit 905 which can be controlled by the user to switch on or off the electric connection between the controller 903 and the power supply circuit 905, so the controller 903 cannot drive the brushless motor 901.

The physical switch 907 can be acted as a main switch of the grass trimmer 900, which is used for the user to control the start of the brushless motor 901.

As shown in FIG. 9A, a signal switch 908 can be provided. The signal switch 908 is able to be operated by the user to send different signals. The controller 903 can output different control modes according to the signals sent by the signal switch 908, so that the brushless motor 901 has different running states. Thus, the signal switch 908 can be acted as an operating element for the user to choose the cutting mode or the auto-winding mode.

Specifically, when the user chooses the cutting mode, the signal switch 908 sends a first signal. At this moment, the user controls the physical switch 907 to power on the controller 903. The controller 903 enters a first control mode according to the first signal received and outputs the driving signal to the driving circuit 902 so as to make the brushless motor 901 rotate forwardly at a high speed. When the user chooses the auto-winding mode, the signal switch 908 sends a second signal which is different from the first signal. The controller 903 enters a second control mode according to the second signal and outputs the control signal so as to make the brushless motor 901 rotate reversely at a low speed.

Surely, two physical switches or two signal switches can be used, which can be used to switch the modes and control the start of the brushless motor 901 respectively.

The speed can be controlled by the duty cycle used for driving the driving circuit 902 when the controller 903 is in the first control mode and the second control mode. The controller 903 can output the driving signal at a high duty cycle in the first control mode, and output the driving signal at a low duty cycle in the second control mode.

Otherwise, in order to make the winding stop automatically, the current of the brushless motor 901 can be detected by the detecting device 904. As shown in FIG. 4H, when the winding is finished, the cutting line is tensioned, and the current of the brushless motor 901 is increased suddenly. The controller 903 can determine whether the cutting line is tensioned according to a current threshold or a current slop threshold so as to make the brushless motor 901 in the auto-winding mode stop.

Otherwise, as the cutting line is being wound, the load of the brushless motor 901 becomes high due to the increase of the mass of the cutting line. So, the current of the brushless motor 901 increases. Thus, a current threshold can be set to determine whether the winding is finished. Similarly, the speed of the motor decreases due to the increase of the load. Thus, a speed threshold or a speed slop threshold can be set to determine whether the winding is finished. When the speed decreases fast or decreases to a certain extent, the controller 903 determines that the auto-winding is finished.

Or, a position sensor or an optical sensor can be used to determine the position and state of the cutting line so as to finish the auto-winding mode.

Otherwise, based on the same principle, in order to prevent the user from starting the auto-winding mode accidentally while the trimming head still has cutting line stored therein, the controller 903 activates the auto-winding mode firstly. If a representation of the high load occurs, for example the large current or low speed, the controller 903 can determine that the auto-winding mode is not suitable for running at this moment. And then the brushless motor 901 is stopped to drive, and a sound signal or a light signal can be used to remind the user.

In a word, the controller 903 can determine the load state of the brushless motor 901 according to the speed or current of the brushless motor 901 so as to determine when to stop the winding and whether the auto-winding mode is suitable currently.

Specifically, the controller 903 can realize the controlling method as following:

a) starting the auto-winding mode;

b) determining whether the winding is suitable currently, if yes, then going to the next step, if no, the auto-winding is stopped; and c) determining whether the parameters (current, current slop, speed, speed slope) related to the load is beyond a preset range, if yes, the auto-winding mode is stopped, if no, the auto-winding mode is continued.

Figure 9C:
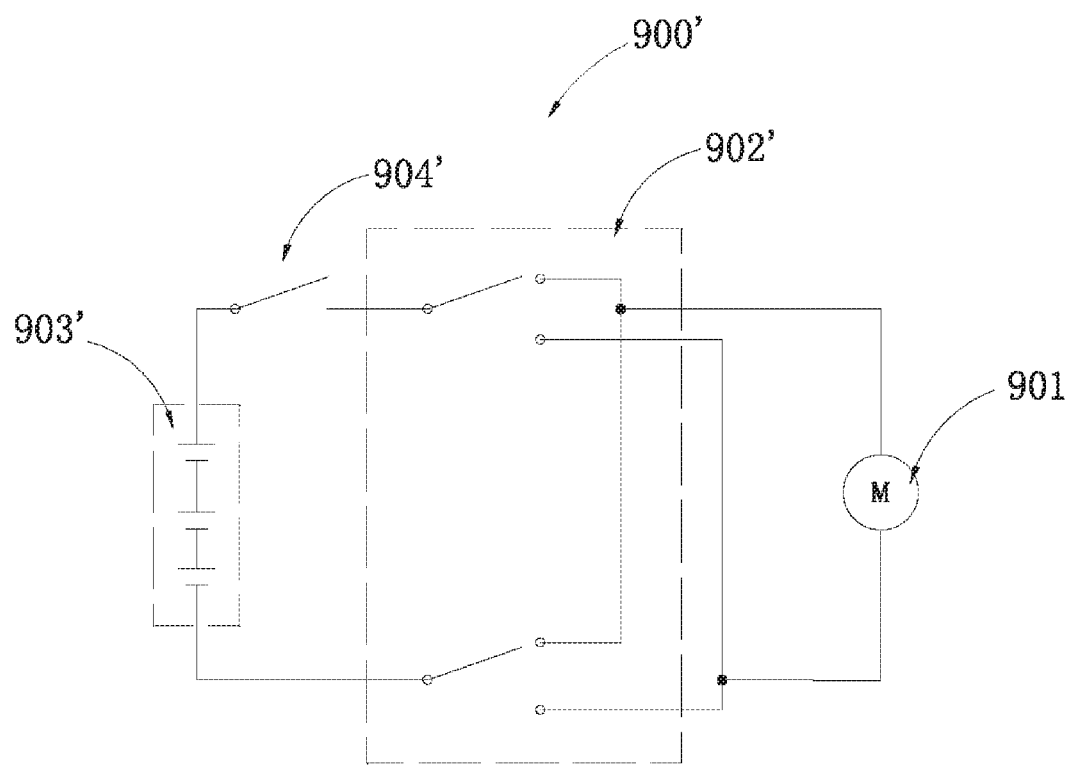
FIG. 9C is a circuit block diagram of a grass trimmer using a brush motor.

As shown in FIG. 9C, the grass trimmer 900 includes a brush motor 901'. In order to realize the switching between the forward rotation and the reverse rotation, a toggle switch 902' can be used to switch the connecting methods between the brush motor 901' and a power supply 903'. And then a main switch 904' can be operated to start the brush motor 901'.

Figure 10A:
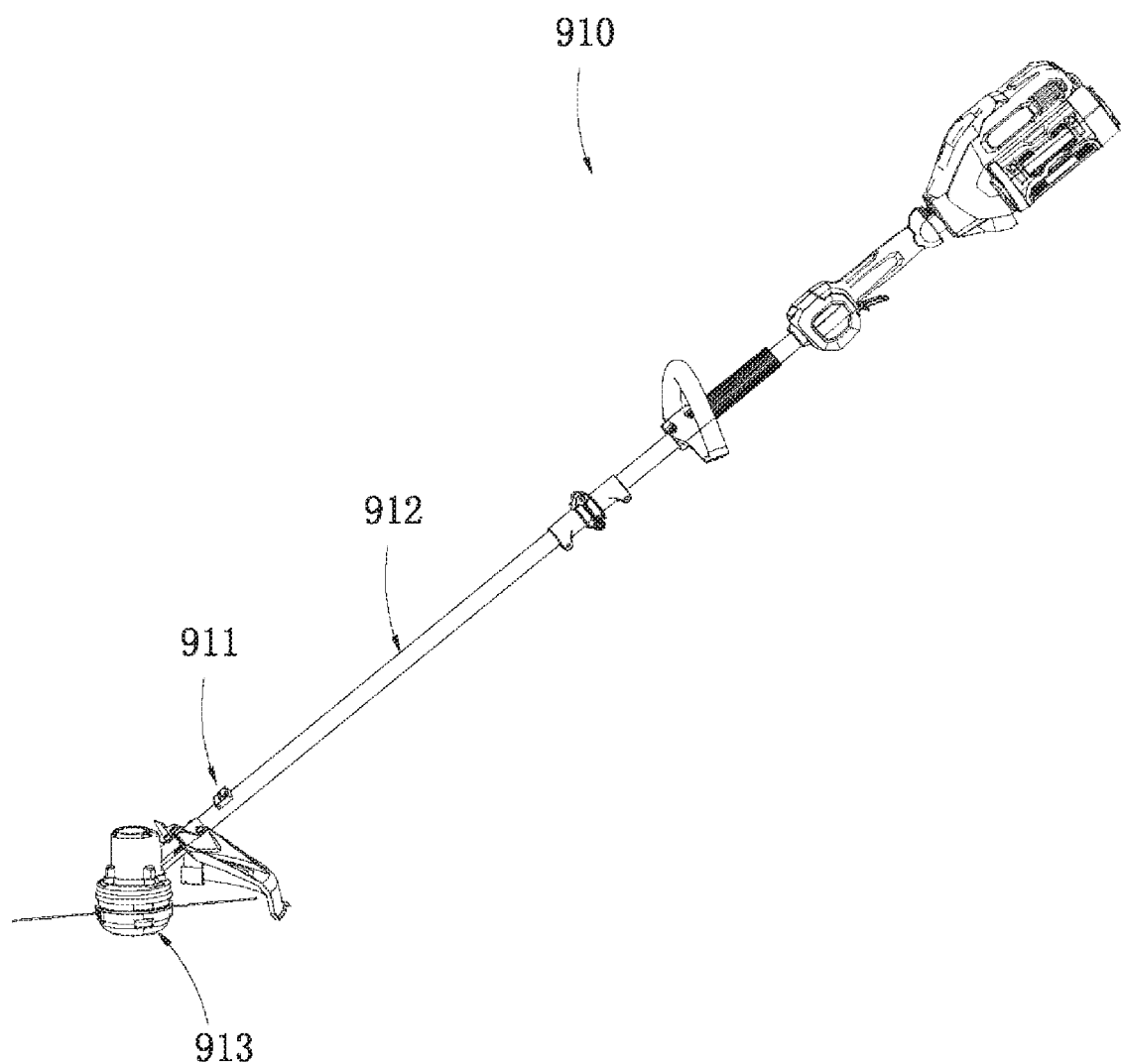
FIG. 10A is a schematic view of the second operating element disposed on a connecting rod assembly.

Specifically, a difference between the grass trimmer 910 in FIG. 10A and the grass trimmer 500 in FIG. 5A is the position of the second operating element. In FIG. 10A, the second operating element 911 is disposed on the connecting rod assembly 912 and close to the trimming head 913.

Figure 10B:
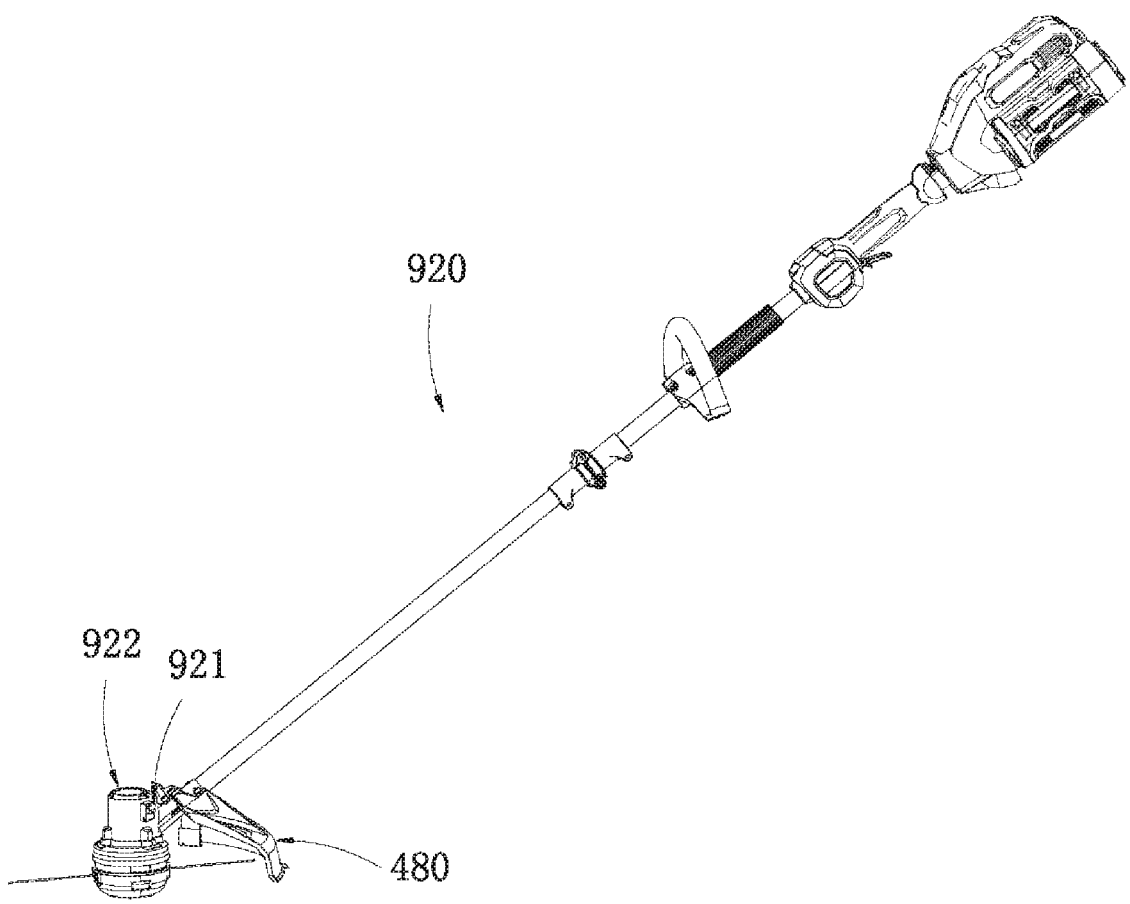
FIG. 10B is a schematic view of the second operating element disposed on the first housing.

As shown in FIG. 10B, a second operating element 921 of a grass trimmer 920 can be disposed on a first housing 922.

Figure 10C:
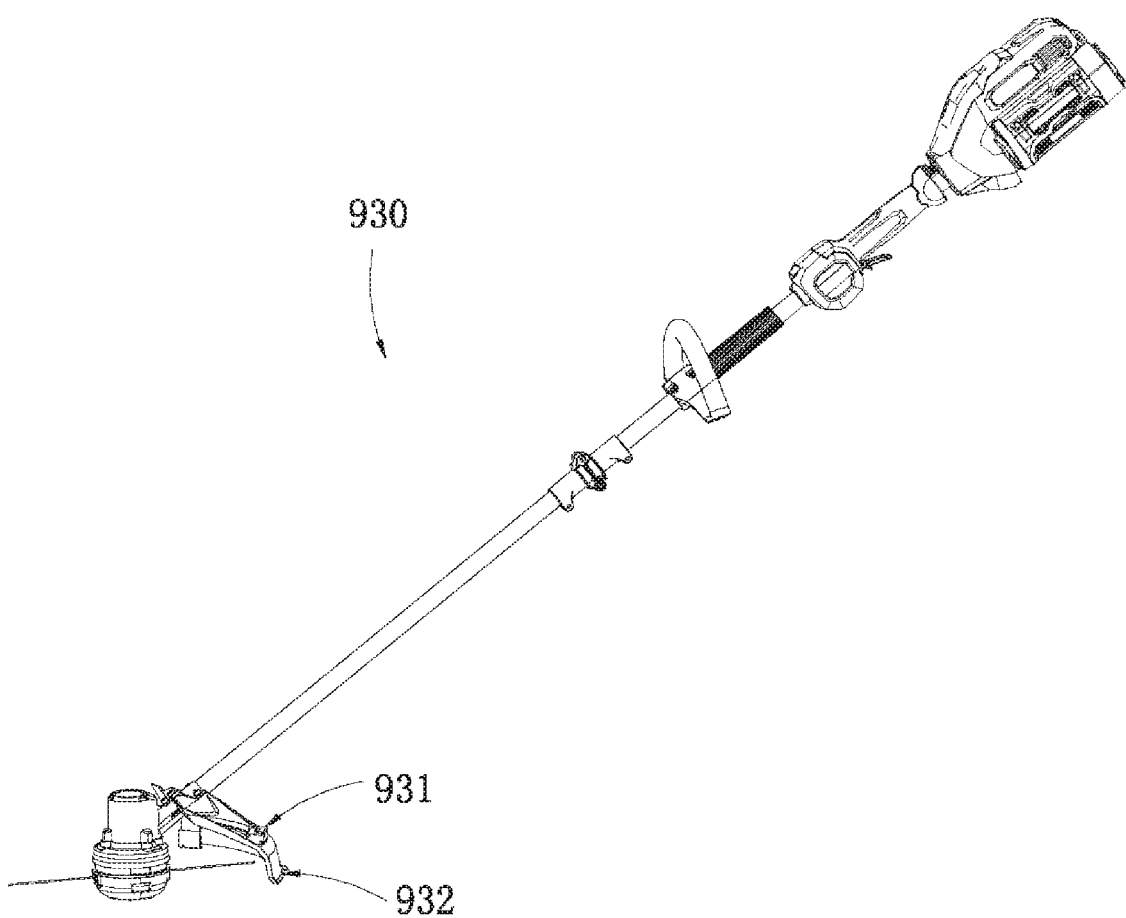
FIG. 10C is a schematic view of the second operating element disposed on a guard.

As shown in FIG. 10C, a second operating element 931 of a grass trimmer 930 can be disposed on a first housing 932.

The second operating element is disposed close to the trimming head, so that the user can start the auto-winding mode conveniently when the cutting line is inserted in the trimming head. Otherwise, the first operating element for starting the cutting mode is far from the second operating element, so that the user cannot touch the first operating element while the auto-winding is running. Similarly, the second operating element cannot be touched accidentally while the cutting mode is running.

Figure 11A:
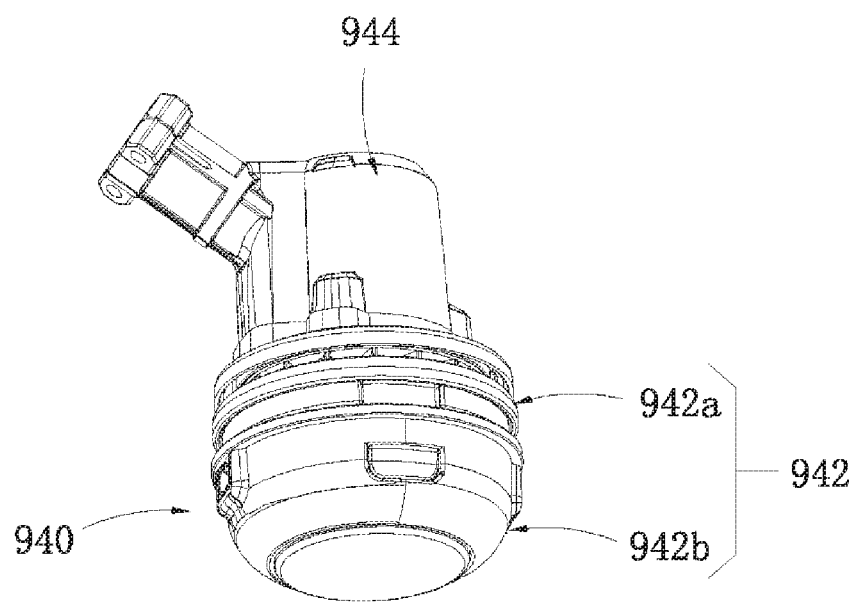
FIG. 11A is a schematic view of a grass trimmer having a line holding member.
Figure 11B:
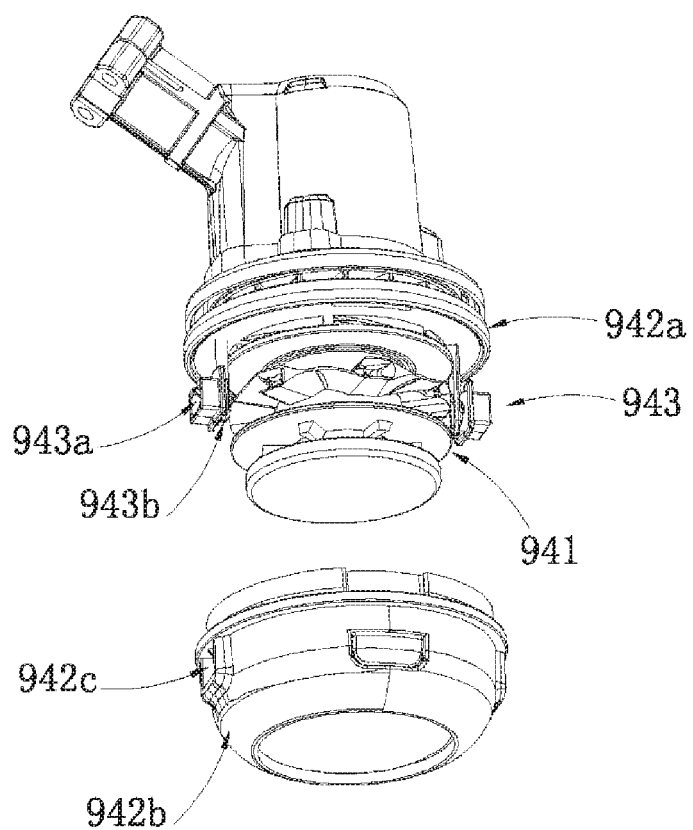
FIG. 11B is a schematic view of a head housing and a spool of the grass trimmer in FIG. 11A, wherein the head housing and the spool are separated.
Figure 11C:
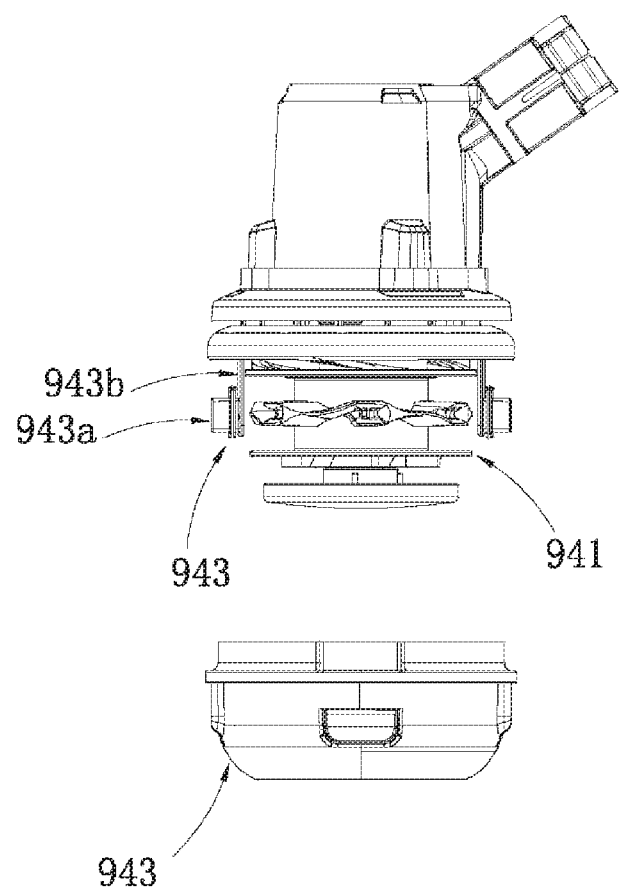
FIG. 11C is a plane view of the structure in FIG. 11A.

Referring to FIGS. 11A-11C, a grass trimmer 940 includes a spool 941, a head housing 942 and line frame elements 943. The spool 941 can be driven by a motor to rotate. The head housing 942 includes an upper cover 942a and a lower cover 942b which are detachable. The head housing 942 can be rotated relative to the spool 941. The line frame elements 943 can be mounted on the head housing 942, in particular on the upper cover 942a in a detachable or undetachable method. When the line frame elements 943 are mounted on the upper cover 942a, they can be rotated relative to the spool 941. Further, when the line frame elements 943 are mounted on the upper cover 942a, they can be rotated with the head housing 942 constituted by the upper cover 942a and the lower cover 942b synchronously, or with the upper cover 942a when the lower cover 942b is detached. Surely, the line frame elements 943 can be mounted on other part which is able to rotate relative to the spool 941.

The line frame elements 943 are formed with line frame structures 943a allowing the cutting line to pass through and connecting arms 943b for connecting the line frame structures 943a to make the line frame structures 943a locate on the outside of the spool 941. Specifically, taking the rotation axis of the spool 941 as an axial direction, the connecting arms 943b make the line frame structures 943a locate on the outside of the spool 941 in a circumferential direction.

When the line frame elements 943 are mounted on the head housing 942 in the undetachable method, the user can wind the cutting line without opening the head housing 942, that is without separating the upper cover 942a and the lower cover 942b. It is similar to the line winding method described above. The cutting line can be passed through apertures 942c of the head housing 942. Because the line frame elements 943 cannot be rotated relative to the head housing 942, the line frame structures 943a can be aligned with the apertures 942c. So, the cutting line can be passed through the line frame structures 943a and then inserted into the spool 941. Thus, when the auto-winding mode is entered, the spool 941 is rotated relative to the apertures 942c or the line frame structures 943a so that the cutting line is wound on the spool 941. The advantage is that the user can finish the line winding while not having to open the head housing 942.

The user also can realize the line winding in the method of opening the head housing 942. Firstly, the lower cover 942b is opened to expose the spool 941 and the line frame elements 943. And then, the cutting line is passed through the line frame structures 943a and inserted in the spool 941. When the line winding is ready, the grass trimmer can be operated so as to realize the relative rotation of the spool 941 and the line frame elements 943. So, the cutting line passes through the line frame structures 943a continuously and winds on the spool 941. When the line winding is finished, the lower cover 942b can be mounted back. The advantage is that, it is easy for the user to observe the state of line winding and control according to the state of line winding.

Alternatively, the line frame elements 943 can be omitted. A whole or a part of the head housing 942 can be made of transparent material, which can realize the object of observing the state of line winding as well.

Surely, the line frame elements 943 can be a detachable attachment. When it is needed to wind the cutting line, the head housing 942 can be opened, and the lower cover 942b can be separated. And then, the line frame elements 943 are mounted on the upper cover 942a or other part which is rotatable relative to the spool 941, for example a housing 944 for accommodating the motor. When the mounting is finished, the grass trimmer is passed through the line frame structures 943a and inserted in the spool 941. And then the spool 941 is driven to rotate. Surely, the line frame elements 943 can be driven. The cutting line can be wound on the spool 941 through the relative rotation between the spool 941 and the line frame elements 943. Then, the line frame elements 943 are detached, and the free ends of the cutting line can go out from the apertures 942c of the lower cover 942b. And then the lower cover 942b is coupled with the upper cover 942a, and the line winding is finished. Or, the upper cover 942a and the lower cover 942b can be formed with a half of the apertures 942c respectively. When the upper cover 942a and the lower cover 942b constitute a whole, the whole apertures 942c is formed. That is the upper cover 942a and the lower cover 942b are formed with two recesses respectively. After the line frame elements 943 are detached, the cutting line is located in the recesses of the upper cover 942a or the lower cover 942b, and then the upper cover 942a and the lower cover 942b are coupled as a whole. The cutting line can pass the apertures formed by the coupling of the upper cover 942a and the lower cover 942b. It is easy for the user to make the free ends of the cutting line go out of the head housing 942 from the inside.

The advantage of the detachable line frame elements 943 is that, for the grass trimmer with the head housing 942 being capable of detaching entirely or partially, the spool 941 can be exposed through detaching the head housing 942, and then the line frame elements 943 as an attachment is disposed (the line frame elements 943 may be not mounted on the head housing 942 but mounted on other part which is fixed relative to the motor, for example the housing of the motor or the guard). And then the spool 941 is driven at a low speed so as to realize the auto-winding. This can make the previous grass trimmer without auto-winding function have the corresponding hardware structure for auto-winding after the line frame elements 943 are disposed. Surely, the speed of the motor for driving the spool 941 should be adjusted so that the spool 941 is rotated at a low speed during auto-winding to ensure user safety.

Referring to FIGS. 11A-11C, the line frame elements 943 are formed with the line frame structures 943a. When the auto-winding is performed, the line frame elements 943 can be rotated relative to the spool 941. The line frame elements 943 are equivalent to simulating the manual winding of the user's hand, and the line frame structures 943a are equivalent to the fingers for holding the cutting line. So, the line frame elements 943 can be defined as a line holding member for holding the cutting line so as to make the cutting line rotate relative to the spool. And the line frame structures 943a can be defined as a line holding structure which simulates the fingers to hold the cutting line at a location and allows the cutting line pass through the line frame structures 943a continuously so as to wind on the spool 941.

Figure 11D:
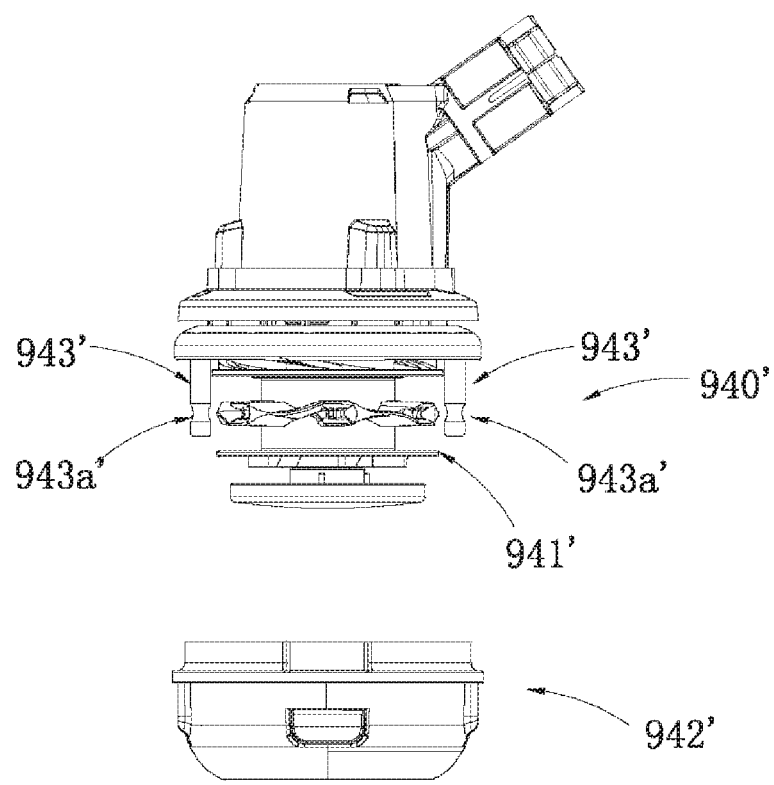
FIG. 11D is a schematic view of an exemplary line holding member.

As shown in FIG. 11D, a trimming head 940' includes a spool 941' and a head housing 942', which is similar to the trimming head 940 in FIGS. 11A-11C. The difference is that the line frame elements 943 are replaced by the winding pins 943'.

Similarly, the head housing 942' can be constituted by an upper cover 942a' and a lower cover 942b' which are detachable. The winding pins 943' similar to the line frame elements 943 can be detachable or undetachable, which can be mounted on other part being capable of rotating relative to the spool 941'. The difference is that the winding pins 943' are not formed with the line frame structures 943a, but formed with concave parts 943a'. The concave parts 943a' can locate the cutting line going around the concave parts 943a'. When the winding pins 943' are rotated relative to the spool 941', they can drive the cutting line through the friction force so as to realize the auto-winding. So, the winding pins 943' can be defined as a line holding member, and the concave parts 943a' can be defined as a line holding structure.

Figure 12A:
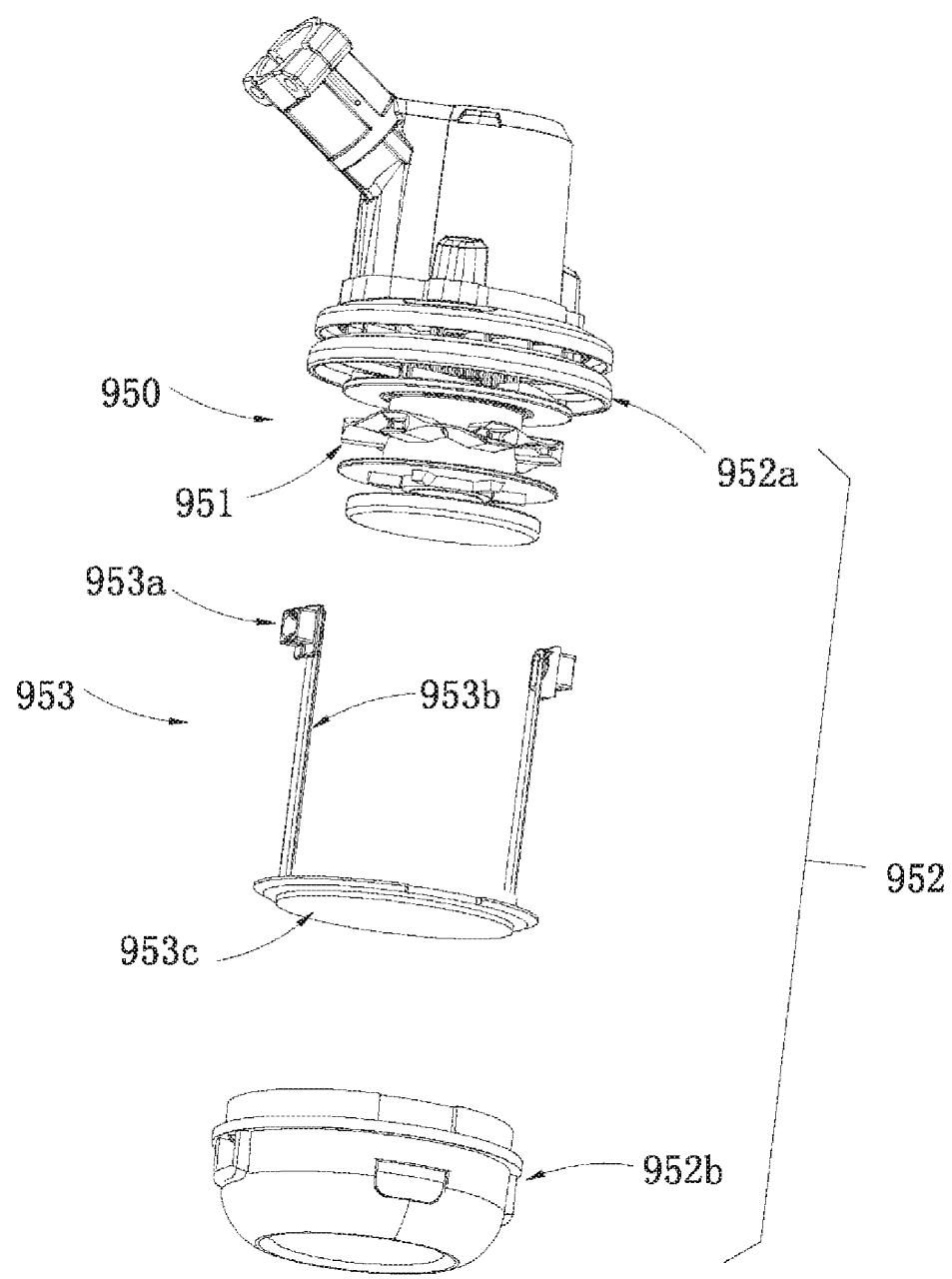
FIG. 12A is a schematic view of a trimming head and a line holding member acted as an attachment.
Figure 12B:
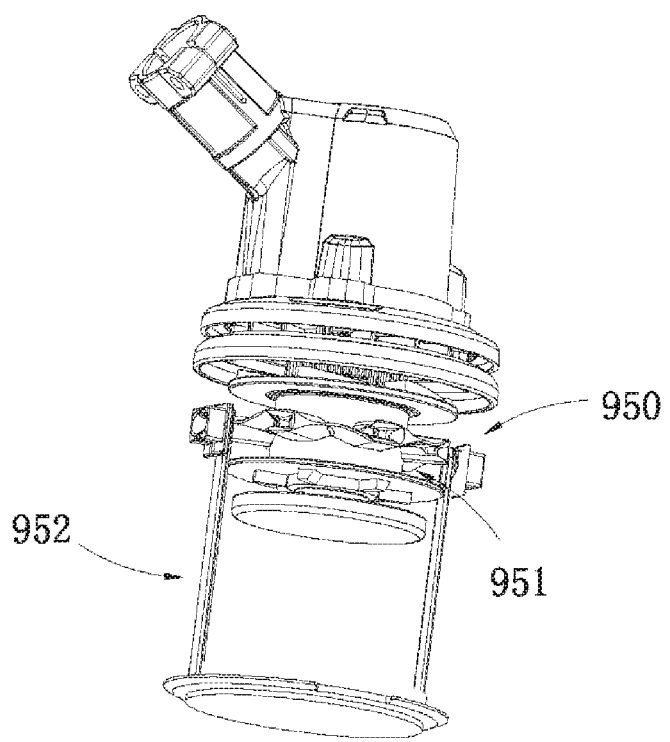
FIG. 12B is a schematic view of the line holding member in FIG. 12A, wherein the line holding member is in a working state.

Referring to FIGS. 12A-12B, line frame elements 953 can be acted as functional attachments which are independent of a trimming head 950. Line frame elements 953 include a fixing seat 953c except line frame structures 953a and connecting arms 953b. The fixing seat 953c is connected with the connecting arms 953b. When it is needed to wind the cutting line automatically, an upper cover 952a and a lower cover 952b of a head housing 952 are separated so as to expose a spool 951. And then, the cutting line is passed through the line frame structures 953a and inserted into the spool 951. And then, a motor is started to drive the spool 951. The spool 951 is rotated relative to the line frame elements 953 so as to realize the auto-winding.

Figure 12C:
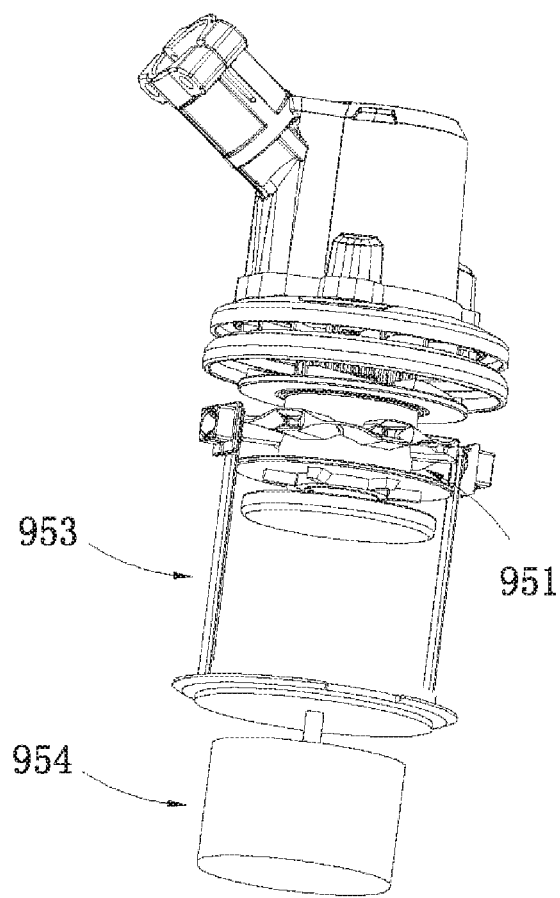
FIG. 12C is a schematic view of a line frame element, wherein the line frame element is driven by a motor.

In the embodiment in FIG. 12C, an auxiliary device such as a bracket can be used to fix the grass trimmer or the spool 951, and an extra motor 954 is used to drive the line frame elements 953 to rotate relative to the spool 951. So, the auto-winding is realized. In this embodiment, the requirements of configuration of the grass trimmer itself is reduced. The auto-winding can be realized through the line frame elements 953 acting as separate attachments or a combination of the line frame elements 953 and a corresponding driving device, as long as the head housing 952 can be opened. And it is no need to change the grass trimmer too much.

Figure 13A:
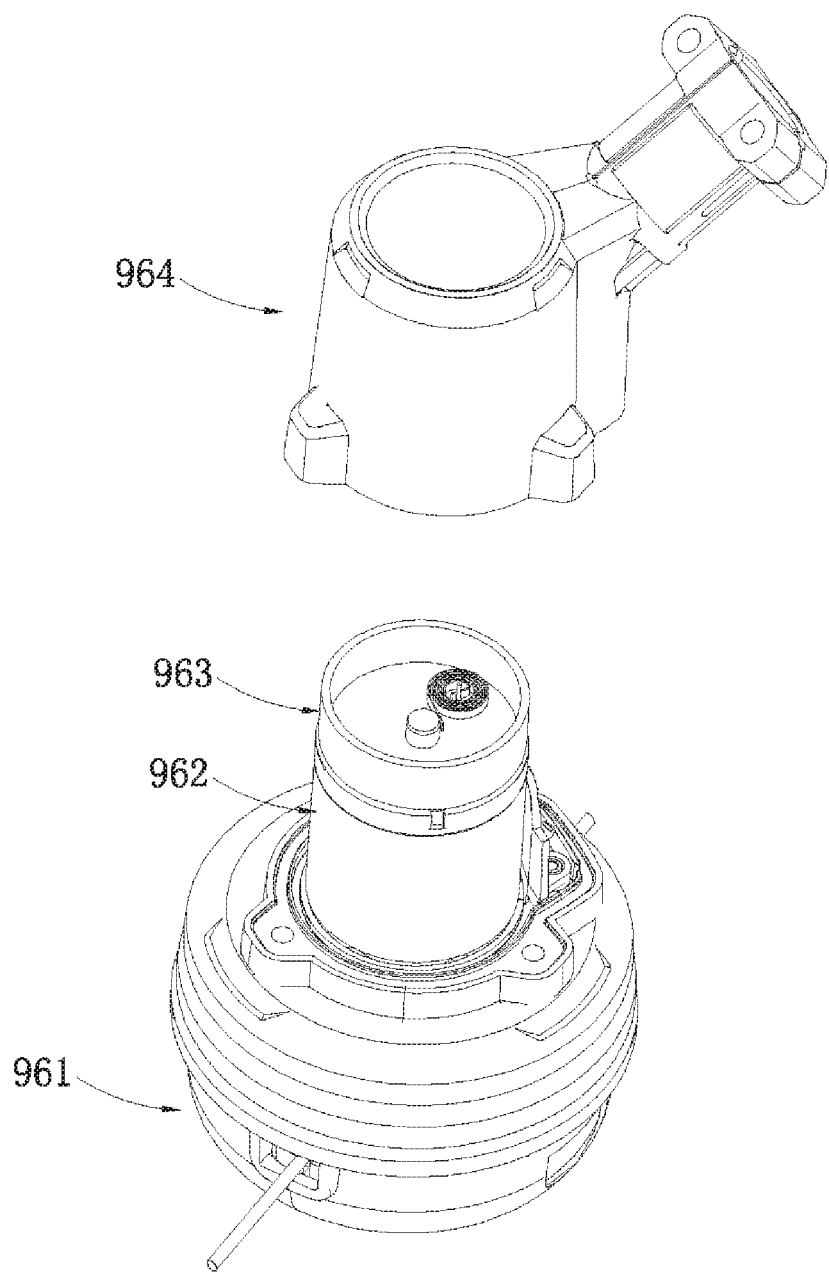
FIG. 13A is a schematic view of an energy storing device, a motor and a trimming head.
Figure 13B:
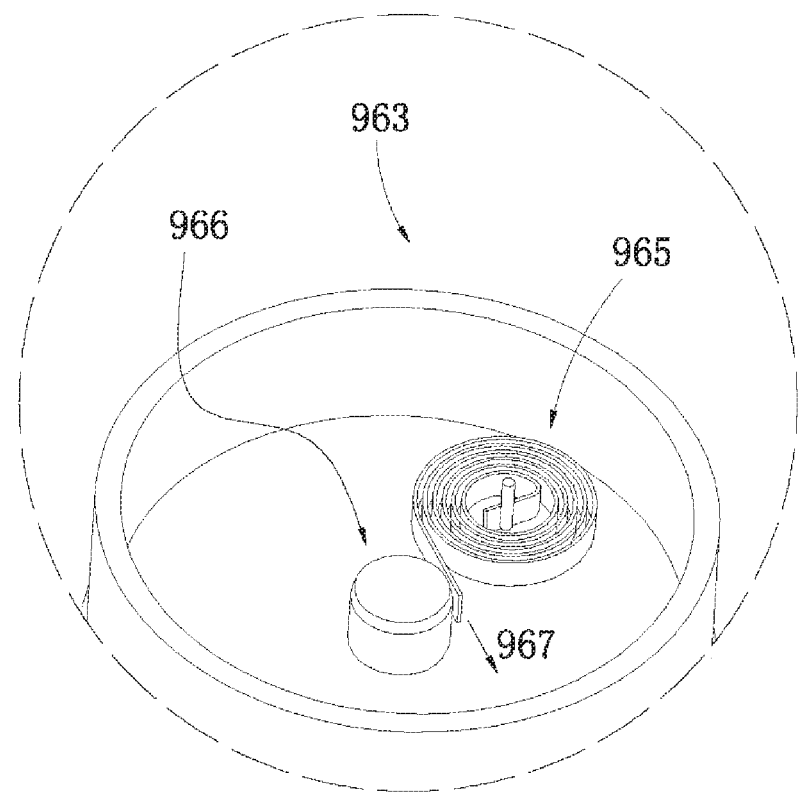
FIG. 13B is an enlarged view of a part of the structure in FIG. 13A.

Referring to FIGS. 13A and 13B, a grass trimmer includes a trimming head 961, a motor 962 and an energy storing device 963.

The motor 962 is used to drive the trimming head 961 to rotate so as to cut vegetation. The trimming head 961 includes a spool and a head housing. The spool is accommodated in the head housing. The detail structure of the trimming head 961 can refer to the trimming head 410 in FIGS. 4A-4D.

The grass trimmer includes a housing 964 for accommodating the motor 962. Specifically, the motor 962 is an electric motor having a motor shaft 966 for outputting power.

The grass trimmer has the function of auto-winding. The spool can be rotated relative to the head housing so that the cutting line winds on the spool automatically. Thus, the function of auto-winding is realized. The energy storing device 963 is able to drive one of the spool and the head housing to rotate relative to the other so as to realize the function of auto-winding. The motor 962 rotates to make the energy storing device 963 store energy. Then, the user can control the energy storing device 963 to release energy so as to realize the function of auto-winding.

Specifically, the energy storing device 963 is disposed within the housing 964, which is mounted on the top of the motor 962. The energy storing device 963 includes an elastic element 965 which is a coil spring. The coil spring is coupled with the motor shaft 966 on an end. When the motor shaft 966 is rotated, it drives the end of the coil spring to move in a direction indicated by an arrow 967. And the other end of the coil spring is fixed. At this moment, the coil spring stores energy. When it is needed to realize the function of auto-winding, the coil spring retracts to drive the motor shaft 966 to rotate reversely. The motor shaft 966 is connected with the spool or the head housing, so one of the spool or the head housing is driven by the motor shaft 966 to rotate relative to the other. Thus, the function of auto-winding is realized.

A method for controlling the grass trimmer, in particular a method for controlling the grass trimmer to wind the cutting line based on the embodiments described above is illustrated as flowing.

As described before, the grass trimmer at least includes the spool, the line holding member and the motor. The spool is used to mount the cutting line. Specifically, the cutting line can be mounted on the spool in a winding method or other method such as storing. The main function of the line holding member is similar to the function of the fingers against the cutting line while winding the cutting line with hands. That is the line holding member produces a limiting effect to make the cutting line revolve (taking the spool as a reference) and allow the cutting line to pass the line holding member and wind on the spool. The motor can drive one of the spool and the line holding member, so that the line holding member simulates the relative motion pattern of the hand and the spool when mounting the cutting line manually. That is, the relative rotation is created between the spool and the line holding member.

In is noted that, the line holding member can be constituted by a housing for accommodating the spool. For example, the head housing can be acted as the line holding member.

Figure 14A:
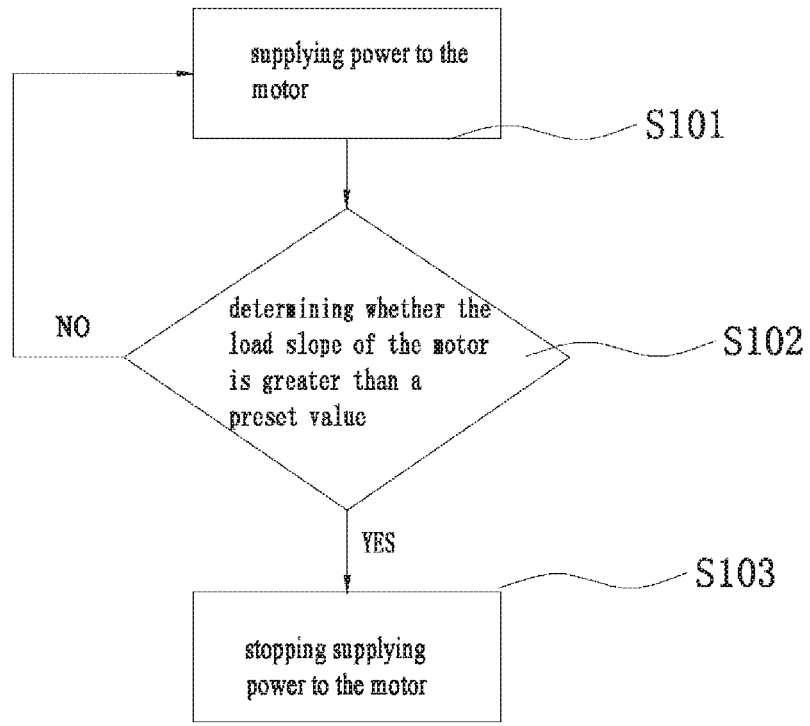
FIG. 14A is a flow diagram showing a control method for controlling winding of a grass trimmer.

As shown in FIG. 14A, the control method includes: S101 supplying power to the motor so as to produce a relative rotation between the spool and the line holding member. More specifically, the control method supplies power to the motor when the grass trimmer is operated by the user. The power supplied to the motor can be electric energy.

Further, the grass trimmer includes a controller and an operating element. The controller is used to control whether to supply power to the motor. When the operating element is activated by the user, the grass trimmer is controlled by the controller to supply power to the motor. Alternatively, if the operating element is activated again, the grass trimmer is controlled by the controller to stop supplying power to the motor.

Further, the grass trimmer includes another operating element. When the operating element is activated again, the grass trimmer is controlled by the controller to stop supplying power to the motor. Alternatively, the two different operating elements are needed to be pressed to make the grass trimmer supply power to the motor.

Otherwise, the grass trimmer can be stopped from supplying power to the motor in an automatic method. The operating method includes: S101 supplying power to the motor, S102 determining whether the load slope of the motor is greater than a preset value, and S103 stopping supplying power to the motor. Specifically, the controller determines whether to stop supplying power to the motor according to the load slop of the motor (the slope in the present disclosure should be considered as including mathematic definition which indicates rising tendency such as the derivative). When the load slope of the motor is greater than the preset value, the grass trimmer is controlled automatically to stop supplying power to the motor. When the load slope of the motor isn't greater than the preset value, the grass trimmer is controlled to supply power to the motor continuously. The load state can be determined according to the speed or the speed slope of the motor. When the speed slope is less than a preset value, the controller stops supplying power to the motor.

When the motor is an electric motor, the current slope of the electric motor can be used to make a similar judgement control. Specifically, when the current slope of the electric motor is greater than a preset value, the controller stops supplying power to the motor.

Figure 14B:
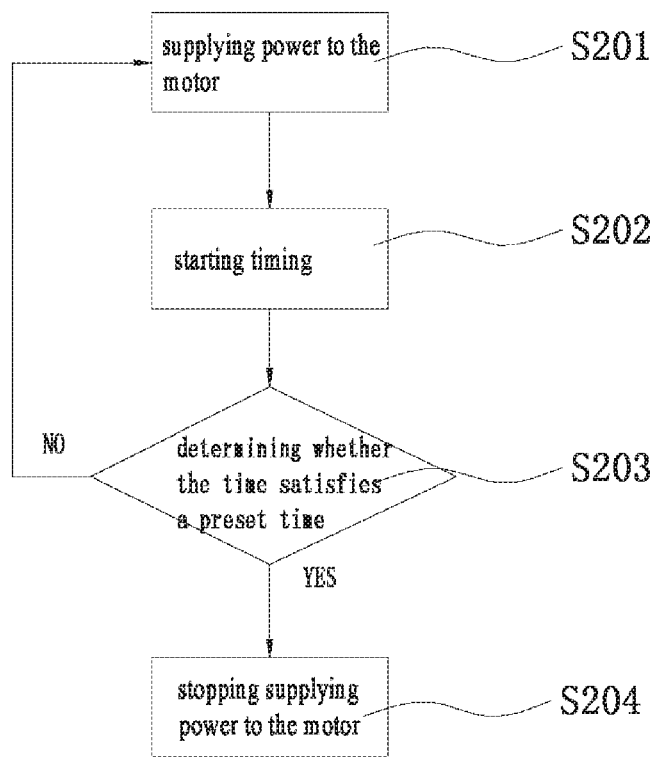
FIG. 14B is another flow diagram showing a control method for winding of a grass trimmer.

As shown in FIG. 14B, alternatively, the control method can use a timing method. The control method includes: S201 supplying power to the motor, S202 starting timing, S203 determining whether the time satisfies a preset time, and S204 stopping supplying power to the motor. Specifically, when the grass trimmer is controlled by the controller to supply power to the motor, timing is started. When the time satisfies the preset time, the grass trimmer is controlled to stop supplying power to the motor. when the time does not satisfy the preset time, the grass trimmer is controlled to supply power to the motor continuously.

Otherwise, the motor can be provided with different power so that the spool and the line holding member can rotate at a first relative speed and a second relative speed respectively. The speed of the motor can be changed, so the relative rotation speed between the spool and the line holding member can be changed. However, when the grass trimmer supplies power to the motor to mount the cutting line, the relative rotation speed between the spool and the line holding member should be less than the rotation speed of the cutting line or the spool while the cutting line is cutting vegetation.

Figure 14C:
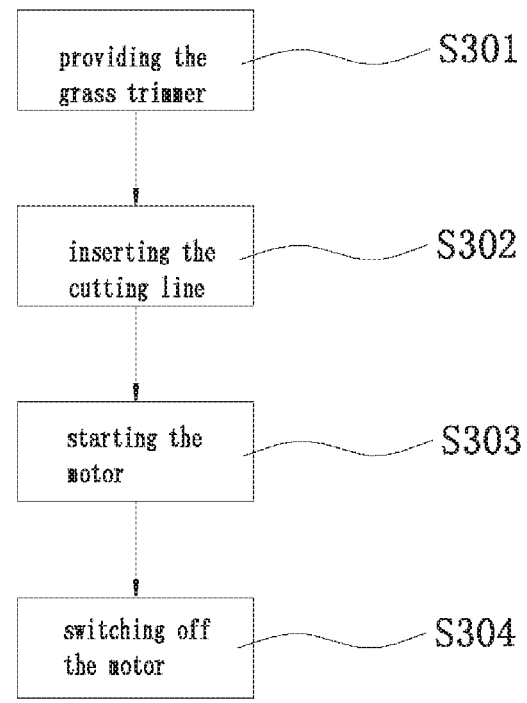
FIG. 14C is a flow diagram showing an operating method for winding of a grass trimmer.

As shown in FIG. 14C, a method for operating the grass trimmer to wind the cutting line is illustrated as following. The method mainly includes the following steps:

S301 providing the grass trimmer.

In this step, the grass trimmer includes the spool for winding the cutting line, line holding member being formed with line holding structure allowing the cutting line to pass through and the motor being capable of driving one of the spool and the line holding member.

However, the grass trimmer in this step can be the grass trimmer in the foregoing examples. It is noted that the line holding member is detachable.

S302 inserting the cutting line.

In this step, the cutting line is associated with the line holding member and inserted in the spool. As for associating the cutting line with the line holding member, it is dependent on the specific form of the line holding member and the line holding structure, which can refer to the examples described above. Similarly, inserting in the spool can be understood as inserting in the holes or apertures formed on the spool or other structure which can limit the ends of the cutting line to hold the cutting line thereon. This step can make both the spool and the line holding structure act on the cutting line so as to get ready to mount the cutting line.

S303 starting the motor.

The user can start the motor through the operating element or an action activating the sensor disposed on the grass trimmer, so that the relative rotation is produced between the spool and the line holding member.

S303 switching off the motor.

The user can switch off the motor to make the spool and the line holding member be relatively static. However, the controller of the grass trimmer can be used to determine when to switch off the motor.

Alternatively, the operating element disposed on the grass trimmer can be triggered to start the motor, and the motor can be switched off by triggering the operating element once again or by triggering another operating element.

The above illustrates and describes basic principles, main features and advantages of the present disclosure. Those skilled in the art should appreciate that the above embodiments do not limit the present disclosure in any form. Technical solutions obtained by equivalent substitution or equivalent variations all fall within the scope of the present disclosure.

The grass trimmer 1500 shown in FIG. 15A has substantially the same structure and can perform substantially the same functions as the grass trimmer 400 of FIGS. 4A-4C. As shown in FIG. 15C, a main difference is that the grass trimmer 1500 in the present embodiment includes a spool 153 with a structure different from that of the spool 411.

As shown in FIGS. 15A-15B, the grass trimmer 1500 includes a motor 1511, an operating device 1512, a trimming mechanism 15a, a connecting tube 1513, a first housing 1514, and a battery pack 1515.

The operating device 1512 is provided for a user to operate to control the grass trimmer 1500. The operating device 1512 includes a handle 1512a and a first operating member 1512b. The handle 1512a is held by the user. The first operating member 1512b is mounted on the handle 1512a, and the first operating member 1512b is operated by a user to activate the motor 1511 to cause the grass trimmer 1500 to perform a cutting function.

As shown in FIGS. 15B-15D, the trimming mechanism 15a includes a trimming head 150a. The trimming head 150a is used for accommodating the cutting line 1501, a portion of the cutting line 1501 is housed inside the trimming head 150a, and the cutting line 1501 is partially exposed to the outside of the trimming head 150a. The trimming head 150a drives the cutting line 1501 to rotate to cut vegetations. The motor 1511 drives the trimming head 150a to rotate about a central axis 1502. The trimming head 150a includes a spool 153 and a housing assembly 151, and the housing assembly 151 includes a housing 152. The spool 153 is used for winding the cutting line 1501. The spool 153 is at least partially located within the housing 152. The spool 153 is disposed within a housing cavity 1524 formed by the housing assembly 151.

The connecting tube 1513 is connected to the operating device 1512 and the trimming mechanism 15a. The connecting tube 1513 connects the trimming head 150a and the handle 1512a.

The connecting tube 1513 connects the first housing 1514, and the battery pack 1515 is detachably mounted to the first housing 1514.

The grass trimmer 1500 has an auto-winding mode and a cutting mode.

When the grass trimmer 1500 is in the auto-winding mode, it is not necessary to manually rotate the spool 153, the housing 152, or the cutting line 1501, and the cutting line 1501 can be automatically wound onto the spool 153. When the grass trimmer 1500 is in the auto-winding mode, the motor 1511 drives at least one of the spool 153 and the housing 152 so that a relative rotation between the spool 153 and the housing 152 to automatically wind the cutting line 1501 to the spool 153.

In the cutting mode, the motor 1511 drives the spool 153 and the housing 152 to rotate synchronously, and the cutting line 1501 and the spool 153 remain relatively fixed. Thereby, the trimming head 150a is driven by the motor 1511 to rotate to drive the cutting line 1501 to rotate to realize the cutting of the vegetations.

As shown in FIGS. 15A-15B, the trimming mechanism 15a further includes a second operating member 150b. The second operating member 150b is operated by the user to control the motor 1511 to cause the grass trimmer 1500 to be in or into the auto-winding mode, and the motor 1511 drives at least one of the spool 153 and the housing 152 so that the relative rotation between the spool 153 and the housing 152 to automatically wind the cutting line 1501 to the spool 153.

As shown in FIGS. 15C-15G, the motor 1511 is disposed in a motor housing 1511b. The motor 1511 includes a motor shaft 1511a, and the motor shaft 1511a is coupled to the spool 153 to drive the spool 153 to rotate. The housing 152 includes an upper housing 1521 and a lower housing 1522. The spool 153 is disposed in the housing cavity 1524 surrounded by the upper housing 1521 and the lower housing 1522.

The grass trimmer 1500 includes a damping device 154, and the damping device 154 includes a one-way bearing 1541 that functions to form a one-way rotational connection between the housing 152 and the motor 1511. The one-way bearing 1541 allows the housing 152 to rotate in a first direction with respect to the motor 1511 or the motor housing 1511b. That is, the one-way bearing 1541 prevents the housing 152 from rotating in a second direction opposite to the first direction with respect to the motor 1511 or the motor housing 1511b.

In the cutting mode, the motor shaft 1511a rotates to drive the spool 153 to rotate, and the spool 153 drives the upper housing 1521 to rotate. The spool 153 is formed with first engaging portions, and the first engaging portions are first engaging teeth 1531. The upper housing 1521 is formed with first matching portions, and the first matching portions are first matching teeth 1523. The first engaging teeth 1531 are engaged with the first matching teeth 1523, so that the spool drives the upper housing 1521 to rotate.

The housing assembly 151 includes eyelet members 155, and the eyelet members 155 are mounted to the housing. The eyelet members 155 are formed with outer apertures 1551. The eyelet members 155 are fixed to the housing 152. The eyelet members 155 are made of a metal material. The housing 152 is made of a plastic material. The eyelet members 155 prevent the cutting line 1501 from wearing the wall of the outer apertures 1551.

In some embodiments, the housing assembly includes a housing. The housing assembly does not include eyelet members. The housing forms outer apertures. The housing includes an upper housing and a lower housing. It can also be said that the housing assembly includes the upper housing and the lower housing.

As shown in FIGS. 15H-15K, the spool 153 is provided with inner apertures 1532 through which the cutting line 1501 is inserted. The inner apertures 1532 can fix the cutting line 1501. The spool 153 is also formed with passages 1533 for the cutting line 1501 to pass through the spool 153. Both ends of the threading passage 1533 are defined as inner apertures 1532. The cutting line 1501 passes through the inner apertures 1532 and is then inserted into the passages 1533.

When the user needs to add the cutting line 1501, the user can insert the cutting line 1501 into the outer apertures 1551, then the cutting line 1501 enters the housing cavity 1524 and inserts the inner apertures 1532, and then the cutting line 1501 runs through the passages 1533, and finally the cutting line 1501 passes out from the outer apertures 1551 on the opposite side to the outside of the housing 152. When it is necessary to wind the cutting line 1501 on the spool 153, the user does not need to open the housing 152, and the cutting line 1501 can be directly penetrated into the interior of the housing 152 and then wound on the spool 153 by the relative rotation of the spool 153 and the housing 152. Such a trimming head 150a is commonly referred to as an externally wound trimming head.

The user controls the grass trimmer 1500 to cause the grass trimmer 1500 to perform the auto-winding mode. The motor 1511 rotates backward to drive the spool 153 to rotate in a second direction opposite to the first direction. Due to the stopping action of the one-way bearing 1541, the housing 152 cannot rotate in the second direction, and the spool 153 is driven by the motor shaft 1511a to rotate in the second direction with respect to the housing 152 to realize automatic winding.

The first matching teeth 1523 are ratchets such that the spool 153 and the housing 152 are relatively rotatable in the auto-winding mode, and the spool 153 can drive the housing 152 to rotate in the cutting mode.

The motor shaft 1511a directly drives the spool 153 to rotate, the housing 152 can rotate with respect to the spool 153, and the housing 152 can also slide along the central axis 1502 with respect to the spool 153. The housing 152 slides relative to the spool 153 between a first axial position and a second axial position.

When the housing 152 is in the first axial position, the first matching teeth 1523 cooperate with the first engaging teeth 1531 to enable the housing 152 to rotate synchronously when the spool 153 rotates.

The grass trimmer 1500 has a line feeding mode. The line feeding mode enables the cutting line 1501 wound to the spool 153 to be partially released to increase the length of the cutting line 1501 exposed outside the trimming head 150a. When the grass trimmer 1500 is in the cutting mode, the user strikes the trimming head 150a to move the housing 152 from the first axial position to the second axial position, and the first matching teeth 1523 and the first engaging teeth 1531 are disengaged. Thereby the spool 153 is rotatable relative to the housing 152 to release a portion of the cutting line 1501.

The trimming head 150a further includes a spring 156, the spring 156 exerts a force between the lower housing 1522 and the spool 153 to move the housing 152 to the first axial position that rotates synchronously with the spool 153.

In some embodiments, the first engaging teeth are disposed at a lower portion of the spool, and the first matching teeth are formed on the lower housing. The spring 156 applies a force to the spool or housing assembly that causes the first matching teeth to contact the first engaging tooth.

The spool 153 has a line loading position relative to the housing assembly 151, which facilitates the user to insert the cutting line 1501 from the outer apertures 1551 into the housing cavity 1524 and into the inner apertures 1532. The inner apertures 1532 and the apertures 1551 can be automatically aligned such that the spool 153 is in the line loading position with respect to the housing assembly 151, thereby facilitating the user to insert the cutting line 1501 from the outer apertures 1551 into the housing cavity 1524 and into the inner apertures 1532. Alternatively, the cutting line 1501 passing through the outer apertures 1551 can be directly inserted into the inner apertures 1532.

In some embodiments, the inner apertures and outer apertures may also not be fully aligned. The inner apertures and the outer apertures may automatically correspond to each other such that the user inserts the cutting line into the outer apertures and the inner apertures in order from the outside.

In some embodiments, the spool is formed with one engaging tooth, the housing is formed with one matching tooth, and the spool is in a line loading position when the engaging tooth engages with the matching tooth.

In some embodiments, a spool is provided with clamping portions for fixing a cutting line. When the spool is in a line loading position with respect to a housing assembly, the user can insert the cutting line from outer apertures into a housing cavity and into the clamping portions.

The housing assembly 151 is formed with a first positioning surface 1523a. The spool 153 is formed with a second positioning surface 1531a that cooperates with the first positioning surface 1523a. When the first positioning surface 1523a is in contact with the second positioning surface 1531a, the spool 153 is in the line loading position with respect to the housing assembly 51.

The trimming head 150a further includes a driving member. The driving member applies a force to the housing assembly 151 or the spool 153 to cause the relative rotation between the spool 153 and the housing assembly 151 to bring the first positioning surface 1523a and the second positioning surface 1531a into contact.

The spring 156 acts as the driving member. The spring 156 is disposed between the housing assembly 151 and the spool 153. The spring 156 applies the force to the spool 153 or the housing assembly 151 to bring the first positioning surface 1523a and the second positioning surface 1531a closer to each other.

Each of the first matching teeth 1523 or the first engaging teeth 1531 has an inclined surface, and the inclined surface is inclined to a plane perpendicular to the central axis 1502. An angle between the inclined plane and the plane perpendicular to the central axis 1502 is greater than or equal to 8 degrees and less than or equal to 18 degrees. The arrangement of the inclined surface enables a relative rotation between of the spool 153 and the housing 152 under the force of the spring 156.

The spring 156 exerts a force between the lower housing 1522 and the spool 153, so that the spring 156 can drive the spool 153 to rotate to a position where the first positioning surface 1523a and the second positioning surface 1531a are in contact and the spool 153 can automatically rotate to the line loading position. That is to say, the user does not need to manually rotate the spool 153 or the housing 152 to align the inner apertures 1532 with outer apertures 1551, but when the spool 153 is stationary relative to the housing 152, the spool 153 automatically enters the line loading position. That is to say, the user does not need to rotate the spool 153 or the housing 152 to align the inner apertures 1532 with outer apertures 1551, but when first engaging teeth 1531 and the first matching teeth 1523 are in contact, the spring 156 drives the spool 153 to enter or remain in the line loading position automatically.

As shown in FIGS. 15H-15O, the first positioning surface 1523a is disposed on the first matching teeth 1523, and each of the first matching teeth 1523 is further formed with a first inclined surface 1523b. Each of the first engaging teeth 1531 is formed with a second inclined surface 1531b and the second positioning surface 1531a.

The first inclined surface 1523b and the first positioning surface 1523a are located on both sides of each of the first matching teeth 1523. The second inclined surface 1531b and the second positioning surface 1531a are located on both sides of each of the first engaging teeth 1531.

When the first positioning surface 1523a is in contact with the second positioning surface 1531a, the two sides of the first matching teeth 1523 are respectively in contact with two similar first engaging teeth 1531.

When the first positioning surface 1523a is in contact with the second positioning surface 1531a, the first inclined surface 1523b is in contact with the second inclined surface 1531b.

The spool 153 is formed with a plurality of the inner apertures 1532, and the number of inner apertures 1532 is an even number. The number of the first engaging teeth 1531 is an even number. The plurality of inner apertures 1532 are evenly distributed in a circumferential direction of the central axis 1502. The number of the first engaging teeth 1531 is the same as the number of the inner apertures 1532. The spool 153 is formed with six inner apertures 1532. The spool 153 is formed with six first engaging teeth 1531.

The spool 153 is formed with at least one winding portion for winding the cutting line 1501 and two flange portions provided at both ends of the winding portion. In the present embodiment, the spool 153 includes two winding portions and three flange portions, which are respectively an upper winding portion 1534, a lower winding portion 1535, an intermediate flange portion 1536, an upper flange portion 1537, and a lower flange portion 1538. The upper winding portion 1534 is provided for winding the cutting line 1501. The lower winding portion 1535 is provided for winding the cutting line 1501. The upper flange portion 1537, the lower flange portion 1538, and the intermediate flange portion 1536 limit the position of the cutting line 1501. The upper flange portion 1537 is connected to the upper end of the upper winding portion 1534. The lower flange portion 1538 is connected to the lower end of the lower winding portion 1535. The intermediate flange portion 1536 is located between the upper winding portion 1534 and the lower winding portion 1535. The intermediate flange portion 1536 is formed with the inner apertures 1532 through which the cutting line 1501 is inserted.

The spool 153 includes a first part and a second part, which are referred to as an upper spool 153*a* and a lower spool 153*b*. The lower spool 153*b* is coupled to the upper spool 153*a* so that they form an integral whole. The upper spool 153*a* includes the upper winding portion 1534, the upper flange portion 1537, and a first intermediate flange portion 153*c*. The lower spool 153*b* includes the lower winding portion 1535, the lower flange portion 1538, and a second intermediate flange portion 153*d*.

The upper flange portion 1537 is connected to the upper end of the upper winding portion 1534. The first intermediate flange portion 153*c* is coupled to the lower end of the upper winding portion 1534. The lower flange portion 1538 is connected to the lower end of the lower winding portion 1535. The second intermediate flange portion 153*d* is connected to the upper end of the lower winding portion 1535. The first intermediate flange portion 153*c* and the second intermediate flange portion 153*d* together constitute the intermediate flange portion 1536.

The upper spool 153*a* and the lower spool 153*b* are combined to form the passages 1533 through which the cutting line 1501 passes through the spool 153. Both ends of the threading passage 1533 are defined as inner apertures 1532. The cutting line 1501 can be threaded into the threading passage 1533 from the inner apertures 1532. The threading passage 1533 extends along a curve. In the present embodiment, the passages 1533 do not pass through the central axis 1502, that is, an intersection point of the two passages 1533 is not on the central axis 1502, which can avoid the cutting line 1501 from one threading passage 1533 to another threading passage 1533.

In other embodiments, the threading passage also can pass through the central axis.

The upper spool 153*a* and the lower spool 153*b* are combined to form at least two passages 1533 that intersect each other. Specifically, the upper spool 153*a* and the lower spool 153*b* are combined to form three passages 1533 that can intersect any two. Three passages 1533 are arranged around the central axis 1502.

The passages 1533 are formed by the upper spool 153*a* and the lower spool 153*b*, which facilitates the manufacturing of the passages 1533.

The spool 153 is provided with a center hole 153*e* around the central axis 1502, and the passages 1533 is disposed outside of the center hole 153*e*.

The spring 156 is disposed between the upper spool 153*a* and the lower casing 1522. The spring 156 applies a force that moves the upper spool 153*a* and the lower housing 1522 away from each other. In other words, the spring 156 applies a force that brings the upper casing 1521 and the upper spool 153*a* closer to each other.

The upper spool 153*a* is fixed to the motor shaft 1511*a*. The motor 1511 drives the upper spool 153*a* to rotate.

As shown in FIGS. 15P-15T, the housing assembly 151 projects inwardly of the housing cavity 1524 to form projections 1552. A minimum distance from the projections 1552 to the inner apertures 1532 is greater than or equal to 3 mm.

The wall of the outer apertures 1551 projects inwardly of the housing cavity 1524 to form the projections 1552. Each of the outer apertures 1551 forms two projections 1552. Two projections 1552 are located on both sides of the outer apertures 1551 and are arranged along the circumferential direction of the central axis 1502. That is, the two projections 1552 are located on the left and right sides of the outer apertures 1551 instead of the upper and lower sides.

A distance from the eyelet members 155 to the spool 153 is less than 3 mm. A distance between the eyelet members 155 and the intermediate flange portion 1536 is less than or equal to 3 mm. So that, a end portion of the cutting line 1501 that penetrates from the outer apertures 1551 into the housing cavity 1524 is less likely to be displaced, and can be smoothly inserted into the inner apertures 1532.

The eyelet members 155 project at least partially toward the spool 153. The eyelet members 155 are formed with two projections 1552 projecting toward the spool 153. The two projections 1552 are disposed on both sides of the outer apertures 1551. The two projections 1552 are arranged along the circumferential direction of the central axis 1502.

The projections 1552 are located between an upper surface and a lower surface of the intermediate flange portion 1536. A dimension of the projections 1552 in the direction of the central axis 1502 is smaller than a dimension of the intermediate flange portion 1536 in the direction of the central axis 1502.

Each of the outer apertures 1551 is a waist hole. A dimension of the outer apertures 1551 in the direction of the central axis 1502 is defined as the height of the outer apertures 1551. A dimension of the apertures 1551 in a direction perpendicular to the central axis 1502 is defined as the width of the outer apertures 1551. A dimension in which the outer apertures 1551 extend is defined as the depth of the outer apertures 1551.

A distance between the two projections 1552 is the same as the width of the outer apertures 1551. The width of the outer apertures 1551 is larger than the height of the outer apertures 1551.

Each of the eyelet members 155 is formed with a notch 1553 on a side of the projection near the bobbin 153 in a plane perpendicular to the central axis 1502. The eyelet members 155 are U-shaped.

Each of the eyelet members 155 includes a body 1554 and the two projections 1552. The body 1554 is formed with the outer apertures 1551. The two projections 1552 extend outward from the body 1554. The two projections 1552 extend outward from both ends of the same side of the body 1554.

The distance from the eyelet members 155 to the intermediate flange portion 1536 is smaller than the maximum outer diameter of the cutting line 1501.

What is claimed is:

1. A grass trimmer, comprising:
 a trimming head; and
 a motor for driving the trimming head;
 wherein the trimming head comprises:
 a housing comprising a housing cavity;
 a plurality of eyelet members connected to the housing,
  each eyelet member comprising an outer aperture for allowing a cutting line to be inserted from outside of the housing into the housing cavity;

a spool at least partially disposed in the housing cavity and rotatable relative to the housing about a central axis, wherein the spool comprises inner apertures for the cutting line to be inserted into the spool; and a spring disposed between the housing and the spool;

wherein the spool has a line-loading position relative to the housing where at least one of the outer apertures is aligned with one of the inner apertures;

wherein the spool comprises a plurality of first engaging portions arranged in a circumferential direction around the central axis, the housing comprises a plurality of first matching portions corresponding to the plurality of first engaging portions, each of the plurality of first matching portions comprises a first cam surface, and each of the plurality of first engaging portions comprises a second cam surface; and wherein the spring is configured to drive the first cam surface to move relative to the second cam surface to cause the spool to rotate to the line-loading position relative to the housing.

2. The grass trimmer of claim 1, wherein:

each of the plurality of first matching portions comprises a first positioning surface;

each of the plurality of first engaging portions comprises a second positioning surface; and the spring is configured to apply a force to the spool or the housing to bring the first positioning surface and the second positioning surface closer to each other.

3. The grass trimmer of claim 2, wherein the spool comprises:

an upper winding portion for winding the cutting line;

a lower winding portion for winding the cutting line;

an intermediate flange portion disposed between the upper winding portion and the lower winding portion, the intermediate flange portion comprising the inner apertures;

an upper flange portion connected to an upper end of the upper winding portion; and a lower flange portion connected to a lower end of the lower winding portion;

wherein the plurality of first engaging portions are disposed on the upper flange portion or the lower flange portion.

4. The grass trimmer of claim 3, wherein each eyelet member protrudes at least partially toward the spool, and a distance between each eyelet member and the intermediate flange portion is less than or equal to 3 mm.

5. The grass trimmer of claim 1, wherein the spool comprises at least one passage for the cutting line to pass through the spool, the ends of the at least one passage are defined as the inner apertures, and the at least one passage is configured to extend along a curve.

6. The grass trimmer of claim 5, wherein the spool comprises:

an upper spool comprising an upper winding portion for winding the cutting line; and a lower spool comprising a lower winding portion for winding the cutting line;

wherein the upper spool and the lower spool are combined to form the at least one passage.

7. The grass trimmer of claim 5, wherein the grass trimmer has an auto-winding mode, and in the auto-winding mode, the spool is driven by the motor to rotate so as to wind the cutting line around the spool automatically.

8. A trimming head, comprising:

a housing;

eyelet members mounted to the housing, the eyelet members comprising outer apertures for allowing a cutting line to be inserted from outside of the housing into the housing;

a spool rotatable relative to the housing about a central axis, the spool comprising inner apertures for the cutting line to be inserted into the spool; and a driving member configured to apply a force to the housing or the spool;

wherein the spool has a line-loading position relative to the housing where at least one of the outer apertures is aligned with one of the inner apertures; and wherein the spool comprises at least one first engaging portion arranged in a circumferential direction around the central axis, the housing comprises at least one first matching portion corresponding to the at least one first engaging portion, the driving member is a spring disposed between the housing and the spool, and the spring is configured to drive the at least one first engaging portion to move relative to the at least one first matching portion to cause the spool to rotate to the line-loading position relative to the housing.

9. A trimming head, comprising:

a housing assembly comprising a housing cavity and outer apertures for allowing a cutting line to be inserted from outside of the housing assembly into the housing cavity; and a spool at least partially disposed in the housing cavity and rotatable relative to the housing assembly about a central axis, wherein the spool comprises inner apertures for the cutting line to be inserted into the spool; and wherein the spool has a line-loading position relative to the housing assembly where at least one of the outer apertures is aligned with one of the inner apertures; and wherein the trimming head further comprises a spring disposed between the housing assembly and configured to apply a force to the spool or the housing assembly to drive a first engagement tooth of the spool relative to a first matching tooth of the housing assembly to drive the spool to rotate to the line-loading position relative to the housing assembly.

10. The trimming head of claim 9, wherein the spool comprises a plurality of first engaging teeth arranged in a circumferential direction around the central axis, the housing assembly comprises a plurality of first matching teeth corresponding to the first engaging teeth, each of the first matching teeth comprises a first positioning surface, each of the first engaging teeth comprises a second positioning surface, and the first positioning surface is in contact with the second positioning surface when the spool in the line-loading position relative to the housing.

11. The trimming head of claim 10, wherein the spring is configured to apply a force to the spool or the housing assembly to bring the first positioning surface and the second positioning surface closer to each other.

12. The trimming head of claim 11, wherein each of the first matching teeth comprises a first inclined surface inclined to a plane perpendicular to the central axis, each of the first engaging teeth comprises a second inclined surface inclined to the plane perpendicular to the central axis, the first inclined surface and the first positioning surface are located on two sides of the first matching teeth, the second inclined surface and the second positioning surface are located on two sides of the first engaging teeth, and the first inclined surface is in contact with the second inclined surface when the first positioning surface is in contact with the second positioning surface.

13. The trimming head of claim 11, wherein the spool comprises:
   an upper winding portion for winding the cutting line;
   a lower winding portion for winding the cutting line;
   an intermediate flange portion disposed between the upper winding portion and the lower winding portion, the intermediate flange portion comprising the inner apertures;
   an upper flange portion connected to an upper end of the upper winding portion; and
   a lower flange portion connected to a lower end of the lower winding portion;
   wherein the first engaging teeth are disposed on the upper flange portion or the lower flange portion.

14. The trimming head of claim 13, wherein the housing assembly comprises:
   a housing comprising the housing cavity; and
   eyelet members connected to the housing, the eyelet members comprising the outer apertures;
   wherein the eyelet members are configured to protrude at least partially toward the spool, and a distance between the eyelet members and the intermediate flange portion is less than or equal to 3 mm.

15. The trimming head of claim 9, wherein the spool comprises at least one passage for the cutting line to pass through the spool, and the ends of the at least one passage are defined as the inner apertures.

16. The trimming head of claim 15, wherein the at least one passage is configured to extend along a curve.

17. The trimming head of claim 15, wherein the at least one passage does not pass through the central axis.

18. The trimming head of claim 15, wherein a number of the at least one passage is three, and any two of the three passages intersect to form an intersection and the intersection is outside the central axis.

19. The trimming head of claim 15, wherein the spool comprises a center hole around the central axis, and the at least one passage is disposed outside of the center hole.

* * * * *